US012740519B2

(12) United States Patent
Cross

(10) Patent No.: US 12,740,519 B2
(45) Date of Patent: Sep. 22, 2026

(54) MODULAR SYSTEMS AND METHODS FOR PROPAGATING PLANTS IN HYDROPONIC AND AQUAPONIC ENVIRONMENTS

(71) Applicant: John Thomas Cross, Ashland, OR (US)

(72) Inventor: John Thomas Cross, Ashland, OR (US)

( * ) Notice: Subject to any disclaimer, the term of this patent is extended or adjusted under 35 U.S.C. 154(b) by 109 days.

(21) Appl. No.: 18/831,199

(22) Filed: Sep. 6, 2024

(65) Prior Publication Data

US 2025/0151683 A1 May 15, 2025

Related U.S. Application Data

(60) Continuation of application No. 17/803,166, filed on Mar. 10, 2022, now Pat. No. 12,102,045, which is a division of application No. 16/166,124, filed on Oct. 21, 2018, now Pat. No. 11,310,976.

(60) Provisional application No. 62/578,457, filed on Oct. 29, 2017.

(51) Int. Cl.

| | |
|---|---|
| ***A01G 31/04*** | (2006.01) |
| ***A01G 7/04*** | (2006.01) |
| ***A01G 27/00*** | (2006.01) |
| ***A01K 63/04*** | (2006.01) |
| *A01G 9/029* | (2018.01) |

(Continued)

(52) U.S. Cl.

CPC ........... *A01G 31/047* (2013.01); *A01G 7/045* (2013.01); *A01G 27/003* (2013.01); *A01K 63/047* (2013.01); *A01G 9/0299* (2018.02); *A01G 2017/065* (2013.01); *A01G 31/065* (2025.01)

(58) Field of Classification Search

CPC ...... A01G 9/124; A01G 17/14; A01G 9/0295; A01G 9/128; A01G 31/047

See application file for complete search history.

(56) References Cited

U.S. PATENT DOCUMENTS 2,244,677 A 6/1941 Cornell
3,026,649 A * 3/1962 Barakauskas ............ A01G 9/12 47/70

(Continued)

FOREIGN PATENT DOCUMENTS

CN 105875251 A * 8/2016 ............. A01G 7/045
CN 111084013 A * 5/2020 ............. A01G 13/23

(Continued)

*Primary Examiner* — Monica L Perry

(74) *Attorney, Agent, or Firm* — Law Office of Karen Dana Oster, LLC

(57) ABSTRACT

Modular systems for propagating plants in at least one of a hydroponic environment and an aquaponics environment may include at least one tank configured to hold liquid. A modular drive assembly may be carried by the at least one tank. At least one propagation module may be drivingly engaged for rotation by the modular drive assembly. The at least one propagation module may be configured to support and propagate at least one plant. At least one pump may be disposed in fluid communication with the at least one tank. The at least one pump configured to pump the liquid from the at least one tank through the at least one propagation module. Modular methods for propagating plants in at least one of a hydroponic environment and an aquaponics environment are also disclosed.

22 Claims, 60 Drawing Sheets

(51) Int. Cl.
*A01G 17/06* (2006.01)
*A01G 31/02* (2006.01)

(56) References Cited

U.S. PATENT DOCUMENTS 3,264,783 A * 8/1966 Bayliss .................... A01G 9/12 108/190
3,909,978 A 10/1975 Fleming
4,250,666 A * 2/1981 Rakestraw ............. A01G 9/023 47/DIG. 6
4,841,670 A * 6/1989 Bitter ....................... A01G 9/12 47/DIG. 6
8,250,810 B2 * 8/2012 Van Zijl ................... A01G 9/12 47/45
9,374,952 B1 6/2016 Cross
9,943,041 B2 * 4/2018 Harger ................... A01G 9/124
10,098,288 B1 * 10/2018 Escobedo ................ A47B 3/06
11,310,976 B1 4/2022 Cross
11,895,959 B2 * 2/2024 Massay .................... A01G 9/12
12,324,382 B2 * 6/2025 Winkler ................... A01G 9/12
2006/0162252 A1 7/2006 Lim
2012/0137578 A1 6/2012 Bradford
2012/0279122 A1 11/2012 Benne
2013/0283681 A1 10/2013 Malavenda
2014/0020292 A1 1/2014 McNamara
2015/0000190 A1 * 1/2015 Gibbons ................ A01G 31/02 47/79
2015/0223418 A1 8/2015 Collins
2015/0334930 A1 11/2015 Stoltzfus
2018/0014471 A1 1/2018 Jensen
2018/0352754 A1 12/2018 Brusatore
2021/0392823 A1 * 12/2021 Fortenbacher ........... A01G 9/24
2022/0007595 A1 1/2022 Schroeder
2022/0369570 A1 * 11/2022 Lord ........................ A01G 9/12
2023/0084525 A1 3/2023 Massey
2023/0210070 A1 7/2023 Abeygunawardana

FOREIGN PATENT DOCUMENTS

CN 111837707 A * 10/2020 ............... A01G 9/12
CN 114711057 A * 7/2022 ............... A01G 9/14
CN 112753421 B * 2/2024 ........... A01G 9/0293
CN 119547674 A * 3/2025 ............. A01G 7/045
CN 120167240 A * 6/2025 ............. A01P 21/00
WO WO2017109279 6/2017
WO WO2018035314 2/2018

* cited by examiner 300
303
305
301
203
308
315

320
326
303
325
305
322
203
308
330

322
303
340
345
203
308

230
210
233
235
235
235
237
237
236
231
210

230
210
630
233
235
605
102
237
232
236
231
635
640
410
210
441

5044
1600
5048
5054
200, 230

200, 230
5048
4208
4100
4230
5054

5210
5205
5223
200, 230

5277
200, 230
200, 230
5288
5266
5260

MODULAR SYSTEMS AND METHODS FOR PROPAGATING PLANTS IN HYDROPONIC AND AQUAPONIC ENVIRONMENTS

CROSS-REFERENCE TO RELATED APPLICATIONS

This application is a continuation of U.S. non-provisional application Ser. No. 17/803,166, filed Mar. 10, 2022, and entitled "MODULAR SYSTEMS AND METHODS FOR PROPAGATING PLANTS IN HYDROPONIC AND AQUAPONIC ENVIRONMENTS", which is a division of U.S. non-provisional application Ser. No. 16/166,124, filed Oct. 21, 2018 and entitled "MODULAR SYSTEMS AND METHODS FOR PROPAGATING PLANTS IN HYDROPONIC AND AQUAPONIC ENVIRONMENTS", which application claims the benefit of U.S. provisional application No. 62/578,457, filed Oct. 29, 2017 and entitled "MODULAR SYSTEM AND METHOD FOR PROPAGATING PLANTS IN HYDROPONIC AND AQUAPONIC ENVIRONMENTS," which applications are hereby incorporated by reference herein in their entirety.

FIELD OF THE INVENTION

The present invention relates generally to a modular system and method for propagating plants in hydroponic environments and/or propagating plants and aquatic animals in aquaponic environments. More so, the present invention relates to a modular system and method to propagate plants in a hydroponic environment and/or a system and method to propagate aquatic animals and plants in an aquaponic environment.

BRIEF DESCRIPTION OF THE DRAWINGS

The invention will now be described, by way of example, with reference to the accompanying drawings, in which:

FIG. 6A shows a side view and FIG. 6B shows a cutaway side view, in accordance with an illustrative embodiment of the present invention;

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

Figure 1:
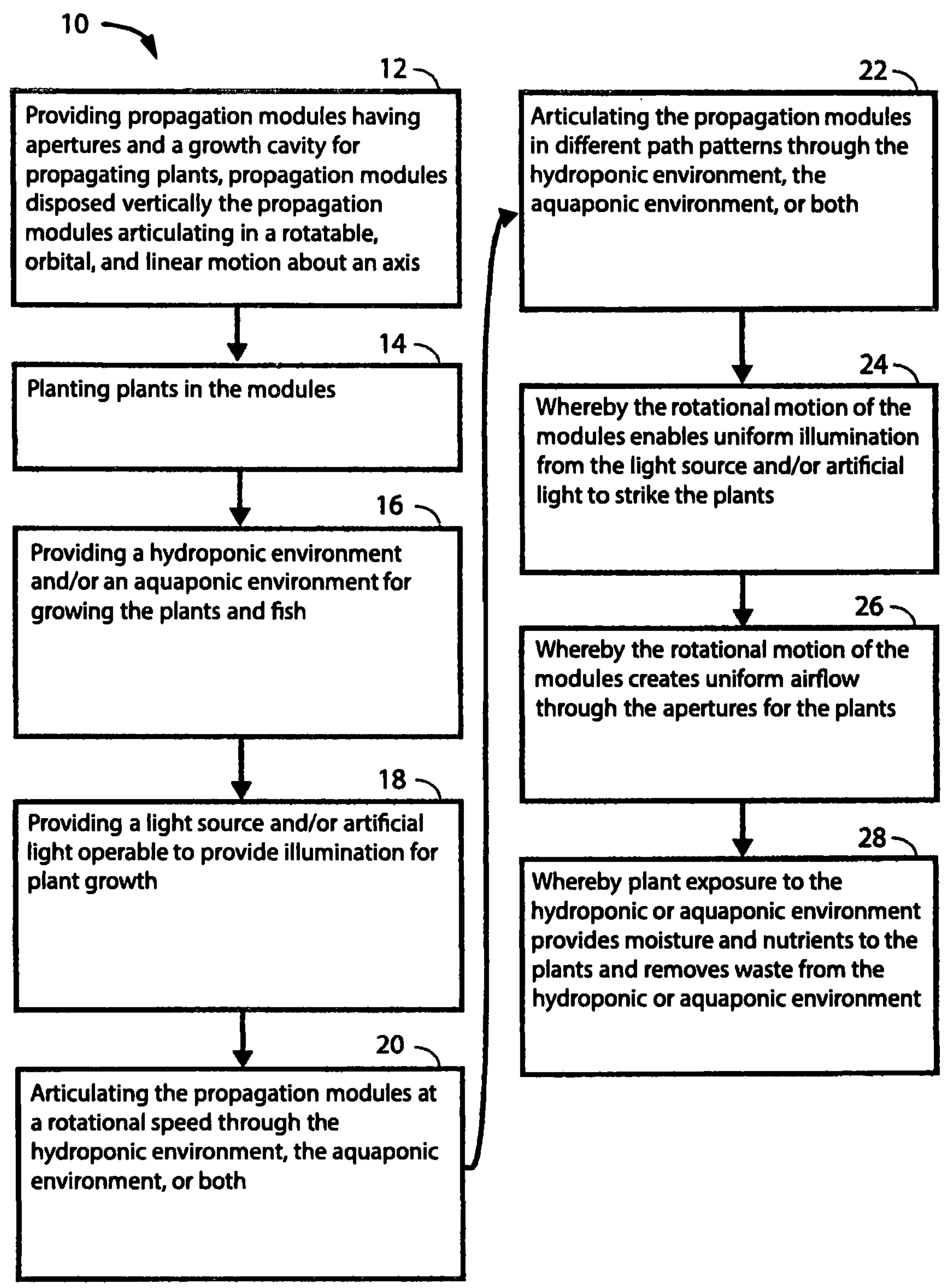
FIG. 1 illustrates a flowchart of an exemplary method for propagating plants in hydroponic and aquaponics environments, in accordance with an illustrative embodiment of the present invention.
Figure 59:
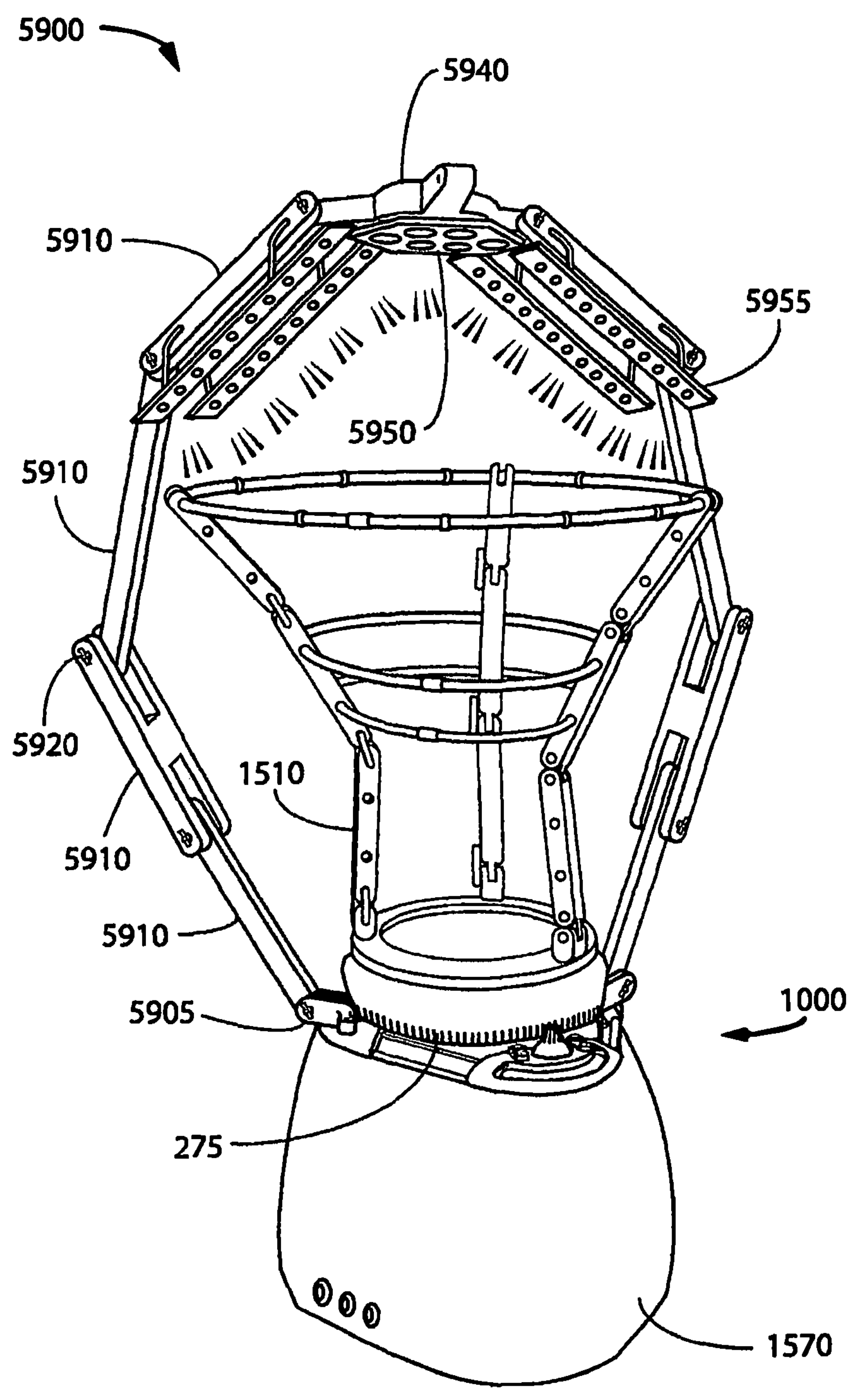
FIG. 59 illustrates a perspective view of a typical system having adjustable arms for holding lighting fixtures, in accordance with an illustrative embodiment of the present invention.

A modular system 900 and method 10 for propagating plants in hydroponic and aquaponics environments is referenced in FIGS. 1-59. The system 900 and method 10 may provide multiple propagation modules 200, 230 configured for general propagation of plants 101. The propagation modules 200, 230 may contain the plant 101 during propagation, and may orient the plant 101 in a substantially vertical position while simultaneously exposing the plant to uniform quantities of light, airflow, moisture, and fertilizer while articulating in a controlled rotational, orbital, and linear motion through hydroponic and aquaponics environments. The propagation modules 200, 230 can be interchanged and replaced in a modular configuration that allows: 1) each plant to be inserted into an individual propagation module for customized propagation; and 2) each plant to be independently harvested.

In some embodiments, the environment, fluid lines, drain lines, and even the propagation module 200, 230 can be switched to change the growth environment of the plant from the hydroponic environment to the aquaponic environment. Furthermore, in some embodiments, certain configurations of the system can be set to operate hydroponically, while other configurations can be set to operate aquaponically. This requires 2 separate modes (hydroponic+aquaponic) available for 1 system. The fluid supply lines and drain return lines may be, however, switched from aquaponic tanks (or system elements with aquaponic system water) over to a reservoir with properly mixed hydroponic nutrient. This could happen, for example, with plants growing in one of the modes during the switch.

For example and without limitation, a plant in a system configuration may rotate and grow for weeks or months in a vegetative growth phase of its life cycle. Upon being switched over or artificially induced to switch to reproductive growth, or "flowering", the nutrient solution is also switched. And the fluid supply lines and drain return lines may also be switched between the hydroponic and aquaponics environments through valves or physical line reconnections. Furthermore, the entire propagation module 200, 230 may be switched between the hydroponic and aquaponics environments.

The propagation modules 200, 230 may include a central cavity for holding the plants during propagation. The propagation modules 200, 230 may further include multiple apertures. The apertures may be sized and dimensioned to enable passage of air flow, light, moisture, and fertilizer to and from the plant during rotational, orbital, and/or linear articulation of the propagation modules. The apertures may be especially effective as the plant rotates and moves in an orbital or linear path through the hydroponic and/or the aquaponics environments. Further, the propagation modules may rotate in various controlled paths about a light source having adjustable intensities and wavelengths to achieve a desired growth rate and style of plant.

Figure 50A:
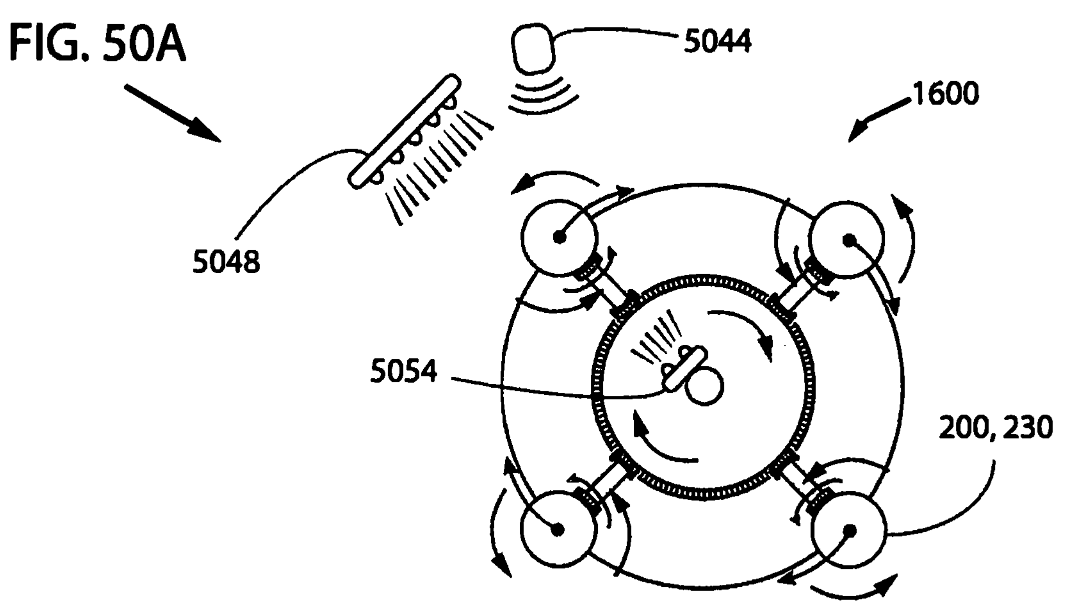
FIG. 50A illustrates an overhead view of rotation and path travel made by propagation modules held by the system, in accordance with an illustrative embodiment of the present invention.
Figure 50B:
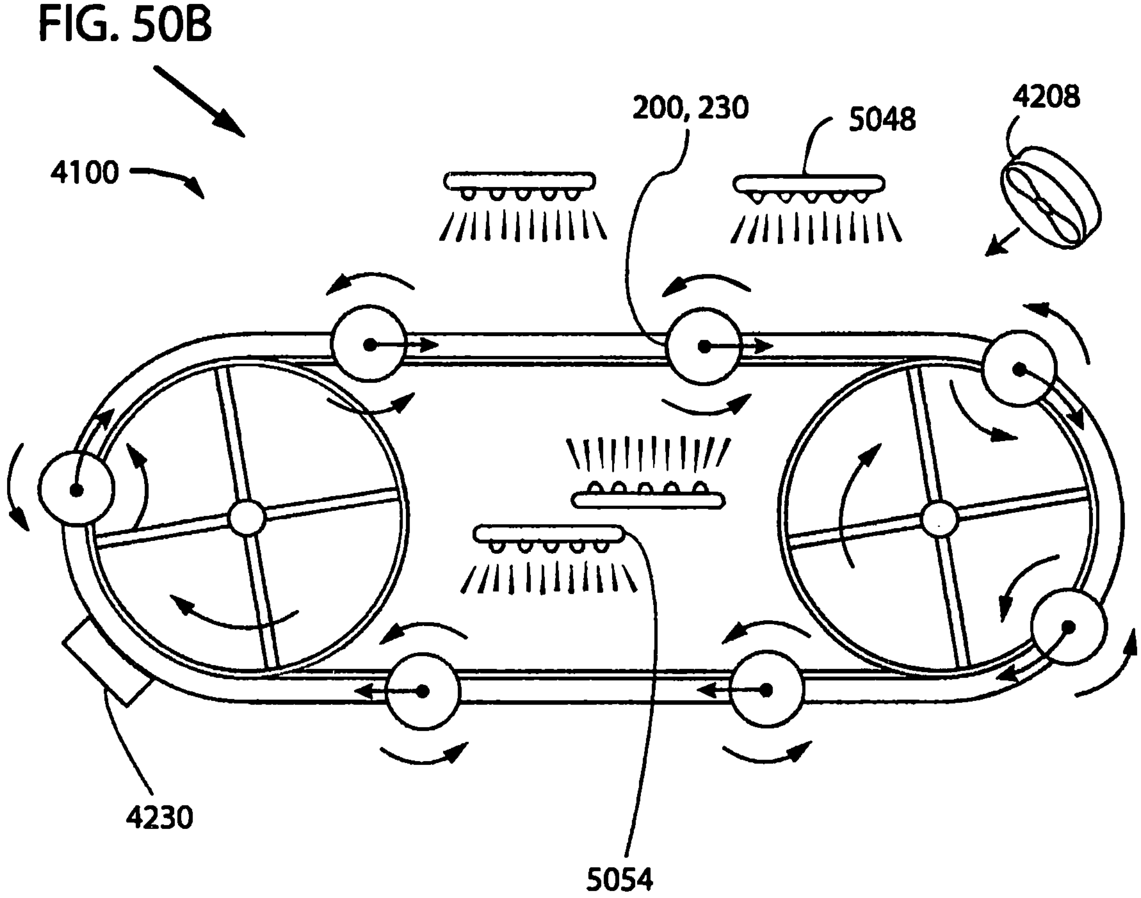
FIG. 50B illustrates an overhead view of a typical rotation and path travel of a loop system, in accordance with an illustrative embodiment of the present invention.

As shown in FIG. 50A-50B, the propagation modules 200, 230 may be vertically oriented, and may be rotatable about at least one axis, or at least one belt, or both, at variable rotational speeds, rotational paths, orbital paths, linear paths, and eclectic path patterns.

Figure 52A:
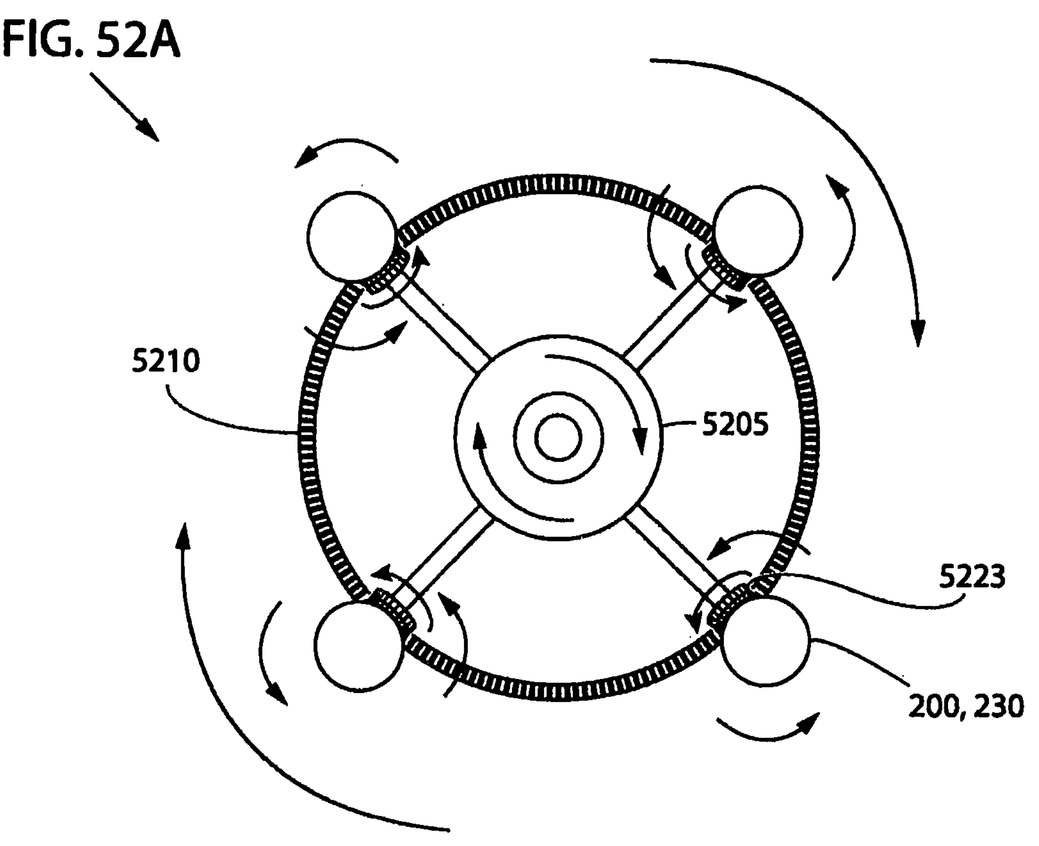
FIG. 52A illustrates an overhead view of a typical system configuration showing a fixed gear ring formed as part of a tank rim, in accordance with an illustrative embodiment of the present invention.

For example, and without limitation, FIG. 52A illustrates multiple, spaced-apart propagation modules 200, 230 rotating along a belt, conveyor, or other rotating mechanism known in the art, such as a rim mounted gear 5210, for example and without limitation, while each individual propagation module 200, 230 rotates about its axis, or arm. The propagation modules 200, 230 may rotate at a steady velocity to generate airflow through the plants. The surfaces of the plant may also receive light from different angles and intensities to achieve a specific growth rate and style. The propagation modules 200, 230 may also carry the plant through a hydroponic environment to obtain moisture and nutrients and/or an aquaponics environment to obtain nutrients such as nitrogenous waste, i.e., nitrate for nutritional value. This may also clean the aquaponics environment for more efficient fish propagation.

Thus, the vertical orientation of the propagation modules 200, 230, while being rotated in such a manner, may allow the plant 101 inside the propagation modules 200, 230 to receive enhanced air circulation and selective exposure to light, and may generally allow the plants to be exposed to various artificial lighting schemes and airflow patterns. The rotational velocity for each propagation module 200, 230 may also be adjustably varied, so as to accommodate different plant growing needs. Such controlled manipulation of the plants may allow an operator of the system 900 to grow the plants at a desired rate, style, and shape, based on the motion of the propagation modules 200, 230, which controls the plant's exposure to light, air, moisture, and nutrients.

In addition to the aperture propagation modules discussed above, the system 900 may include a root passageway for carrying and feeding roots of the plants during propagation. In some embodiments, the root passageway may provide a unitary conduit through which the roots of all the plants in all the plant site inserts extend. Thus, the roots may expand from their individual propagation modules 200, 230 into the root passageway where they may be exposed to moisture and fertilizer. The system 900 may also provide at least one fluid inlet that feeds the root passageway, or the individual propagation modules 200, 230, or both. The fluid inlets may also carry liquid growth solution, fertilizer, and/or other ingredients necessary for plant growth to the plants and their roots. In some embodiments, the system 900 may utilize trellis arms, grids, and/or spars as novel attachment points for training the plants inside their respective propagation modules 200, 230. This can be especially effective for vined plants, i.e. tomatoes.

In other embodiments, at least one light source, such as LED strips, for example and without limitation, may be disposed proximate to the plants. The light source may provide varying intensities and wavelengths of artificial light for efficient photosynthesis. As discussed above, the plant may articulate around the light source to achieve the desired growth rate, size, and style. In alternative embodiments, the light source may also articulate in conjunction with the propagation modules 200, 230 to achieve a desired lighting effect on the plant. The intensity, pulse, color, lumens, and wavelength of the light that is emitted from the light source may also be adjusted, as desired.

In some embodiments, an electrical conduit may be arranged along, or through, the central axis, root passageway, support arms, and propagation modules 200, 230. The electrical conduit may include wiring and circuitry for transmitting electrical power to the light source. In alternative embodiments, solar panels may be used to power the light source. In some embodiments, the various embodiments of the system, generally indicated by reference numerals 900, 1500 and 2200, respectively, and variations thereof, may use a motor for actuating the rotational velocity, rotational and orbital motions, and general path patterns of the propagation modules 200, 230.

Those skilled in the art will recognize that a hydroponic system is used for cultivation of plants in a water environment that does not require soil. In this environment, the nutrients are substantially supplied through the water.

With inorganic hydroponics, plant nutrients are readily available and do not require any further decomposition to be taken up by the plant. Inorganic hydroponics requires that nutrient solutions be measured out, monitored, and maintained at fairly precise levels. Nutrient formulas are often divided into separate mixtures to prevent precipitation of nutrient components. Furthermore, flushing and disposal of spent nutrient solution is often required. Inorganic hydroponics often necessitate that the system 900 be run more cleanly, which means the system 900 is clear of bacterial and fungal populations that may cause problems in operation and plant production.

With organic hydroponics, nutrient uptake by the plants is helped along by other organisms, such as fungi, bacteria, and animals, for example and without limitation, in the nutrient pathway. These organisms may produce, change, breakdown, or otherwise interact with the nutrient components and assist with nutrient uptake to the plant. Aquaponics teaches the cultivation of fish or other aquatic animals and plants together in a growth system. The waste product from at least one aquatic animal 120 and aquatic animals is converted by natural, bacterial cycles into nutrients that are usable by the plants. Plants incorporate nutrients into plant tissue, and thus remove waste/nutrients from the water. And thus, the water in the system 900 may be filtered and otherwise conditioned for the benefit of the fish. In this manner, both the aquatic animal 120 and the plant benefit.

Certain configurations of the system 900 may be well-suited for interior and exterior design and green walls. Other configurations of the system 900 may be suitably adapted for learning systems in schools. Non-limiting examples may include teaching tools helpful for learning more about sustainability, botany, biology, ecology, physics, math, and chemistry. Yet other configurations of the system 900 may be well-suited for home food production.

Those skilled in the art will recognize that the system 900 may allow for an efficient aqua cultural space that can fit below an efficient plant growing space, thereby conserving space. In some embodiments, the system 900 may be operated to conserve water and/or other resources in a sustainable manner, with the ability to integrate with aquaponic growth systems for raising fish food and recycling waste from aquatic animal 120 and aquatic animals.

As discussed above, the system 900 is efficacious for not only growing plants, but also growing aquatic animal 120 in an aquaponics environment. In some embodiments, system 900 may utilize bio filter material inside of a filter propagation module 290 and a flow scrim inside of propagation modules 200, 230.

One aspect of a method 10 for propagating plants in hydroponic and aquaponics environments may include:

- providing at least one propagation module having sidewalls forming multiple apertures and at least one growth cavity for receiving and growing at least one plant, the at least one propagation module disposed in a generally vertical orientation, the at least one propagation module articulating in a rotatable, orbital, and/or linear motion about at least one axis;
- planting the at least one plant in the at least one growth cavity in the at least one propagation module;
- providing at least one hydroponic environment and/or at least one aquaponic environment for growing the at least one plant and/or at least one aquatic animal;
- providing at least one artificial light operable to provide illumination for growth of the at least one plant;
- articulating the at least one propagation module at different rotational speeds through the at least one hydroponic environment, the at least one aquaponic environment, or both;
- articulating the at least one propagation module in different path patterns through the at least one hydroponic environment, the at least one aquaponic environment, or both;
- whereby articulation of the at least one propagation module enables uniform illumination from the artificial light to strike the at least one plant inside the at least one propagation module.

In another aspect, the path pattern of the at least one propagation module may include a panning light pattern to contact the surface of a plant leaf from numerous angles.

One objective of the present invention is to grow at least one plant in at least one vertical propagation module that may rotate at different speeds and may follow different path patterns, so as to expose the at least one plant to more uniform airflow and light.

Another objective is to allow roots from the at least one plant to join at a central passageway, so as to save space.

Yet another objective is to allow plants that are ready for harvest to be transported inside their respective propagation modules to a point of retail and removed from the propagation modules at the point of retail.

Yet another objective is to allow the plants to be exposed to light at different angles, so as to optimize exposure to the leaves, stems, flowers, and fruit.

Yet another objective is to orient all of the propagation modules in a vertical direction to save space.

Yet another objective is to make the propagation modules interchangeable for more efficient planting and harvesting of the plants.

Yet another objective is to reduce the amount of fans that are needed to aerate the plants by deploying the plants in a vertical orientation inside at least one propagation module having multiple apertures, such that stratification of the air is minimized.

Yet another objective is to adjust the intensity of the light by moving the light closer and further from the propagation module, or by rotating and moving the propagation module closer and further to the light.

Yet another objective is to adjust the growth rate and style of the plant, such as to achieve fuller and wider leaves, for example and without limitation, by varying the illumination to which the plants are subjected.

Yet another objective is to provide a system for growing plants that is modular, portable, and inexpensive to operate.

FIG. 1 illustrates a flowchart of an exemplary method 10 to propagate plants in hydroponic and aquaponics environments. The method 10 may include an initial Step 12 of providing at least one propagation module having sidewalls forming multiple apertures and at least one growth cavity for receiving, growing and propagating at least one plant, the at least one propagation module movable in a rotatable, orbital and/or linear motion about an axis, the at least one propagation module disposed in a generally vertical orientation.

The method 10 may further include a Step 14 of planting the at least one plant in the at least one propagation module. A Step 16 may include providing at least one hydroponic environment and/or at least one aquaponic environment for growing the at least one plant and/or at least one aquatic animal. In some embodiments, a Step 18 may include providing at least one artificial light operable to provide illumination for plant growth. A Step 20 may include rotating or articulating the at least one propagation module at different rotational speeds in the at least one hydroponic environment and/or the aquaponic environment. In some embodiments, a Step 22 may include moving or articulating the at least one propagation module through different path patterns between the at least one hydroponic environment and/or the at least one aquaponic environment. A Step 24 may include the result that the vertically oriented propagation modules are uniformly illuminated during rotation and movement through different path patterns.

Another Step 26 may include the result that the rotational and orbital motion of the propagation modules creates uniform airflow through the apertures for the at least one plant. A Step 28 may include the result that plant exposure to the hydroponic and/or aquaponic environment provides moisture and nutrients to the at least one plant and removes waste from the hydroponic and/or aquaponic environment.

Although the process-flow diagrams of the disclosure show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

Figures 2A, 2B, 2C:
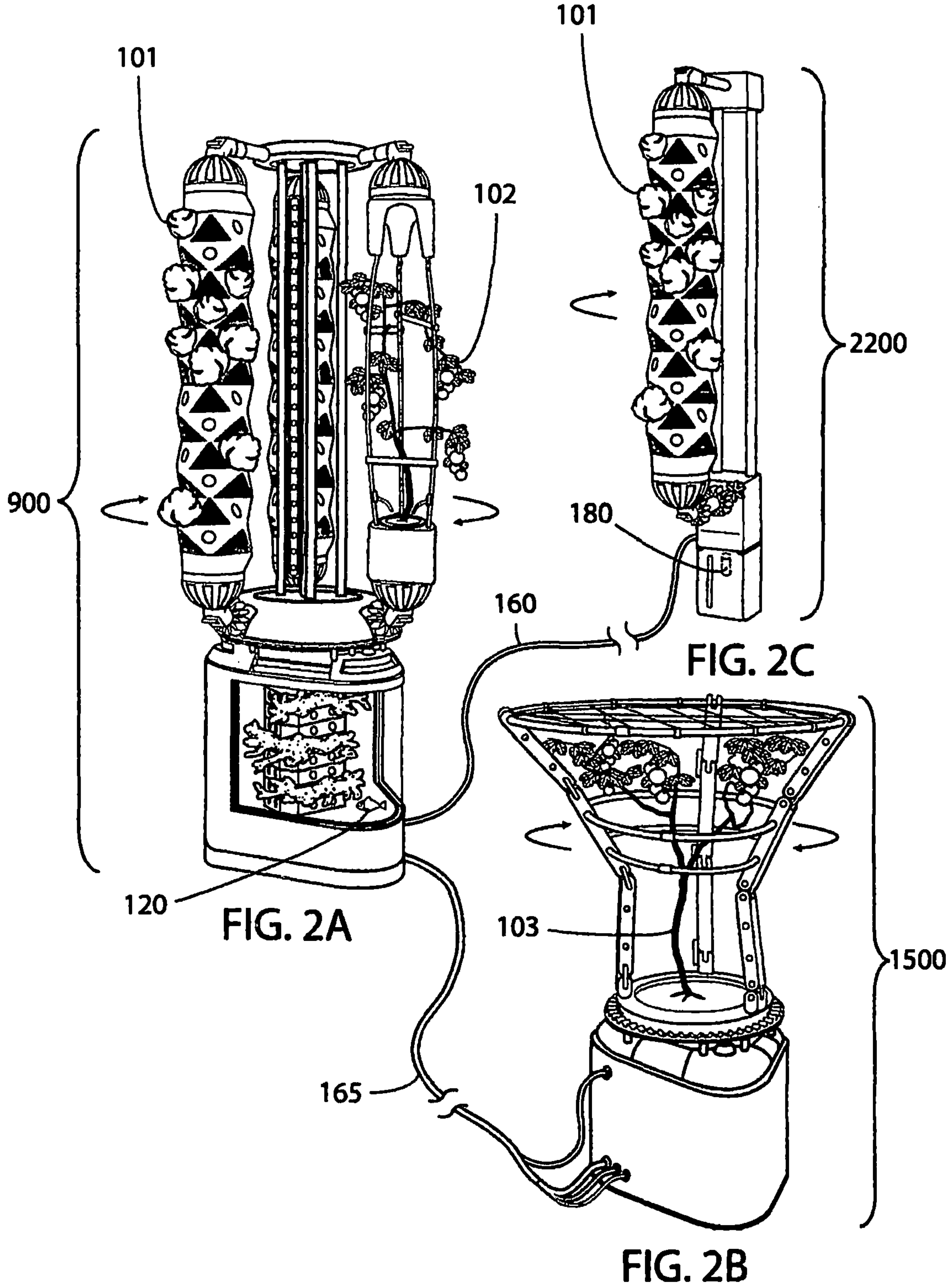
FIGS. 2A, 2B, and 2C illustrate perspective views of three different embodiments of the system for propagating plants in hydroponic and aquaponics environments, in accordance with an illustrative embodiment of the present invention.

FIGS. 2A, 2B, and 2C illustrate perspective views of three different illustrative embodiments of the system 900, 1500, 2200, respectively, for propagating plants in hydroponic and/or aquaponics environments. These three variations of systems 900, 1500, 2200 can be operated as independent, stand-alone systems, or joined together in eclectic connective means, such as with a fluid line 160 that serves to connect system 2200 with system 900, for example and without limitation, so that fluid is transferred to system 2200 as needed with the use of a float valve assembly 180, for example and without limitation. System 900 (FIG. 2A), System 1500 (FIG. 2B), and System 2200 (FIG. 2C) may be joined together using various connectivity means known in the art, including but not limited to a connection bundle 165. In some embodiments, the connection bundle 165 may include at least one supply line, at least one return line, at least one airline, and at least one power connection. Various other connection setups and system configurations are also possible in other embodiments.

As illustrated in FIG. 2A, in some applications, the system 900 may operate in an aquaponic environment. The system 900 may include at least one aquatic organism, such as at least one fish and/or other aquatic animal 120 that produces waste, for example and without limitation. The waste may contain many elements that may serve as plant nutrients, including nitrogenous waste such as ammonia. Naturally-occurring nitrifying bacterial populations living on system components, such as bio filter material (not illustrated) inside of a filter propagation module 290 (FIG. 3D) and/or a flow scrim 425 (FIG. 5B) inside of respective propagation modules 200, 230, and/or other system components, for example and without limitation, may convert the ammonia to nitrite. Other nitrifying bacterial populations may convert the nitrite to nitrate, which may be readily absorbed by plants 101, 102, 103 in the system 900 or in interconnected systems. This process of waste conversion and uptake may also serve to clean the system water for the benefit of the aquatic animals 120.

Figure 9:
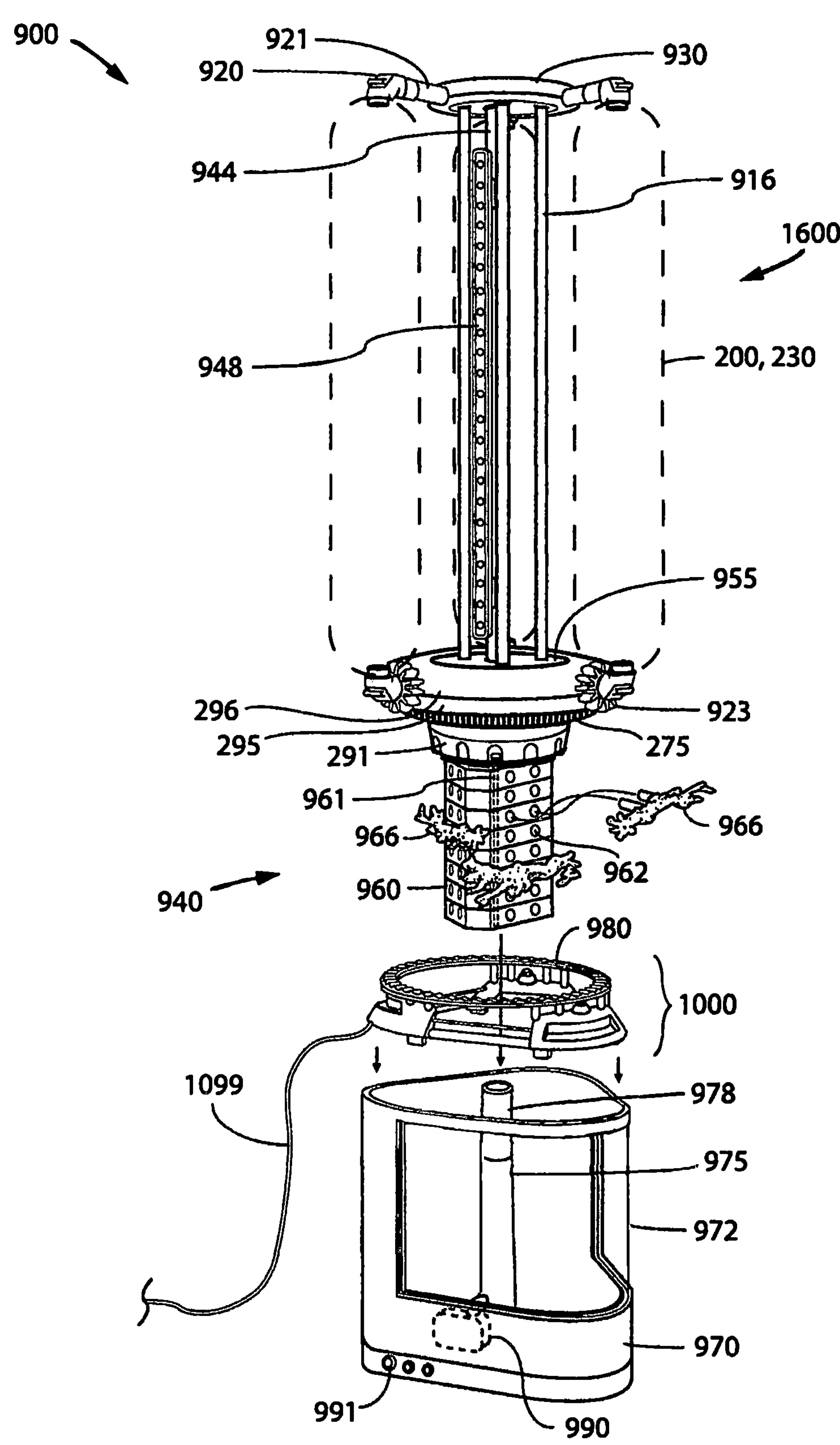
FIG. 9 illustrates a partially exploded side view of the system, in accordance with an illustrative embodiment of the present invention.

As illustrated in FIG. 9, in some embodiments, the lower section of the system 900 may include at least one tank 970 that holds water and the aquatic animals 120. The weight of the water in the tank 970 may additionally steady the propagation modules 200, 230. The tank 970 may also include at least one window 972 through which the aquatic animals 120 may be viewed. In some embodiments, stackable habitat hubs 960 may be provided on the tank 970. The propagation module or modules 200, 230 may be supported by the habitat hubs 960. A fixed gear ring 980, typically bolted or otherwise mounted to risers 1056 (FIG. 10) on the modular drive assembly 1000, may be interposed between the tank 970 and the propagation module 200, 230 to facilitate rotation of the propagation module 930 relative to the tank 970. The habitat hubs 960 may be formed with openings 962 that facilitate attachment of habitat features 966 to the habitat hubs 960. The openings 962 may further facilitate connection of habitat connecting rods 961 to the habitat hubs 960. Accordingly, the habitat connecting rods 961 may serve to hold the habitat hubs 960 together in an assembled configuration. The habitat connecting rods 961 may insert through respective openings (not illustrated) inside or in the bottom of a filter propagation module basin 291 (FIG. 3D) of the filter propagation module 290.

In some embodiments, the habitat hubs 960 may be formed of polyethylene plastic, cast resin, and/or other suitable materials. The habitat hubs 960 may be substantially hollow or contain air pockets (not illustrated) so that when joined with the habitat features 966 and the habitat connecting rods 961, the entire habitat assembly 940 weighs less in the water due to natural buoyancy. The habitat features 966 may be made from cast resins such as poly-resin, and/or other suitable fish safe material. The habitat features 966 may additionally or alternatively be made from natural materials such as driftwood and/or coral, for example and without limitation.

Alternatively, in some embodiments, the habitat hubs 960 and habitat connecting rods 961 may be replaced by a basket or gridded cylinder (not illustrated) to which the habitat features 966 may be attached or wired. In this manner, the entire rotatable habitat assembly 940 may serve to provide a unique, aesthetic look to the tank 970 as well as an attachment area for aquatic plants as well as provide cover for aquatic animal 120 living in the tank 970. The habitat features 966 may also serve as platforms or attachment areas for eggs (not illustrated) during spawning by the aquatic animal 120.

The tank 970 may be made from polyethylene plastic, and/or other suitable material. The tank 970 may be formed so that at least one window 972 or set of windows 972 may be securely attached to the tank 970 and remain watertight therewith. As further illustrated in FIG. 9, the tank 970 may be fitted with connection points 991 for connection with the fluid lines 160 (FIGS. 2A-2C), connection bundles 165, and/or other equipment.

The connection points 991 may tie in with internal lines or fluid pathways or conduits (not illustrated) in the tank 970 for conducting air, water, and electricity to portions of the system 900, and for distributing water out to a pump (not illustrated) or other system, and/or removal of waste from the water. The connection points 991 may be of the type of a quick connect or a snap-in, screw-in or slip-in connection. In some embodiments, the connection points 991 may include integrated shutoff valves. Any electrical connections with the connection points 991 may be watertight according to the knowledge of those skilled in the art to prevent electrical issues.

As further illustrated in FIG. 9, the tank 970 may be fitted with a center column base 975 that connects with a mast coupling segment 978. The mast coupling segment 978 may connect with and support a mast 944 in the propagation module 200, 230. The center column base 975 may be formed as part of the tank 970, or alternatively, as a separate part, such as a 2-inch or 3-inch diameter PVC pipe section that is seated into a bulkhead fitting located on the floor of the tank 970, for example and without limitation. In some embodiments, the tank 970 may sit atop and otherwise connect to a tank base 3080, such as in the system 3000 illustrated in FIG. 30. A pump 990 may be disposed in fluid communication with the center column base 975 to pump system water from the tank 970 through the system 900 in typical operation of the system 900

In some non-limiting embodiments, the window 972 may be fabricated from LEXAN™, polycarbonate, and/or other suitable clear or tinted transparent material. The window 972 may be heat-formed into a wedge shape with a rounded fold and fitted to a groove or corresponding mating surface (not illustrated) on the tank 970. In some embodiments, the window 972 may also be sealed and bolted into place.

The top of the tank 970 may be formed in such a manner as to fit snugly with the lower portion of the modular drive assembly 1000. The tank 970 may provide support to the modular drive assembly 1000 and to the upper portions of system 900. The tank 970 may also serve as a load-bearing member. The tank 970 and the window 972 may be fashioned with sufficient thickness and structure to support the load or weight of the propagation module 200, 230.

Figure 10:
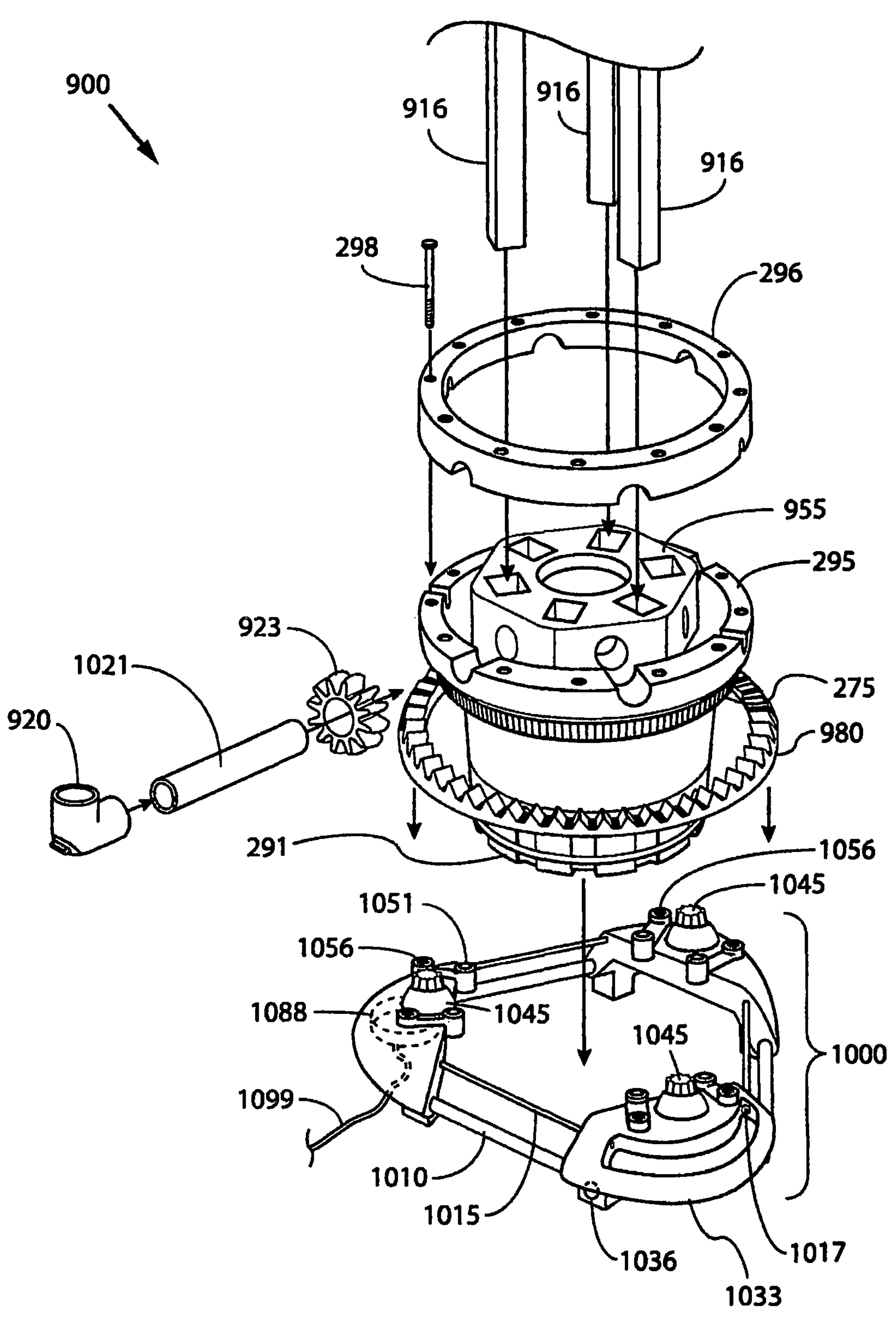
FIG. 10 illustrates a detail exploded view of system, in accordance with an illustrative embodiment of the present invention.

Referring next to FIG. 10, in some embodiments, the modular drive assembly 1000 may include three or more corner segments 1033. Each corner segment 1033 may have slots or attachment points (not illustrated) to accept upper connection rods 1015 and lower connection segments 1010. The lower connection segments 1010 may be fabricated from steel tubing, aluminum extrusion, and/or other suitable material. The upper connection rods 1015 may be fabricated from metal and/or other suitable material. Furthermore, the upper connection rods 1015 may be formed with threaded ends, with each end attaching or passing through a corner segment 1033 and an adjustment nut 1017 that is attached to the passed-through end of the upper connection rod 1015. The upper connection rod 1015 may be used to adjust the precise distance between the adjacent corner segments 1033, which may, in turn, adjust the distance between drive/idler cogs 1045 on the respective corner segments 1033.

The drive assembly corner segments 1033 may be fabricated from plastic and/or other suitable material and may also serve as a platform to hold the drive/idler cogs 1045. Each corner segment 1033 may include a corresponding drive/idler cog 1045, with one of the corner segments 1033 housing a motor 1088. The motor 1088 may include a shaft (not illustrated) that inserts into an indexed shaft opening (not illustrated) on the underside of corresponding drive/idler cog 1045. This arrangement may enable the motor 1088 to turn the attached drive/idler cog 1045, which may in turn engage a driven base ring 275. The other drive/idler cogs 1045 may be journaled for rotation on respective cog mount posts (not illustrated) on the corresponding corner segments 1033. The drive/idler cogs 1045 may be formed of resin, plastic and/or other suitable material, and may be fitted with a shaft indexing insert or roller bearings (not illustrated) to facilitate effortless rotation while serving in an idler function. The driven base ring 275 may be molded into the filter module lower ring 295, or alternatively, may be attached to the filter module lower ring 295 using bolts and/or other mechanical fasteners (not illustrated).

The corner segments 1033 may also serve as attachment points for risers 1056 and driven base ring support rollers 1051. The risers 1056 may be fabricated from metal and/or plastic tubes that allow a bolt and/or a pin to pass through the center of each riser 1056. The risers 1056 may support a fixed gear ring 980, which may be attached to the risers 1056 on the corner segments 1033 with bolts and/or pins. The driven base ring support rollers 1051 may be fabricated from plastic and/or other suitable material, and may serve to support and allow rotation of the driven base ring 275. The corner segments 1033 may also have openings or attachment points 1036 that accept drive support arms 3110 (FIG. 31) for adapting the modular drive assembly 1000 to fit into other tank setups.

Figure 14:
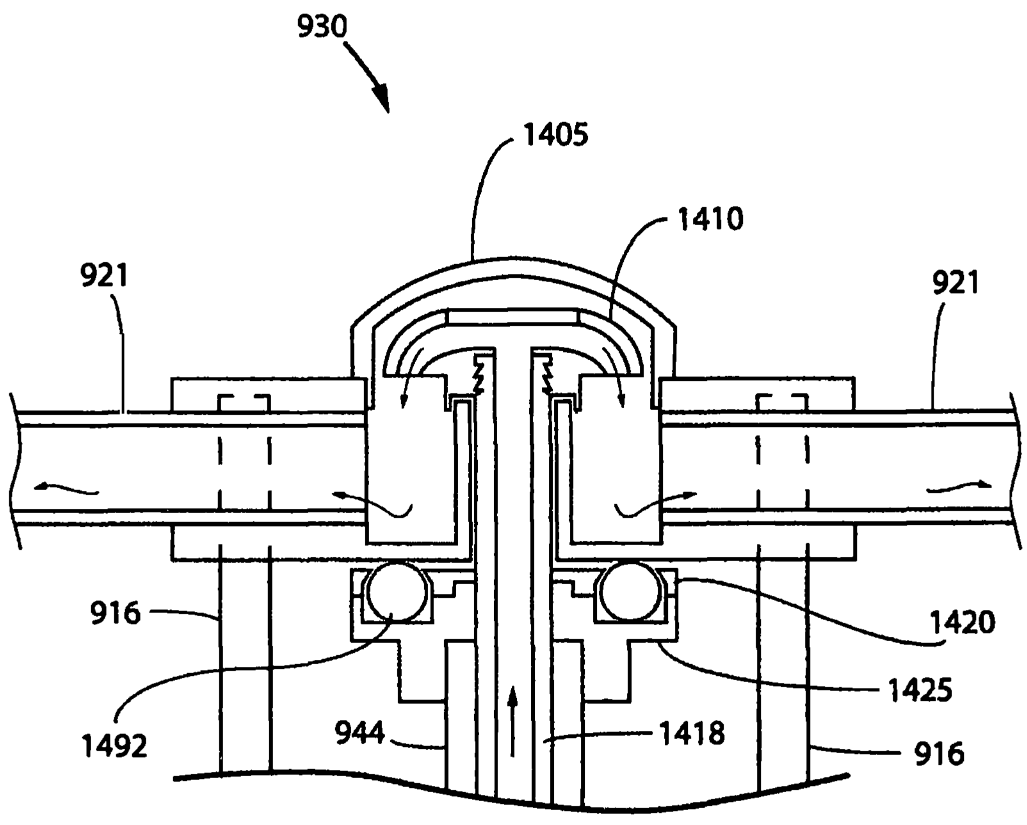
FIG. 14 illustrates a sectioned side view of a top carousel hub, in accordance with an illustrative embodiment of the present invention.

Referring next to FIGS. 9, 10, 11, 14 and 16, in some embodiments, the modular drive assembly 1000 may support and rotate a carousel 1600 of the system 900. As illustrated in FIG. 9, the carousel 1600 may include a top carousel hub 930 with multiple openings or pass-throughs (not illustrated) that are adapted to accept generally horizontally oriented fluid conducting arms or upper arms 921. The top carousel hub 930 may also include openings (not illustrated) to accept at least one carousel support 916 and an opening in the center to allow for a mast center pipe 1418 (FIG. 14) to reach the interior portion of the top carousel hub 930. As illustrated in FIG. 14, a top cap 1405 may also be fitted to the top carousel hub 930 to keep water contained, and to keep dust, bugs, and other contaminants out. The top carousel hub 930 may be fabricated from plastic or other suitable materials.

In some embodiments, the carousel supports 916 may be formed of metal tubing, extruded aluminum, and/or other material. The carousel supports 916 may serve to keep the top carousel hub 930 and bottom carousel hub 955 (FIG. 9) aligned and separated at the proper distance. In this manner, the upper arms 921 and lower arms 1021 with elbows 920 attached are at the proper distance to allow for the proper insertion and removal of propagation modules 200, 230.

As illustrated in FIG. 10, in some non-limiting embodiments, lower arms 1021 may be inserted into respective arm openings (not numbered) in the bottom carousel hub 955 and clamped between a filter module upper ring 296 and a filter module lower ring 295. The filter module lower ring 295 may also be attached to driven base ring 275 typically with bolts 298 that pass through the upper ring 296. Alternatively, the filter module lower ring 295 and driven base ring 275 may be integrally formed as one unit. The removable driven base ring 275 may allow for insertion of a filter module basin 291 which may additionally secure the driven base ring 275.

The fluid conducting upper arms 921 (FIG. 9) and the lower arms 1021 (FIG. 10) may be fabricated out of standard PVC pipe having a diameter of 1 inch. As illustrated in FIG. 9, the upper arms 921 and the lower arms 1021 may have elbows 920 attached at their ends. This interconnection may be indexed so that the elbows 920 are maintained in proper alignment. The elbows 920 may be fabricated from PVC or other suitable material and may be molded with articulation points 1301 (FIG. 11) to aid in the insertion or removal of the propagation modules 200, 230 by human operators or automated equipment.

Figure 12:
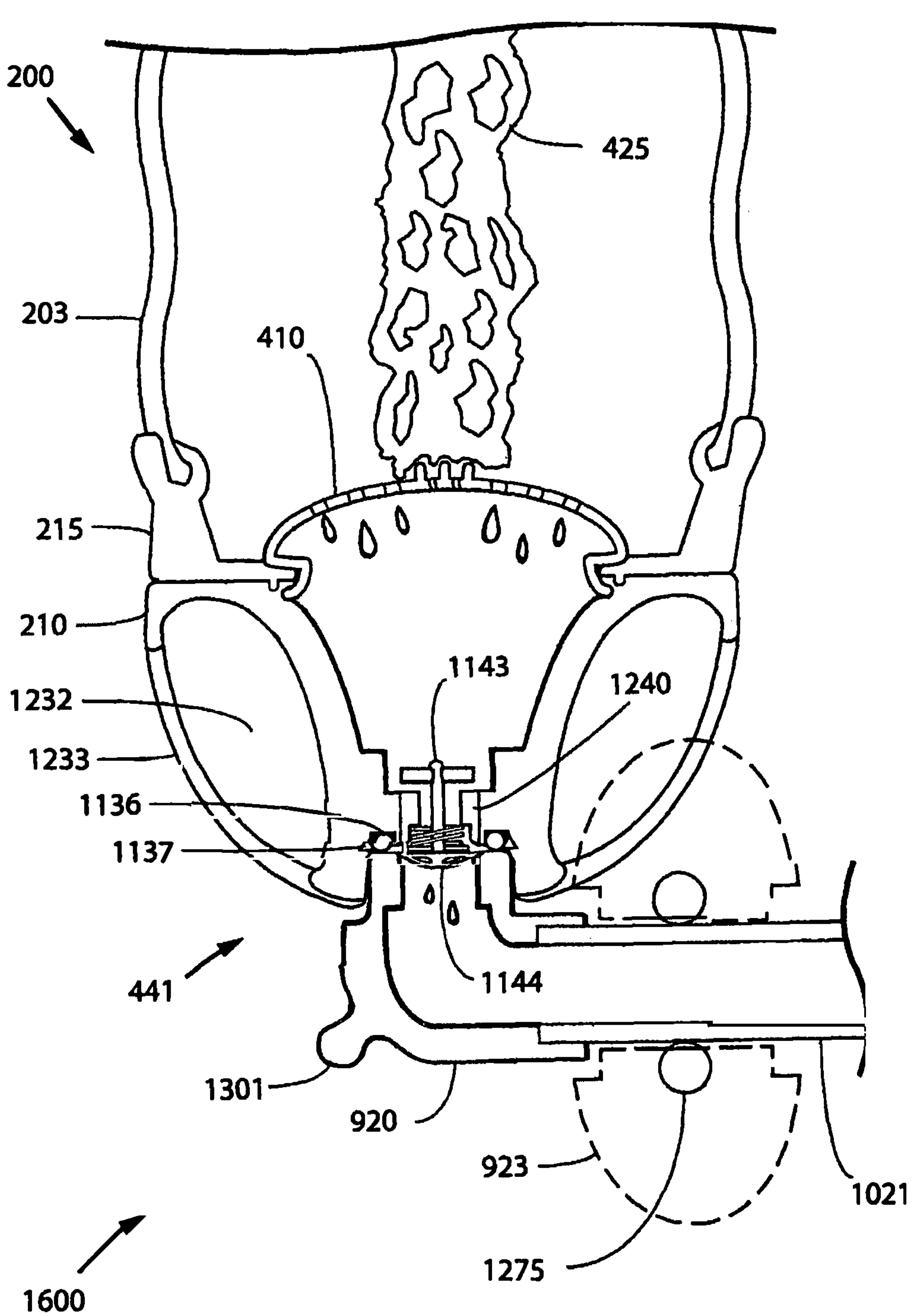
FIG. 12 illustrates a cutaway side view of the bottom connection made by a tube type propagation module to an elbow fitted onto a lower arm, in accordance with an illustrative embodiment of the present invention.

As further illustrated in FIG. 10, in some embodiments, geared rollers 923 with open centers to allow lower arms 1021 to pass-through, may be located at the bottom portion of the carousel 1600 where they are free to spin around the outside of the lower arms 1021. This free spinning function may be aided by ball bearings 1275 (FIG. 12). The geared rollers 923 may be prevented from sliding off the respective lower arms 1021 by the elbows 920 attached to the lower arms 1021. This attachment may be glued, indexed, or otherwise attached so that the elbows 920 are kept in proper alignment. The geared rollers 923 may engage with the fixed gear ring 980 of the drive assembly 1000.

The openings in the center of the bottom carousel hub 955 and filter module basin 291 allow for the mast 944 (FIG. 10) and the mast center pipe 1418 (FIG. 14) located inside the mast 944 to pass through. In some embodiments, the mast 944 may be fixed and non-rotatable. In some embodiments, the mast 944 may be fabricated from metal tubing, plastic pipe, and/or other suitable material. As illustrated in FIG. 9, the mast 944 may be coupled to the mast coupling segment 978 on the center column base 975 in the tank 970 and held securely in a vertical position. An electrical connection (not illustrated) may extend through the side of the mast coupling segment 978. The electrical connection may feed power to numerous light bars 948 that may be attached to brackets (not illustrated) on the mast 944. The opening in the electrical connection may pass through the side of the mast coupling segment 978. The mast coupling segment 978 may be sealed with a grommet to prevent any water entry.

The electrical connection points with the light bars 948 may be waterproofed. In some embodiments, the light bars 948 may include multiple LEDs that emit frequencies of light which are efficacious for growing plants. The light bars 948 may also include fixtures that mount fluorescent tube lights. In other configurations, the system 900 may be operated without light bars 948 that attach to the mast 944. Rather, lights may be positioned at the side of the system 900 to enable light to reach the plants 101, 102 growing in the propagation modules 200, 230. In yet other embodiments, the system 900 may utilize natural sunlight and the rotation of the carousel 1600 and rotation at the propagation modules 200, 230 to ensure uniform airflow and light exposure to the plants 101, 102 inside the propagation modules 200, 230.

Figure 34:
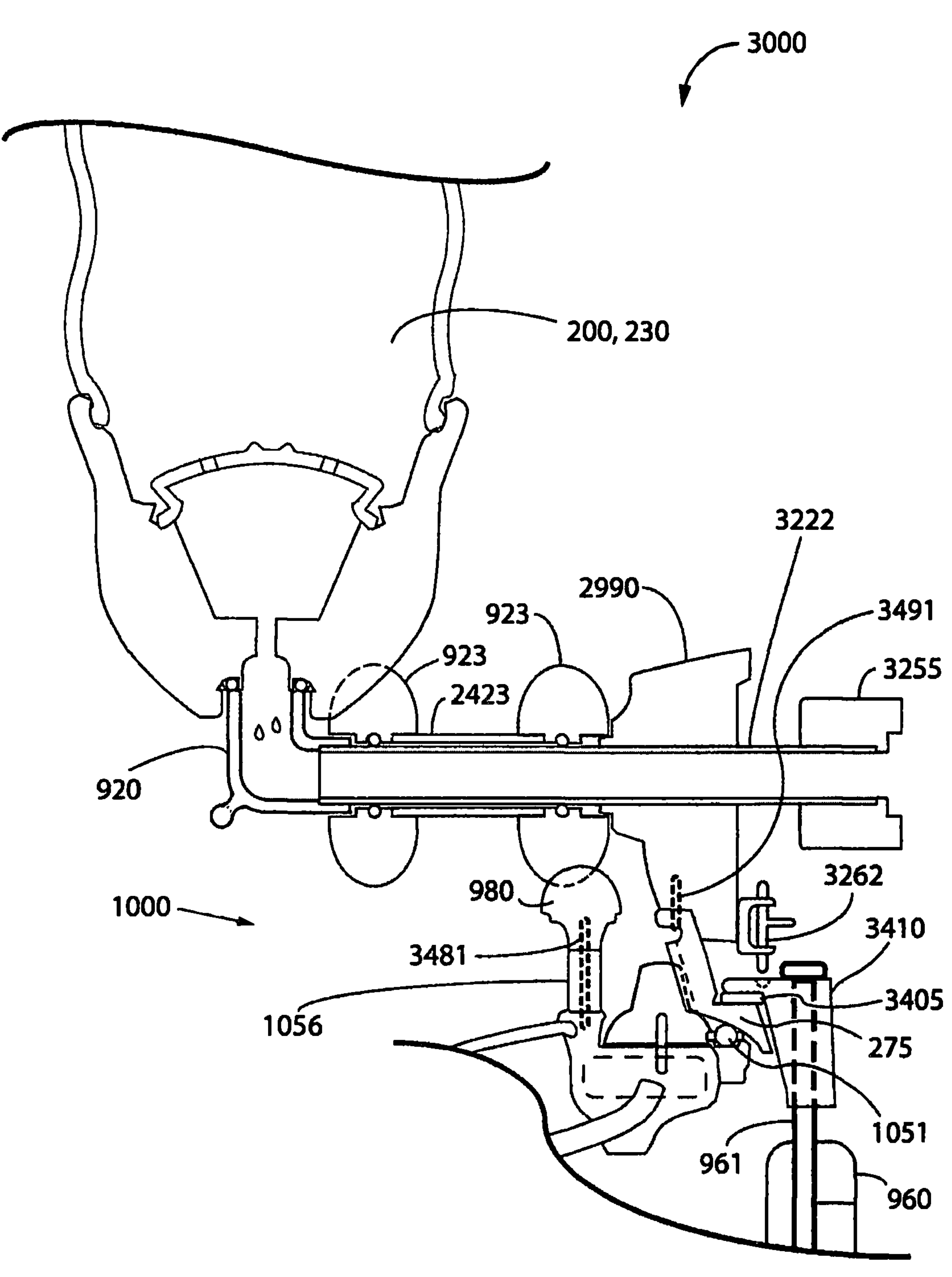
FIG. 34 illustrates a cutaway detail side view of the the drive assembly and engagement with the lower portion of the carousel of the system, in accordance with an illustrative embodiment of the present invention.

The carousel 1600 may be set up to hold the filter module basin 291 so that the filter module basin 291 is free to rotate independently of the carousel 1600. The upper part of the filter module basin 291 that is held between the filter module lower ring 295 (FIG. 10) and the driven base ring 275 may be formed with a lip or rim which may rest on a ring washer or a number of ring washers 3405 similar to what is illustrated in FIG. 34. The ring washer 3405 may also aid the filter module basin 291 in rotating independently of the carousel 1600. This independence may allow the aquatic habitat assembly 940 to turn at a reduced rate compared to the rotation of the carousel 1600. In this way, the drag on the habitat features 966 and other parts of the habitat assembly 940 from the water may not be fully transferred to the carousel 1600 but sufficient friction may remain between the filter module basin 291 and the driven base ring 275, or between the ring washers 3405 if used to gently coax the filter module basin 291 and attached habitat assembly 940 to turn about inside the tank 970 when filled with the water that contains the aquatic animal 120.

The filter module basin 291 may contain filter material such as lava rock, clay pebbles, filter pads, and/or other materials that act as biological surface area and a substrate for nitrifying bacteria. As it returns to the tank 970 from the propagation modules 200, 230 by way of the lower arms 1021, system water may drop to the filter module basin 291 and the filter material contained therein. The water may then enter the tank 970 through openings in the side of the filter module basin 291.

With the carousel 1600 in place, the propagation modules 200, 230 may be set into place. The propagation modules 200, 230 may be held between the elbows 920 set on the upper arms 921 and lower arms 1021. The propagation modules 200, 230 may spin about their center axes and orbit around and along with the rotation of the carousel 1600. The spinning motion of the propagation modules 200, 230 may be facilitated by engagement with a geared cap 210 and the geared rollers 923. As they simultaneously orbit and spin, the propagation modules 200, 230 may also be irrigated by system water through the mast center pipe 1418. As illustrated in FIG. 14, the system water may be discharged from the mast center pipe 1418 through a diverter cap 1410 which may be threaded onto the mast center pipe 1418.

As further illustrated in FIG. 14, from the diverter cap 1410, the system water may then fall into a center cavity (not numbered) in the top carousel hub 930 and may travel through the upper arms 921, through the elbows 920, and finally to the propagation modules 200, 230. The system water, which may also be considered the nutrient solution, may then fall through the propagation modules 200, 230 and through the elbows 920 and lower arms 1021, respectively. The system water may then travel through the bottom carousel hub 955 and the filter module basin, respectively, and finally, to the tank 970. A pump 990 (FIG. 9) may be located inside or outside the tank 970 and disposed in fluid communication with the center mast pipe 1418 to pump and force the water from the tank 970 through to the center mast pipe 1418. In some embodiments, the pump 990 may be connected with the center mast pipe 1418 through the side of the center column base 975, as illustrated in FIG. 9, or alternatively, through a connecting line (not illustrated) that runs to the outside of the tank 970 and supplies the center mast pipe 1418 via one of the connection points 991 on the outside of the tank 970.

In other embodiments, the pump may be remotely located from the system 900. In some embodiments, a connection bundle 165 (FIG. 2B) could be used to connect the pump with the system 900. In some embodiments, the pump may be situated inside of a side mount assembly, similar to the side mount assembly 1950 illustrated in FIG. 19. The side mount assembly 1950 may also contain an air pump and connections for air, water, and electricity as well as distribution points for connecting to other systems such as water flowing to the system 2200 from the system 900, or water recirculating with the system 1500 and the system 900, as illustrated in FIG. 1. The side mount assembly 1950 may also contain pH, temperature, or other sensors with an LCD screen or other readout or interface.

FIGS. 3A, 3B, 3C and 3D show four types of rotatable propagation modules 200, 230, 270 and 290, respectively. Propagation module 200 is a rotatable module that is substantially vertically orientated. Propagation module 230 is an open center type module for vertical orientation. Propagation module 270 is a planter type module that fits into a drive assembly 1000 (FIG. 9). The propagation module 290 may be a filter-type module that may also be considered to be part of system support structure when configured to be part of the carousel 1600, and may also fit into a drive assembly 1000.

Figures 3A, 3B, 3C, 3D:
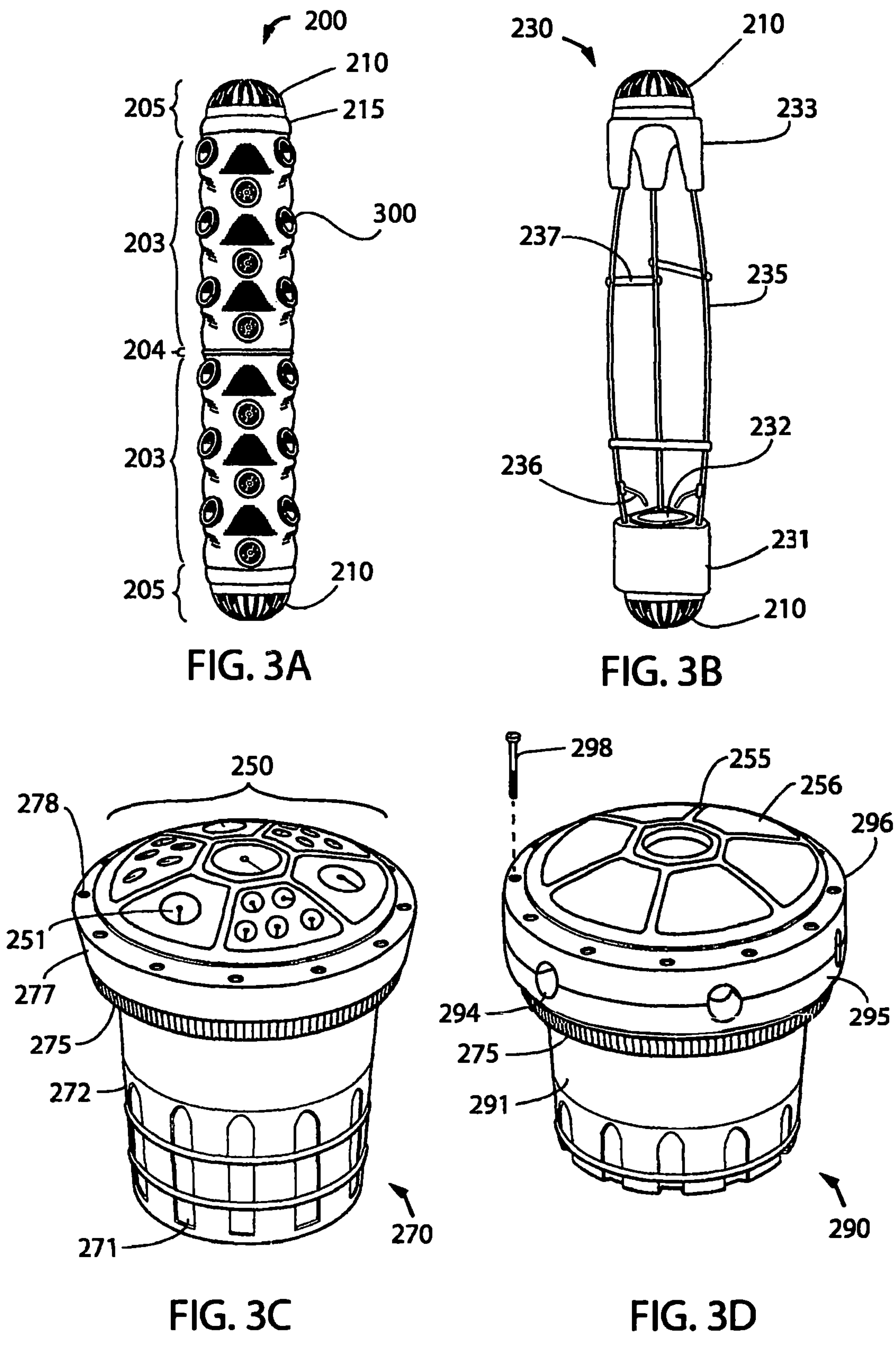
FIGS. 3A, 3B, 3C, 3D illustrate perspective views of grow tube type propagation module, made up of separable parts, in accordance with an illustrative embodiment of the present invention.

As shown in FIG. 3A, the grow tube type propagation module 200 is made up of separable parts. The propagation module 200 may include cap assemblies 205 at the top and bottom ends, respectively, of the propagation module 200. At least one tube segment 203 may interface with the respective cap assemblies 205. In some embodiments, multiple tube segments 203 may be joined together with at least one tube segment coupler 204, with the cap assemblies 205 joined at the respective top and bottom ends. A pattern of openings (not numbered) may be cut or molded into the faces of the tube segments 203. The tube segments 203 may be shaped so that there is a pattern of bulges or protrusions about the surface of the tube segment 203 at the openings. The propagation module 200 may be upwardly-oriented to better seal plant site inserts 301, 322 so that the chance of water leaking out is reduced.

As further illustrated in FIG. 3A, upward orientation of the propagation module 200 may help prevent or reduce J-hooking or curving that a plant 101 may undergo as a result of excessive vertical orientation of the plant during growth. The bulging pattern on the surface of the tube segment 203 may also create variations to the interior surface, forming pockets or indentations. This interior surface variation may help to promote aeration and even distribution of system water as it flows, through gravity, down through the propagation modules 200.

Figures 4A, 4B, 4C:
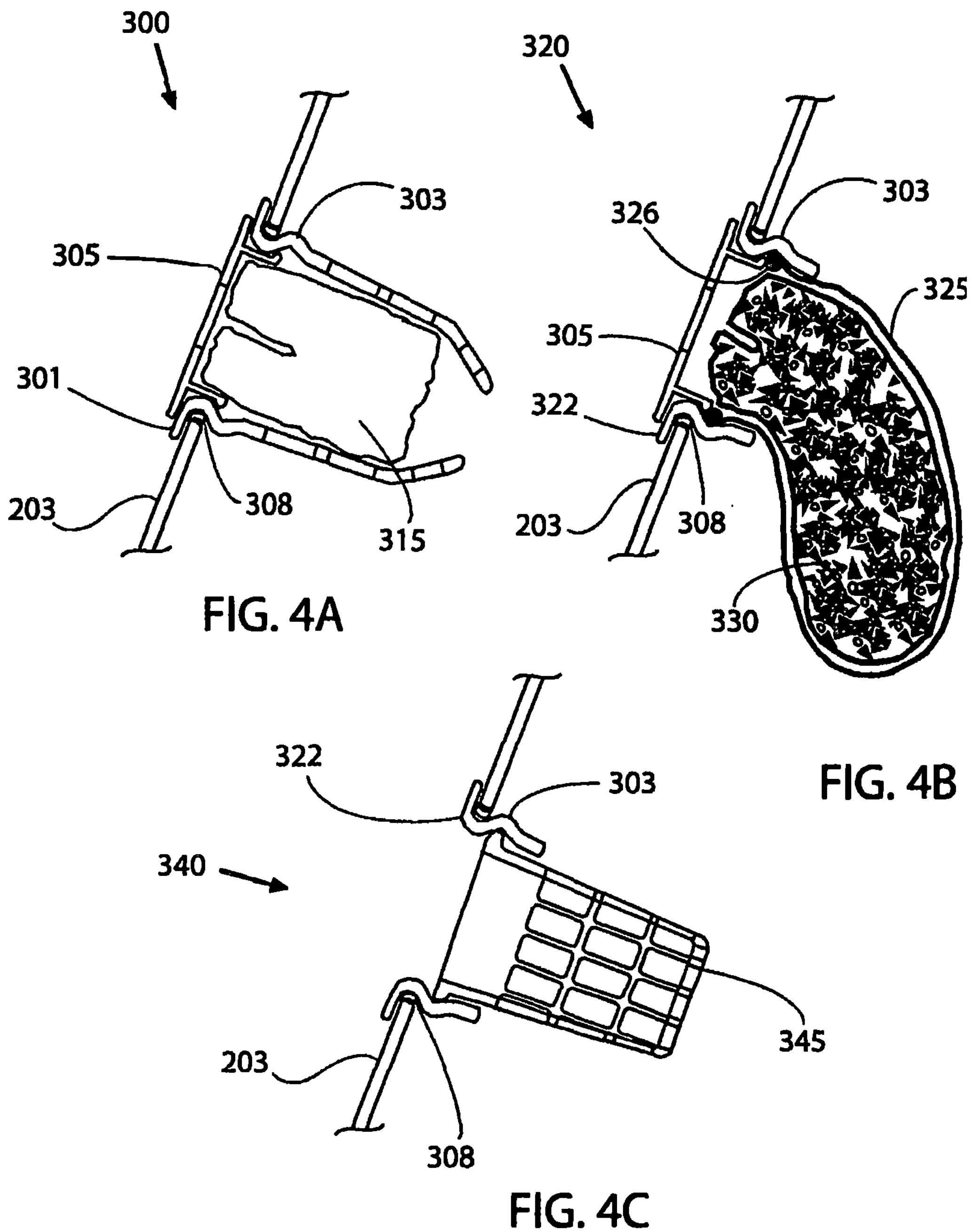
FIGS. 4A, 4B, 4C illustrate cutaway views of three versions of plant site insert configurations, in accordance with an illustrative embodiment of the present invention.

As illustrated in FIG. 4A, the bulges may form a pattern that may be described as a sort of three-dimensional Tessellation pattern made up of triangular faces, with upwardly oriented faces having openings for accepting plant site inserts 301, 322. This three-dimensional patterned shape may further be described as a shape that gives the plants 101 that are situated in the plant site inserts 301, 322 arrangement that evenly spaces the plants 101 about the surface of the tube segments 203.

As FIGS. 3A and 3B illustrate, each cap assembly 205 may include a geared cap 210, a cap coupler 215, and a flow stopper 441 (FIG. 5B), that if used would be attached to the lower cap assembly 205. To accommodate different types or spacing of plants 101 to be grown into type propagation modules 200, tube segments 203 of different shapes and arrangements may be used. Alternate tube segments 203 may also vary in scale and diameter.

Figures 5A, 5B:
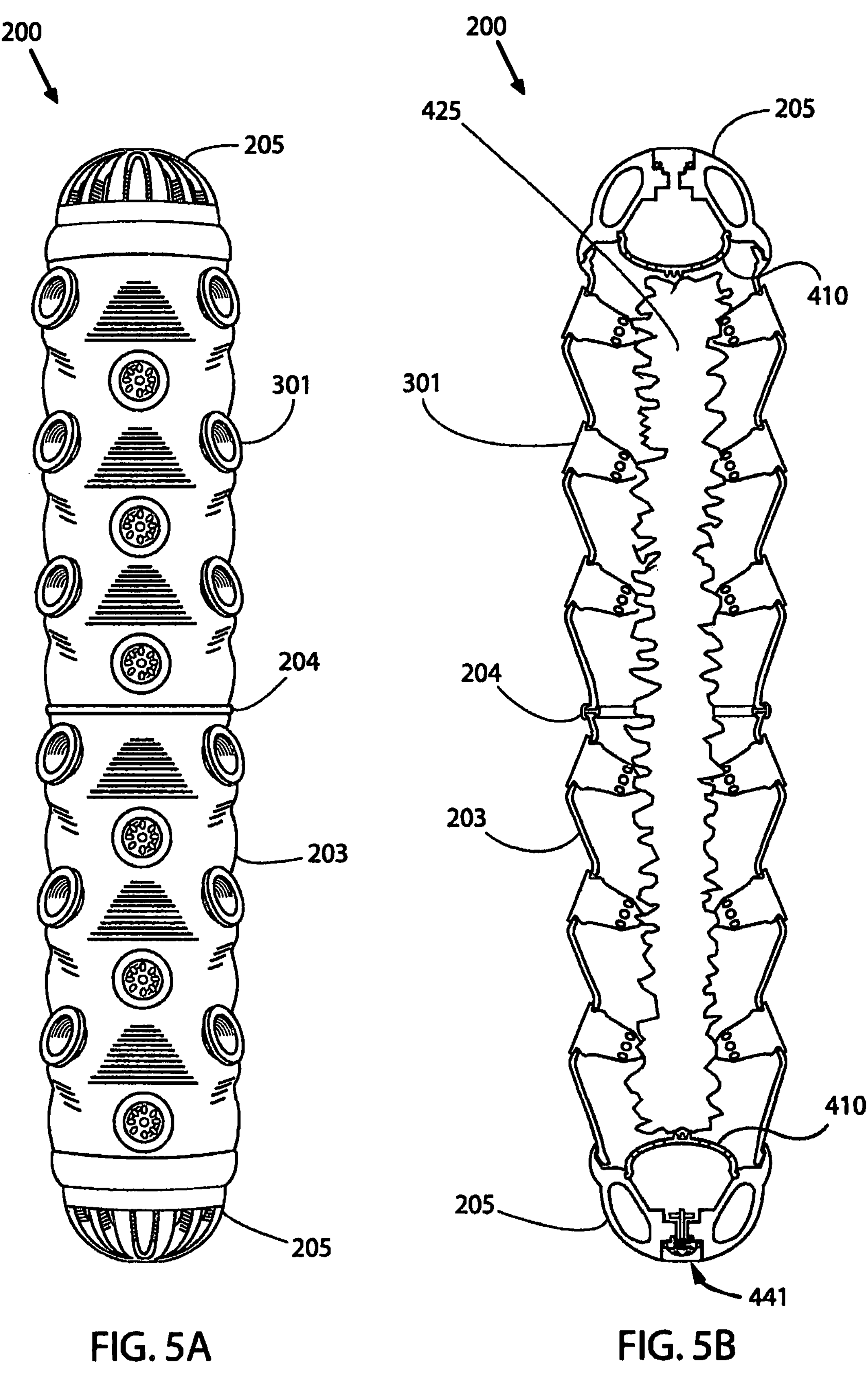
FIGS. 5A, 5B, and 5C illustrate side and perspective views of a grow tube type propagation module, in accordance with an illustrative embodiment of the present invention.
Figure 5C:
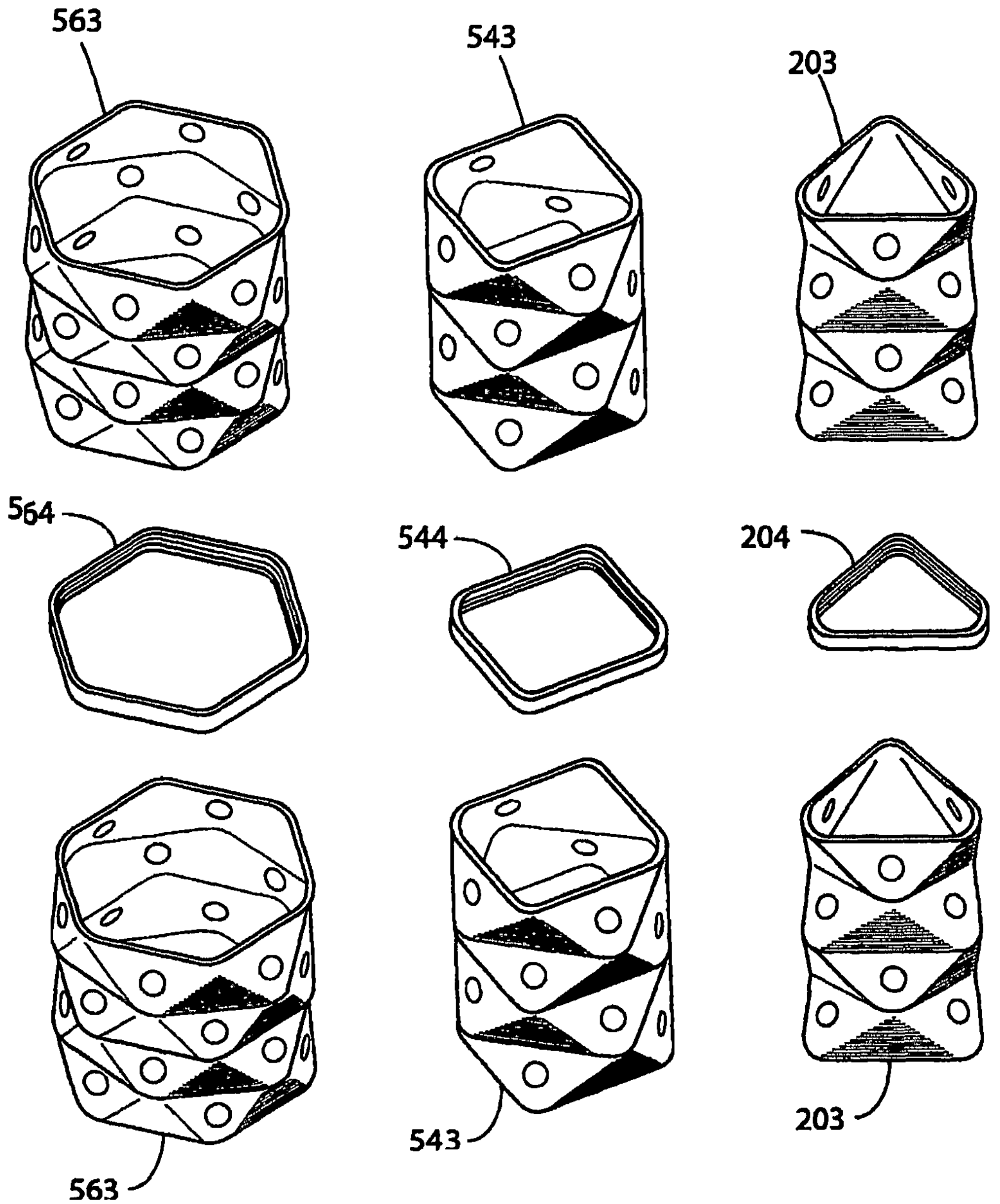

Variations of the three-dimensional pattern having triangular faces may be utilized to form other tube segments 203. For example, FIG. 5C shows other tube segments 203 that have a large number of faces at each level of the tube segment 203. Also, the number of openings that accept plant site inserts 301, 322 are larger. As illustrated in FIGS. 5A and 5B, in some embodiments, the tube segment 203 may have three openings per plant site inserts 301, 322 at each vertical level, and six generally triangular faces at each level with three faces inclined upwardly with openings, and three faces inclined downwardly without openings.

As illustrated in FIG. 5C, the tube segments 203 may be used in addition to or interchangeably with tube segments 543, 563, in the propagation module 200. The tube segment 543 may have four openings for the respective plant site inserts 301, 322 at each vertical level. The tube segment 563 may have six openings for the respective plant site inserts 301, 322 at each vertical level. The top and bottom ends of tube segments 203, 543, 563 may have ridges or detents to better seal securely with tube segment couplers 204, 544, 564 and with cap couplers 215 (FIG. 3A). Tube segment couplers 204, 544, 564 and cap couplers 215 may be fabricated from plastic and/or other suitable material that has sufficient flex to facilitate snap-on connections with the tube segments 204. Cap couplers 215 may also vary in shape to match and join with the appropriate tube segments 563, 543. In some embodiments, alternative cap couplers may fit into the same geared cap 210 portion of the cap assembly 205. A ridge, lip, tab or the like may be used on the cap couplers 215 to fit into a corresponding groove or catch in the geared cap 210.

The tube segments 203 may be formed from PVC tubing that has been heated and formed into the proper shape with a mold or jig, and having openings cut out when cooled. The tube segments 203 may also be made of polyethylene and/or other suitable material, and may be formed with openings to accept the plant site inserts 301, 322 as part of the molding process. The geared caps 210 may be fabricated of durable plastic and/or other suitable materials.

As illustrated in FIG. 3B, the open center type propagation module 230 may have geared caps 210 on the respective top and bottom ends of the module. The geared caps 210 may be joined to an open center top 233 at the upper portion and an open center base 231 at the lower portion of the module 230. Open center module tubes 235 may be inserted into respective openings (not illustrated) in the open center top 233 and the open center base 231. The open center module tubes 235 may connect the top and bottom portions and supply the system water to at least one plant 102 situated in the planter 232 held by the open center base 231. The open center module tubes 235 may be hollow tubes made of metal and/or other suitable materials. The open center module tubes 235 may be set into the open center top 233 and open center base 231 at angles so that an arc or bend may be formed in each of the open center module tubes 235. This arced shape may structurally stabilize or reinforce the open center module 230.

Figures 6A, 6B:
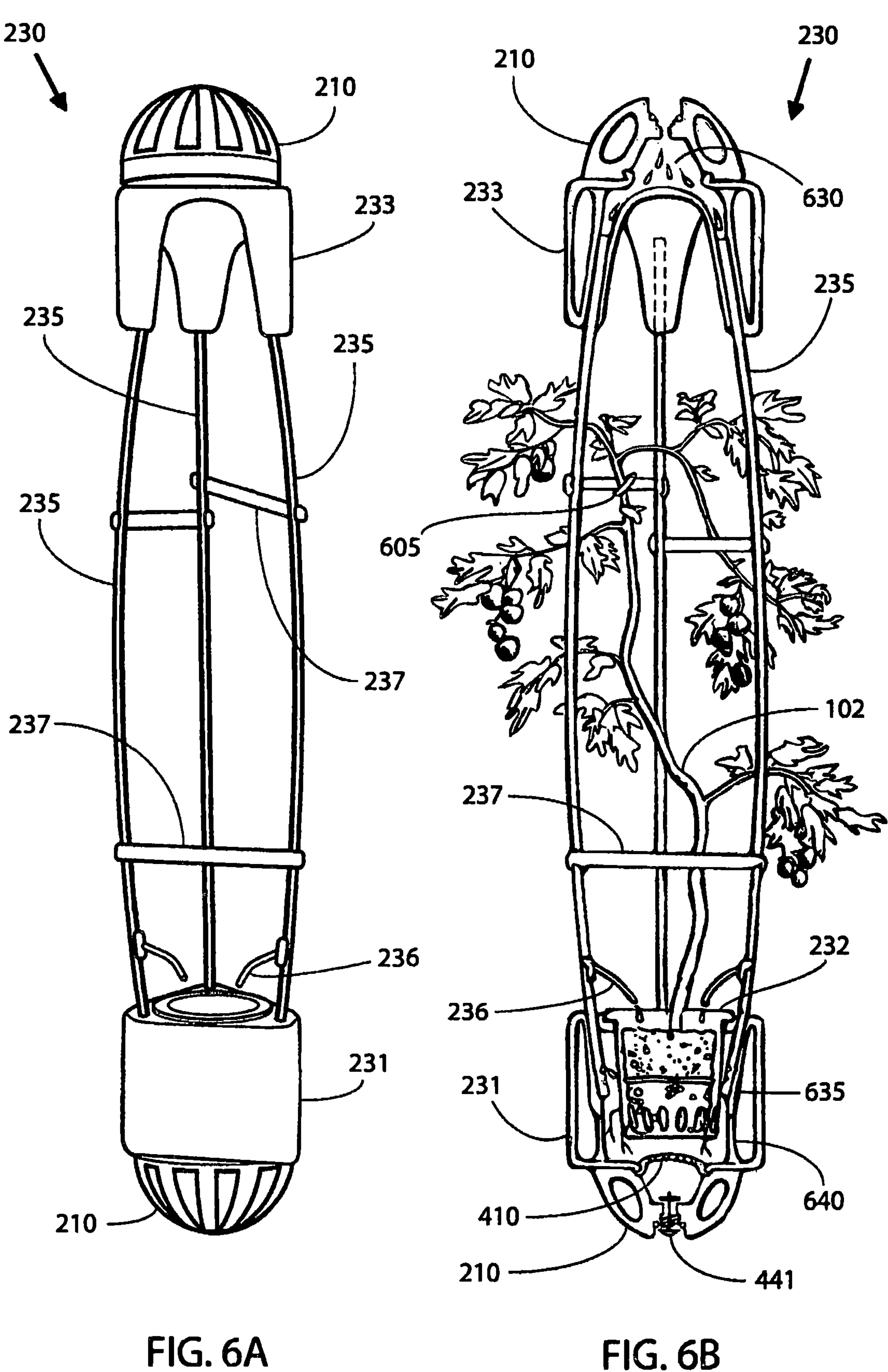
FIGS. 6A and 6B illustrate views of an open center type propagation module, where

In typical operation of the system 900, system water that enters the open center type propagation module 230 through the opening (not illustrated) in the geared cap 210 may then flow into a cavity inside the open center top 233, where the system water may be channeled to each of the open center module tubes 235. The system water may flow downwardly through the open center module tubes 235 to the planter 232. The system water may then exit the open center base 231 through an opening (not illustrated) in the center of the attached gear cap 210. The system water may then return to the overall system 900 to be recirculated. As further illustrated in FIG. 3B, spars 237 may be attached to each open center module tube 235. The spars 237 may stabilize the overall propagation module 230 and, as illustrated in FIG. 6B, may also be used as tie points for securing plants 102 with plant ties 605. The open center type propagation modules 230 may be configured for enabling growth of vining or taller plants. Vining plants may also be trained by twisting the stems of the plant around the outside of the open center module tubes 235.

Figure 8:
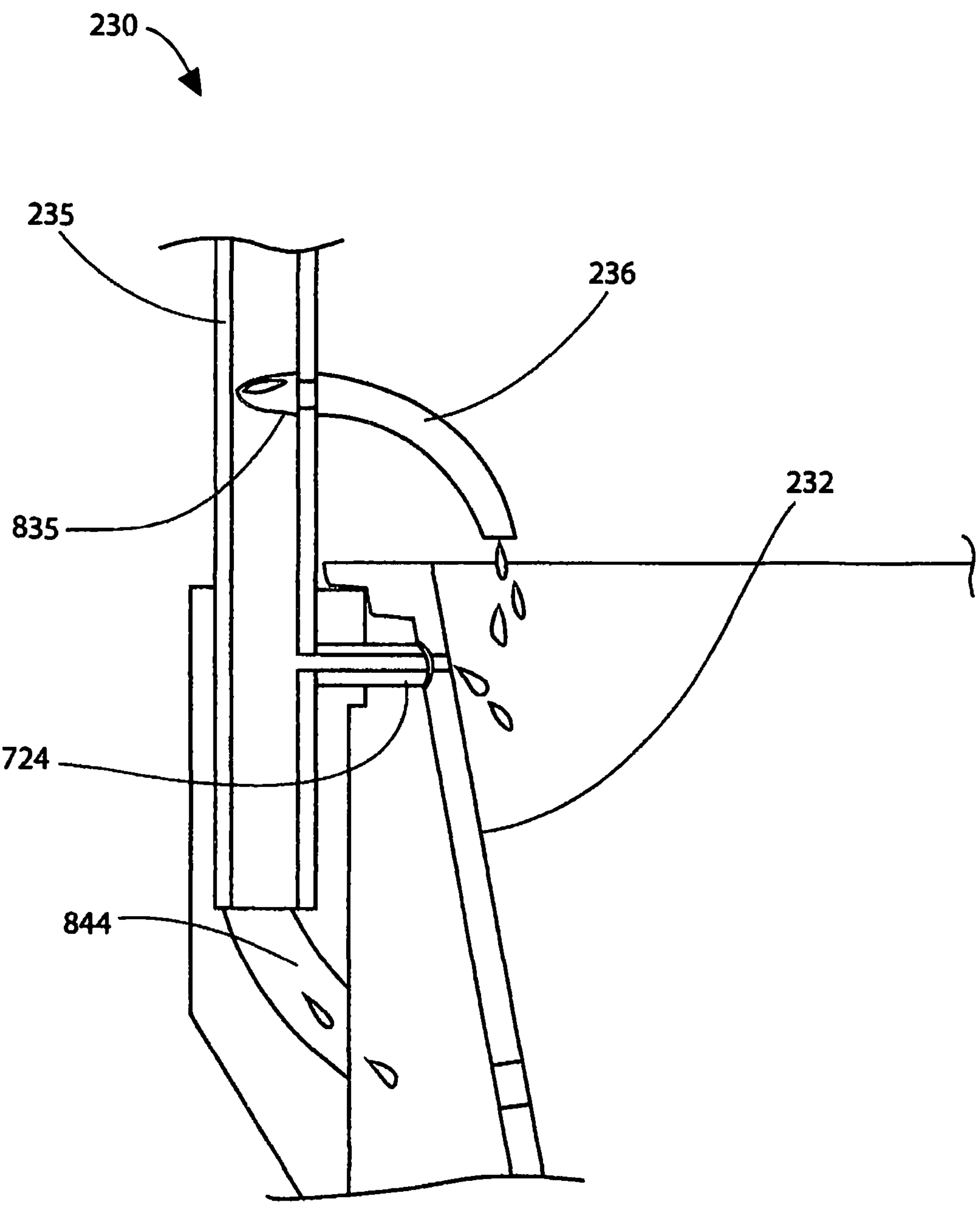
FIG. 8 illustrates a detail cutaway side view of the lower portion of an open center type propagation module, in accordance with an illustrative embodiment of the present invention.

Distribution of system water from the open center module tubes 235 to the planter 232 may be handled in a number of ways. As illustrated in FIG. 8, in some embodiments, the system water may be distributed by way of tube diverter wands 236 having a tapered tube insert 835 that may fit into a tube opening (not illustrated) in the side of an open center module tube 235. In this manner, the connection between the open center module tube 235 and the tube diverter wand 236 may be rendered leak-proof. The outer portion of the diverter wand 236 may be sufficiently rigid to hold its position but flexible enough to give way to allow for the insertion or removal of a planter 232.

The diverter wand 236 may be hollow and fabricated from polyethylene tubing and/or similar material, and may fit into the exposed tubular end of the tube insert 835. The tube insert 835 may be scoop-shaped to catch descending water from inside the open center module tube 235, and may divert a portion of the water flow out through the diverter wand 236 positioned over the planter 232. The system water may also be distributed by way of a diverter channel 724 that may be fitted into the inside of the open center base 231. The diverter channel 724 may fit into a diverter channel opening (not illustrated) that may be formed in the open center module tube 235 to conduct the system water to an opening (not illustrated) in the side of the planter 232.

Figure 7:
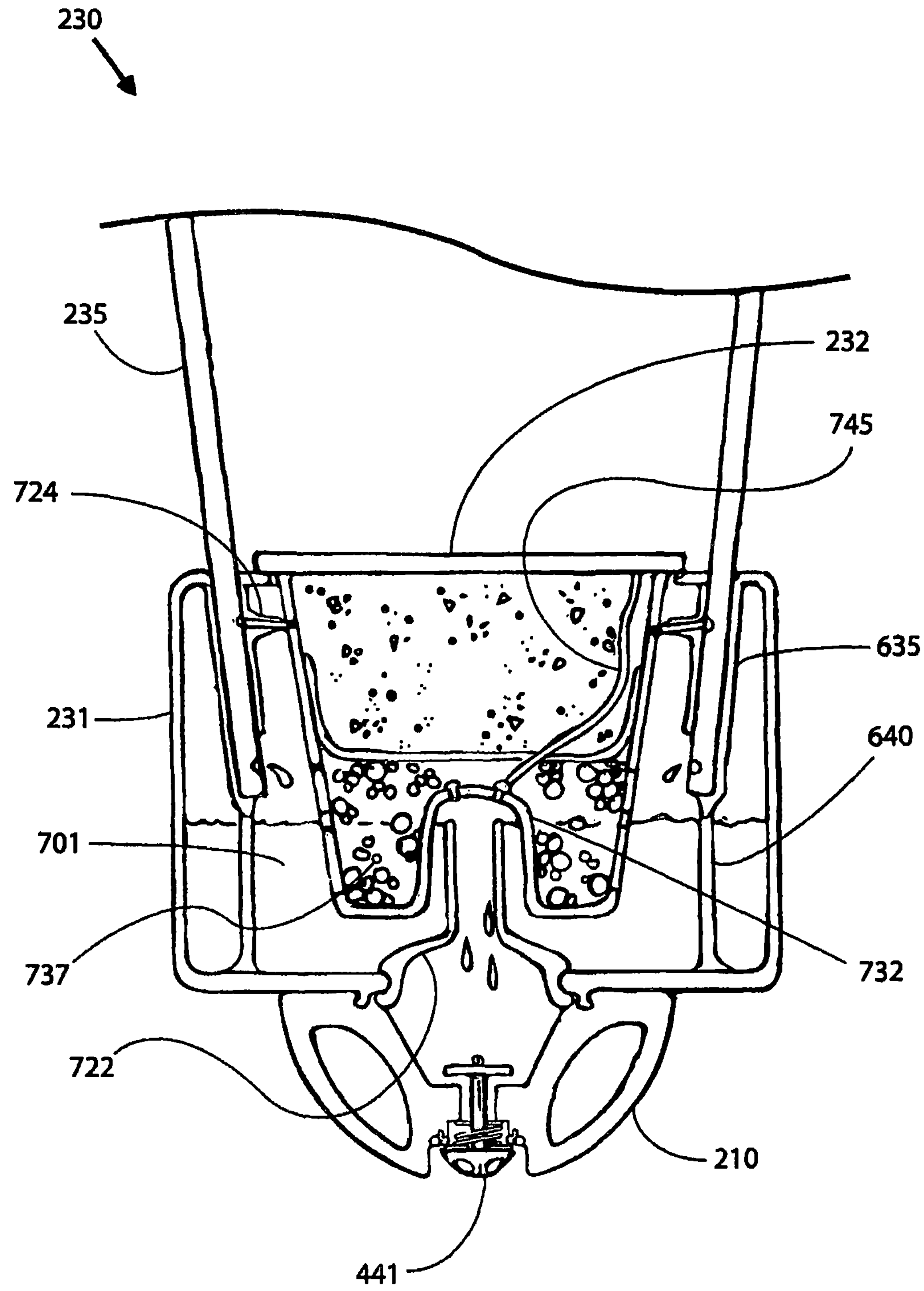
FIG. 7 illustrates a cutaway side view of the lower portion of an open center type propagation module, in accordance with an illustrative embodiment of the present invention.

In some embodiments, the system water may be distributed by falling into the open interior portion of the open center base 231 through a water discharge opening (not illustrated) in the side of the open center module tube 235, or alternatively, out the end and through a passage 844 (FIG. 8) in a base tube support 635 (FIGS. 6B and 7). Furthermore, the system water may fill a substantial portion of the interior of the open center base 231. In this manner, the plant 101 may be fed and irrigated as system water passes through the openings in the side of the planter 232. Plant roots may also fill the interior area of the open center base 231.

As illustrated in FIG. 5B, in some embodiments, a distribution cap 410 may be fitted to the bottom of the interior portion of the open center base 231. When in this position, the distribution cap 410 may act as a screen to prevent plant roots from interfering with the exiting of system water from the open center type propagation module 230 (FIG. 3B). As illustrated in FIG. 7, in some embodiments, the distribution cap 410 may be replaced with a module standpipe 722 that fits into the same position. The module standpipe 722 may allow system water to fill up the interior portion of the open center base 231 before spilling over the rim of the module standpipe 722 and exiting the propagation module 200, 230.

As further illustrated in FIG. 7, in some embodiments, a breather line 745 may be fabricated as a part of or inserted into the planter 232 or inserted into a Bell portion 732 of the planter 232 may be necessary to ensure proper flow of water over the rim of the module standpipe 722. The open center base 231 may further include at least one base interior support 640 that supports the base tube supports 635.

As further illustrated in FIG. 7, in yet other embodiments, the planter 232 may be filled with clay pebbles 737, lava rock, and/or other materials in the lower portion of the planter 232, along with soil, soil mix and/or other fillings. The upper portion of the planter 232 with water 701 filling only the interior portion of the open center base 231 may prevent the planter 232 from becoming water-filled and interfering with plant growth.

The base interior support 640 may be fashioned or molded as part of the open center base 231, so as to keep water 701 only in the center most portion of the open center base 231. Otherwise, the base interior support 640 may have passages to allow water 701 to fill out more of the open center base 231; but substantially keep the water 701 from sloshing about the interior portion of the open center base, as this may interfere with propagation module rotation.

As illustrated in FIG. 3C, the planter type propagation module 270 may include a rim ring 277, a driven base ring 275, a planter basin 272, and a planter module lid 250. The rim ring 277 may have a number of rim ring openings 278 that may allow bolts 298 (FIG. 10) to pass through the driven base ring 275. The rim ring openings 278 in the rim ring 277 may also accept bolts or pins 2120 (FIG. 21) that may be used to secure Trellis base connectors 1516 to the rim ring 277. The Trellis base connectors 1516 may connect to modular Trellis arms 1510 that are capable of a variety of configurations to port or otherwise train vining plants 102 and bush-like or larger statured plants 103.

As further illustrated in FIG. 3C, the planter type propagation module 270 may include a planter basin 272, which may be held between the rim ring 277 and the driven base ring 275. The planter basin 272 may have drain openings 271 that allow water to exit from the planter basin 272 through its sides. The planter basin 272 may also be fashioned in such a way so that there is an internal basin column 1710 (FIG. 17) that may be capped by an internal basin column cap 1705, or in other uses left open and not capped.

The roots of plants may also exit out of the side drain openings 271 in the planter basin 272. The planter type propagation module 270 may also be fitted with a planter module lid 250 which may fit inside the inner diameter of the rim ring 277. Detents or ridges may be used to hold the planter module lid 250 securely in place. As illustrated in FIG. 3D, the planter module lid 250 may include a lid frame 255 and a selection of possible lid inserts 256. The lid frame 255 may be constructed so that there is one center lid opening and a number of peripheral lid openings that fit the selection of lid inserts 256. The center lid opening may be sized so that a mast 944 (FIG. 9) may pass freely through the center lid opening without contact.

The peripheral lid openings in the lid frame 255 may be oriented such that carousel supports 916 may fit and connect with a bottom carousel hub 955, as illustrated in FIG. 10, as the lid frame 255 and lid inserts 256 are utilized to seal the top of a filter module 290 (FIG. 3D). The lid inserts 256 may be fabricated from neoprene, plastic, and/or other suitable materials, and may be solid or have openings to accept plant site inserts 301, 322 (FIGS. 4A-4C), site plugs 251 (FIG. 3C), or both. The site plugs 251 may be used to further seal up the module lid 250. When the module lid 250 is used as a planter module lid, the openings in the lid frame 255 and lid inserts 256 may allow plants 101, 102, 103 to be rooted inside the planter type propagation module 270 and reach through to grow on the outside, while also providing a means to seal up and protect the plant roots and media from bugs, plant treatment, contaminants, and overspray.

The lid inserts 256 may be solid with no openings, or alternatively, fitted with a number of openings. A selection of site plugs 251 with a small stem-sized center opening and a radial cut may allow removal of the site plugs 251 for inspection or treatment of media or plant roots while a plant 101, 102, 103 is in position. In some embodiments, a large statured plant 103 may be situated in the center lid opening of the lid frame 255. The center lid opening may be sealed with a center site insert 1776 (FIG. 17) and a site plug 251.

The rim ring 277, driven base ring 275, and lid frame 255 of the planter-type propagation module 270 may be fabricated from a durable hard plastic and/or other suitable material. The planter basin may be made of plastic, such as polyethylene and/or other suitable material, and may have a rim similar to the filter module basin 291. Furthermore, planter module basin 272 is used as a filter module basin 291 with openings to fit with the habitat connecting rods 961, which could be molded the same. The filter type propagation module 290 (FIG. 3D) may also accept the planter basin 272 instead of the filter module basin 291.

FIGS. 4A-4C show cutaway views of three versions of plant site insert configurations. The plant site insert configuration 300 in FIG. 4A shows a cup type plant site insert 301 that is inserted into the opening (not illustrated) of a tube segment 203. The cup type plant site insert 301 includes a body that has a ridge 303, which is partially distorted as the cup type plant site insert 301 is inserted or removed to secure the cup type plant site insert 301 firmly in place. A sealing band 308 may also be used to ensure that water is prevented from leaking around the site insert 301. As illustrated in FIG. 4B, the ring type plant site insert 322 may also include a ridge 303 that distorts as the insert 322 is inserted or removed. Furthermore, the cup type plant site insert 301 (FIG. 1) may include openings about the sides to allow water to reach a seedling growth media 315 held within. The seedling growth media 315 may be of any type, including rock wool cubes, coco coir pellets, and/or other types of media.

Both the cup type plant site insert 301 and ring type site insert 322 may be formed with rims to secure each in place in the corresponding opening in the tube segment 203. In some embodiments, a separate snap-on site cover 305 may also be used to keep the seedling growth media 315 in place and to keep bugs, contaminants, and light out of the interior space of the plant site inserts 301, 322.

An alternative plant site insert configuration 320 in FIG. 4B may include a ring type plant site insert 322 that may be fitted with media sock 325 made of mesh fabric, filled with soil, soil mix, perlite, coco coir, worm castings, and/or other mixtures 334 holding and nourishing the plant 101. The media sock 325 may be held in place by a keeper ring 326 about the opening of the media sock 325. The keeper ring 326 may fit to the inside shape of the ridge 303. The fabric mesh that comprises the media sock 325 may be woven sufficiently tight that the mixture 330 held in the media sock 325 stays in place. The fabric mesh may be sufficiently loose that roots are able to grow out of the media sock 325 and water is able to enter and keep the mixture 330 moist.

Another alternative plant site insert configuration 340 in FIG. 4C may include a ring type site insert 322 that is able to hold a regular net cup 345 commonly used in aquaponics/hydroponic growing environments. The regular net cup 345 may be held in place by the interior shape of the ridge 303 catching on the rim of the regular net cup 345. The regular net cup 345 may be filled with growth media or seedling growth media 315 (FIG. 4A), such as rock wool cubes and/or coco coir pellets, for example and without limitation. In some embodiments, the plant site insert configuration 340 may accept a snap-on site cover 305 (FIG. 4A).

5A and 5B illustrate a side view and cutaway side view, respectively, of a grow tube type propagation module 200. As illustrated in FIG. 5B, a distribution cap 410 may be held by a groove, indent or series of indents formed on the interior portion of the cap assembly 205. When attached to the upper cap assembly 205, the distribution cap 410 may perform the function of spreading the system water as it enters the module 200. The distribution cap 410 may also help to secure the flow scrim 425, which may be made of natural, artificial foam and/or sponge-like material such as open cell polyethylene plastic foam material, for example and without limitation. This material may be cut into a long cylindrical shape. Options as to the diameter and length of the flow scrim 425 may be available so that it is sized correctly for the grow tube type propagation module 200 being used.

Ideally, in some embodiments, the flow scrim 425 may contact the innermost portion of the cup type plant site insert 301. Contact may not, however, be necessary as the distribution cap 410 may include numerous openings to help spread the flowing system water laterally as it flows into the tube type propagation module 200. A distribution cap 410 may be affixed to the bottom cap assembly 205 to additionally serve to secure the flow scrim 425 and also screen the system water as it exits such that plant roots are less apt to clog at the flow stopper 441. The distribution cap 410 may be formed such that small protrusions or nubs 1110 (FIG. 11) are able to help grip and hold the flow scrim 425 in place. Openings in close proximity to or passing through the nubs 1110 molded into the distribution cap 410 may serve to ensure that at least a portion of the system water is directed into the flow scrim 425.

In some embodiments, the flow scrim 425 may also serve as a substrate for the growth of nitrifying bacteria. This function can be useful for the aquaponics environment. Many materials may be used as the flow scrim 425 to provide a large surface area-to-volume ratio and provide excellent flow characteristics such that system water is aerated as it travels down the flow scrim 425.

In some embodiments, the flow scrim 425 may also provide a substrate for composting red worms such as *Eisenia fetida*, for example and without limitation. Red worms may be sustained by broken-off portions of the roots of the plant 101 and particles caught by the flow scrim 425. In this manner, in the process of consuming and releasing organic material, the red worms may help process and render nutrient compounds more available to bacteria, fungi, and plants 101, 102, 103. Furthermore, filter material inside the filter type propagation module 290 may also sustain red worms. The red worms may be periodically harvested and used as food for the fish or other aquatic animals.

It is also significant to note that tube type propagation modules 200 may serve to keep water sealed inside the module 200, close-fitting entry and exit points, the close-fitting cap couplers 215, the tube segment couplers 204, the ceiling bands 308 (FIG. 4A), the tight-fitting site inserts 301, 322, and the site covers 305. This well-sealed aspect of the tube type propagation modules 200 may help prevent entry of plant pests, contaminants, plant treatment mist, and light into the tube type propagation module 200. In FIG. 5C, perspective side views showing variations of tube segment 203 and multiple segment couplers 204 are illustrated.

Turning now to FIG. 6A, a side view of a typical open center type propagation module 230 is shown. FIG. 6B illustrates a sectioned view of the same open center type propagation module 230, highlighting the plant, roots, and growing medium thereof. FIG. 7 references a cutaway side view of the lower portion of a typical open center type propagation module 230. FIG. 8 references a detailed cutaway side view of the lower portion of a typical open center type propagation module 230.

FIG. 9 illustrates a partially exploded side view of an illustrative embodiment of the system 900. The system 900 may include a power cord 1099 that supplies electrical power to the motor 1088 (FIG. 10). A connection point 991 may be situated near the rim of the tank 970 for connection to the power cord 1099 connected to an electrical source (not illustrated). FIG. 10 shows a detailed exploded view of the illustrative system 900. This view may also apply to some of the other system configurations.

Figure 11:
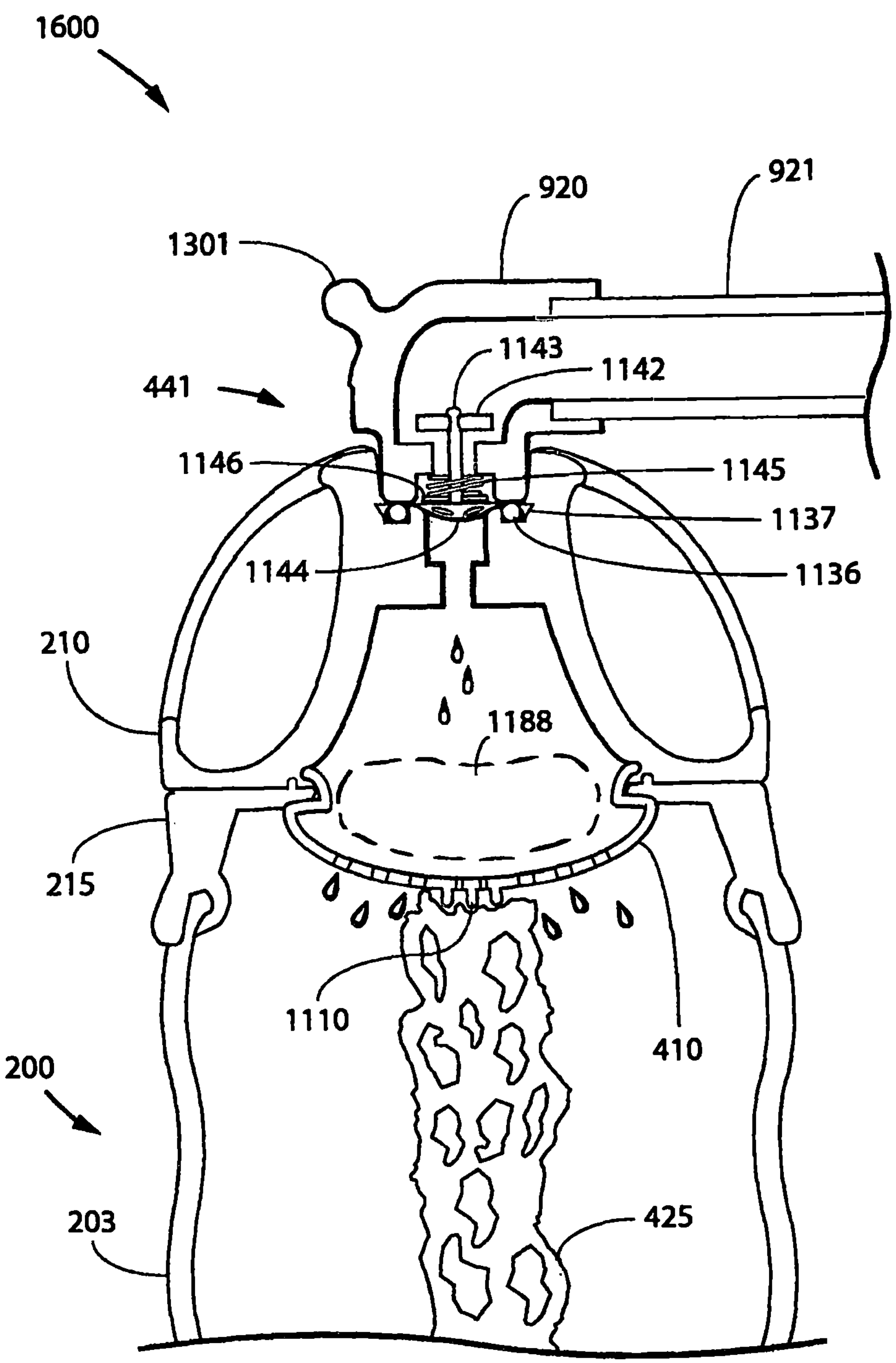
FIG. 11 illustrates a cutaway side view of the top connection made by a tube type propagation module to an elbow fitted onto an upper arm, in accordance with an illustrative embodiment of the present invention.

FIG. 11 illustrates a cutaway side view of the top connection made by a tube type propagation module 200 to an elbow 920 filled onto a fluid-conducting upper arm 921. In some embodiments, the geared cap 210 may also include geared cap ball bearings 1136 situated inside the recessed portion of the geared cap 210 into which the elbow 920 fits to hold the propagation module 200, 230. The geared cap ball bearings 1136 may be held in place by a retaining ring 1137 that snaps into place as it fits into a groove (not illustrated) in the recessed portion of the geared cap 210. The geared cap ball bearings 1136 may be fabricated from nylon and/or other suitable material, and serve to reduce friction as the propagation module 200, 230 rotates about its center axis. Alternatively, washers (not illustrated) may be used instead of ball bearings to reduce friction between the propagation module 200, 230 and the elbow 920. In some embodiments, the geared cap ball bearings 1136 and the washers may be omitted.

As further illustrated in FIGS. 11 and 12, in some embodiments, the elbow 920 attached to the upper arm 921 may be fitted with a flow stopper 441. The flow stopper 441 may include a cylindrical or fluted flow stopper shaft 1143. A flow stopper washer 1142, a flow stopper spring 1145 and a flow stopper slip washer 1146 may be provided on the flow stopper shaft 1143. The flow stopper shaft 1143 may fit through a washer opening (not illustrated) in the flow stopper washer 1142 and be retained on the other side of the washer opening. The flow stopper washer 1142 may snap into a bulb-shaped portion 1144 (not illustrated) at the end of the flow stopper shaft 1143 of the flow stopper 441. The flow stopper 441 may have a dome-shaped flow stopper end 1144. Dome openings (not illustrated) may extend through the dome-shaped flow stopper end 1144 of the flow stopper 441. The flow stopper slip washer 1146 and the flow stopper spring 1145 may be retained by the dome-shaped flow stopper end 1144 of the flow stopper 441.

As illustrated in FIG. 12, the flow stopper 441 may be assembled as part of a flow stopper insert 1240 that is sized to fit into the opening of an elbow 920 or into the opening in the center of the geared cap 210. In this manner, the flow stopper insert 1240 may be modular and removable. The flow stopper 441 may be pushed up into the open position when a propagation module 200, 230 is inserted and may close to stop the flow of system water when the propagation module 200, 230 is removed. The flow stopper 441 may prevent system water from dripping out of the removed propagation modules 200, 230 and out of the elbows 920 when the propagation module 200, 230 is removed. In some embodiments, the system 900 may be operated without use of a flow stopper 441.

In some embodiments, a nutrient packet 1188 may also be used inside of the cap assemblies 205 held in place by distribution caps 410. The nutrient packet 1188 may include a mesh pouch that holds material and releases the material in a time release manner into the system water flowing past it.

FIG. 12 shows a cutaway side view of the bottom connection made by a tube type propagation module 200 with an elbow 920 fitted onto a lower arm 1021. Typical engagement of the geared roller 923 with the lower arm 1021 is additionally shown. The geared caps 210 may be formed in such a manner that individual gear cap teeth 1233 stand apart from the bulk of the geared cap 210. Accordingly, an open portion or void 1232 that is accessible in the gaps between individual teeth 1233 may be provided in the geared cap 210. In some embodiments, the void 1232 may be generally toroidal in shape. The gap between the teeth 1233 may coalesce near the recessed portion at the opening in the geared cap 210. The gap between individual teeth 1233 and the void 1232 of the geared cap 210 may serve as a grab point for human operators and/or an engagement point for grab hooks or automated equipment. In other embodiments, the geared cap 210 may be formed without a void 1232 and may still be interchangeable with a geared cap 210 having a void 1232.

Figure 13:
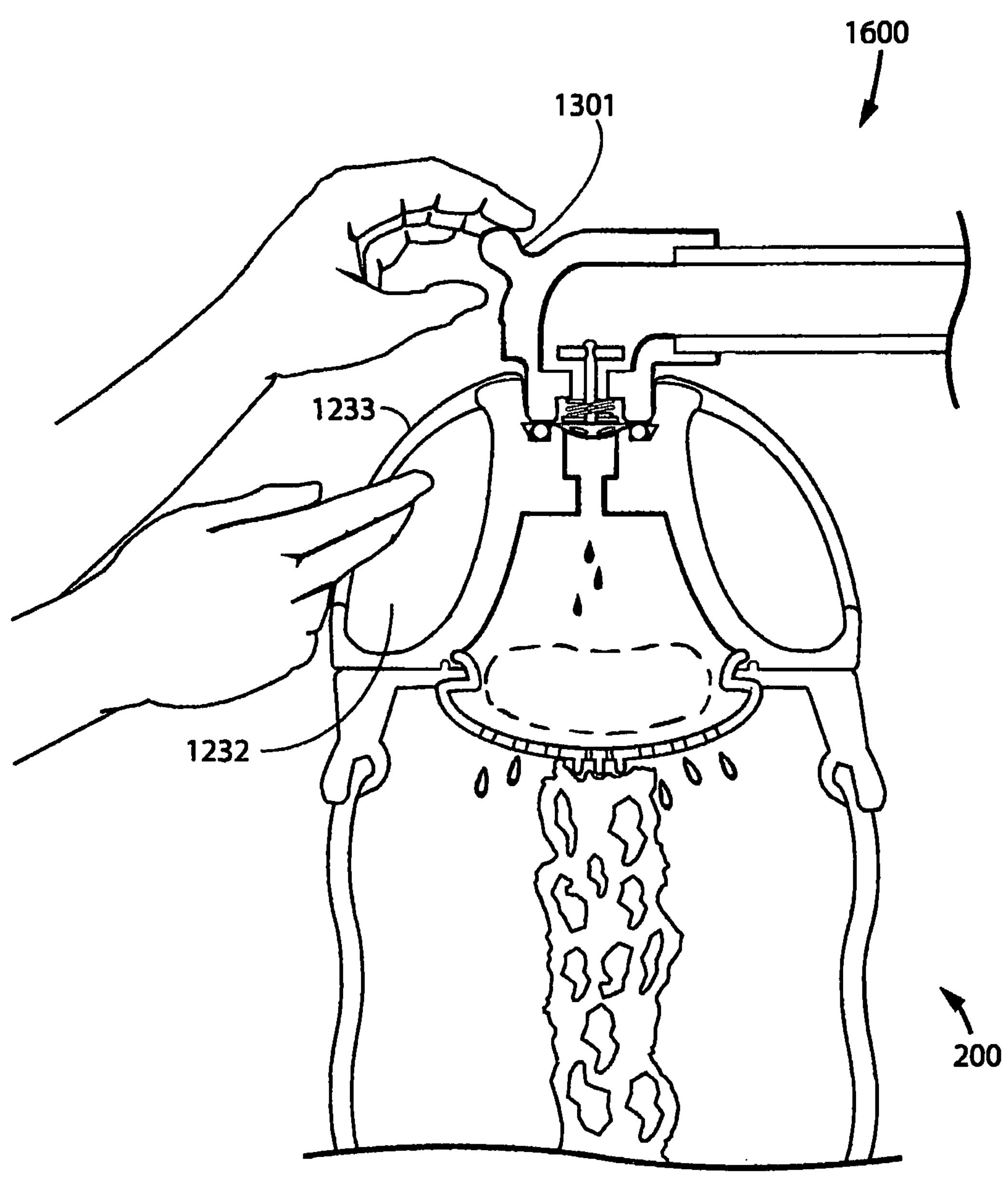
FIG. 13 illustrates a side view of the tube type propagation module, in accordance with an illustrative embodiment of the present invention.

FIG. 13 shows a cutaway side view of a typical upper connection at a tube type propagation module 200. A human operator may grasp the void 1232 and the gap between individual teeth 1233 to grip a propagation module 200, 230 for insertion and/or removal.

FIG. 14 illustrates a detailed cutaway side view of a typical top carousel hub 930. The top carousel hub 930, the connected upper arms 921, the carousel supports 916, and the top cap 1405 may all rotate together as part of the carousel 1600 (FIG. 9). The mast 944, the mast center pipe 1418, the diverter cap 1410, the top mast collar 1425, and the top mast roller collar keeper 1420 may be fixed non-rotatable in these embodiments. The top carousel hub 930 may rest and spin on the top mast ball bearings 1492, which may be made of nylon and/or other suitable material. The mast center pipe 1418 may pass through a center opening (not illustrated) in the top carousel hub 930, and a diverter cap 1410 may be provided on the mast center pipe 1418. The diverter cap 1410 may distribute the system water into the center cavity of the top carousel hub 930 in such a manner that the system water does not leak from the gap in which the mast center pipe 1418 enters. The system water may then flow into any number of upper arms 921 which may be attached to the top carousel hub 930. The diverter cap 1410 and the top mast roller collar keeper 1420 may be fabricated from plastic and/or other suitable material.

Figure 15:
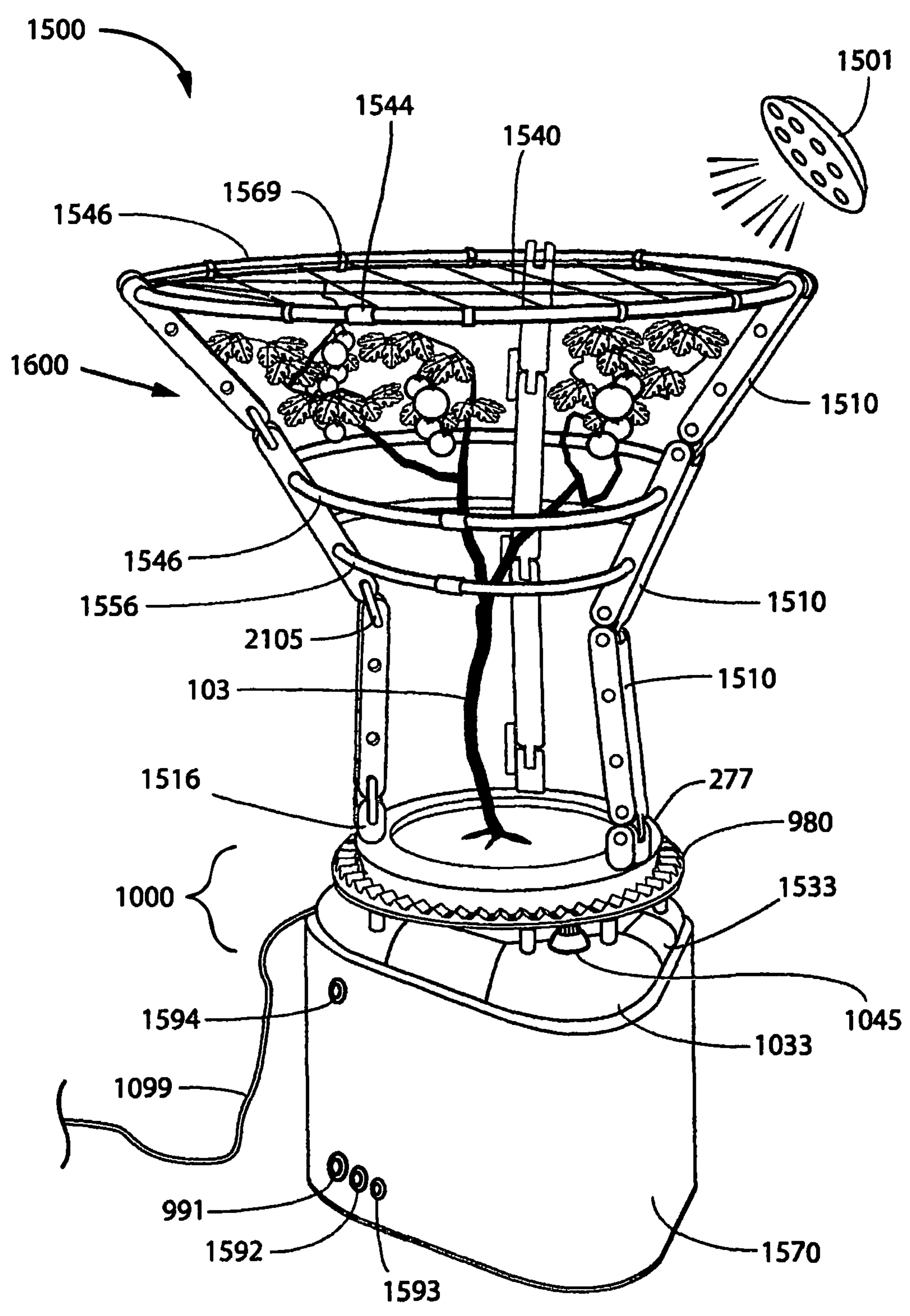
FIG. 15 illustrates a perspective view of system having a base tank that holds a drive assembly into which a rotatable planter type propagation module is placed, in accordance with an illustrative embodiment of the present invention.

FIG. 15 shows a perspective view of a typical system 1500. The system 1500 may have a base tank 1570 that holds a drive assembly 1000 (FIG. 9) into which a rotatable planter type propagation module 270 (FIG. 3C) may be placed. The rim ring 277 of the planter type propagation module 270 may hold the Trellis base connectors 1516 to which any number of Trellis arms 1510 may be attached. Small Trellis hoops 1556 and large Trellis hoops 1546 may pass through hoop openings (not illustrated) in the sides of the Trellis arms 1510. The Trellis hoops 1556, 1546 may be formed of polyethylene tubing, metal tubing, and/or other suitable material, and may be coupled using hoop couplers 1544.

The Trellis hoops 1556, 1546 may be positioned in any of numerous ways to give support to the overall Trellis assembly, and to accept attachment of a Trellis grid 1540 which may be used to hold or train plants 103. The Trellis grid 1540 may be fabricated from nylon string, netting and/or other suitable material. The Trellis grid 1540 may be attached to the Trellis hoops 1556, 1546 using grid clips 1569.

Each grid clip 1569 may be formed in an S-shape and may be made of plastic, with one portion of the S-shaped forming a hooked end that fits well onto the outside of the Trellis hoop 1556, 1546. The other portion of the S-shape may be configured to grip the Trellis grid 1540. The Trellis arms 1510 may be positioned in any of numerous ways from spread out, multiple Trellis arms 1510 joined together, or extending in a spaced-apart, increasing elevation, similar to a tomato cage.

By using the overall Trellis assembly, a plant 103 grown in the planter type propagation module 270 may be trained or supported as it rotates about a center axis. The rotation may enable a plant caretaker to stand or sit at one location to the side of the system 1500 and train and secure a plant 103 at all locations on the Trellis grid 1540, and to reach the plant branches, stem, and base portion of the plant 103. The motor 1088 (FIG. 10) that drives and attaches to one of the drive/idler cogs 1045 may be configured to pivot such that the drive/idler cog 1045 engages with the driven base ring 275 (FIG. 3C) on the propagation module 270. This expedient may allow the plant 103 and the planter type propagation module 270 to spin freely side-to-side by hand.

Rotation of the propagation module 270 may also facilitate application of light to the growing plant 103 from a light source 1501 positioned at one side of the system 1500. As the plant 103 rotates under or next to the light source 1501, light may penetrate the canopy or outermost leaves of the plant 103. This may expose the plant 103 to more light because a greater area of the plant surface is receiving light. The light source 1501 may also be positional closer to the plant 103 without burning the leaves on the plant 103. Accordingly, plant growth may be more uniform, and changing the position of the light source 1501 may encourage lateral growth in the plant 103. In some embodiments, a fan or other fixture (not illustrated) may generate airflow to penetrate the canopy and branches of the plant 103 more efficiently and uniformly.

In some embodiments, the base tank 1570 of system 1500 may be fitted with a supply line connector 1594, a connection point 991 that may be used as a drain line connection, an airline connection 1592, and an electrical connection 1593 that may be connected to the motor 1088 (FIG. 10) via a connection point near the rim of the base tank 1570 through a power cord 1099. As further illustrated in FIG. 15, in some embodiments, side covers 1533 may be attached to portions of the drive assembly 1000 to seal the system 1500. The fixed gear ring 980 of the drive assembly 1000 may serve to keep the rotating planter type propagation mount module 270 more contained.

Figure 16:
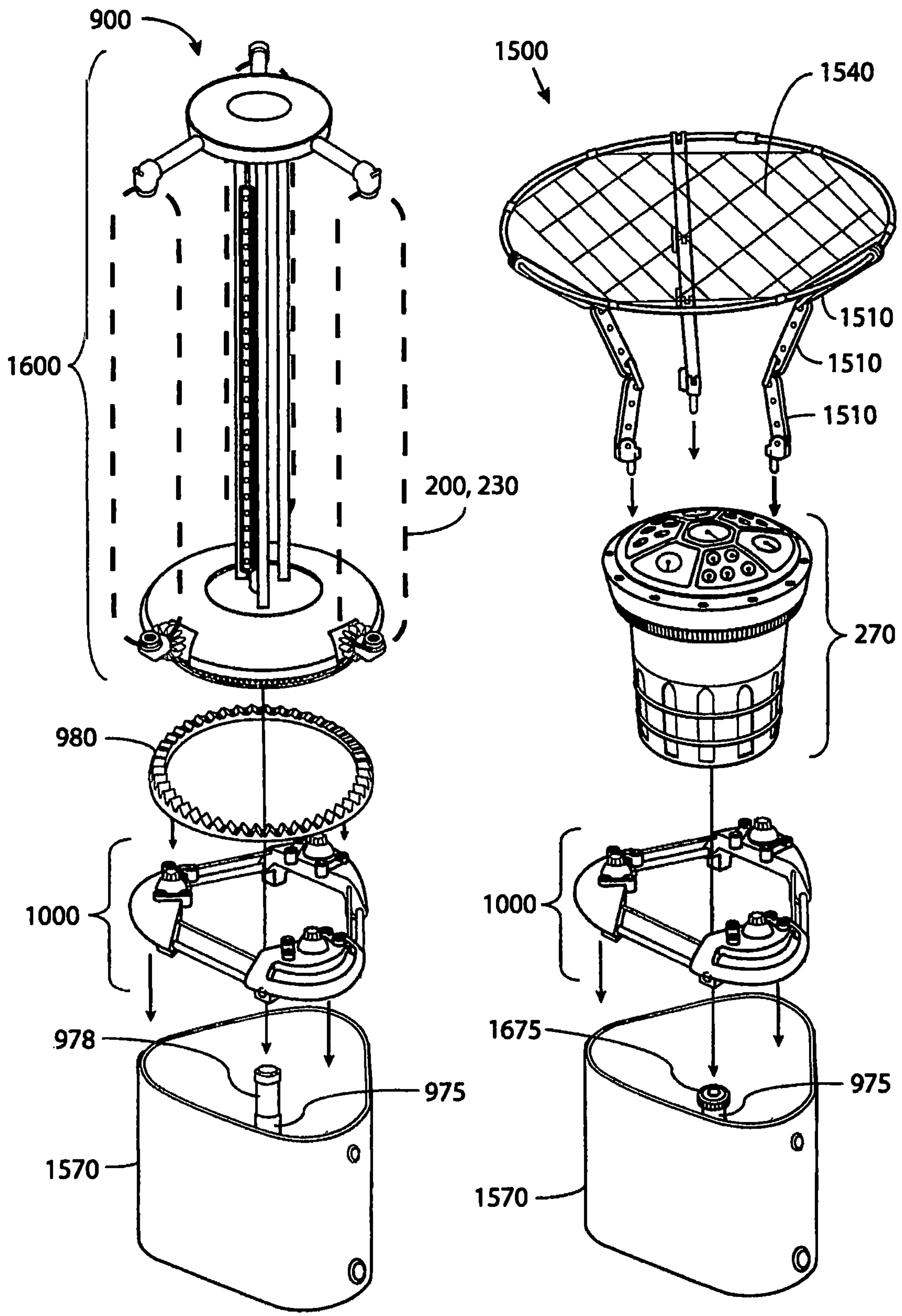
FIG. 16 illustrates a perspective exploded view of two systems situated side by side, both utilizing the same base tank, in accordance with an illustrative embodiment of the present invention.
Figure 19:
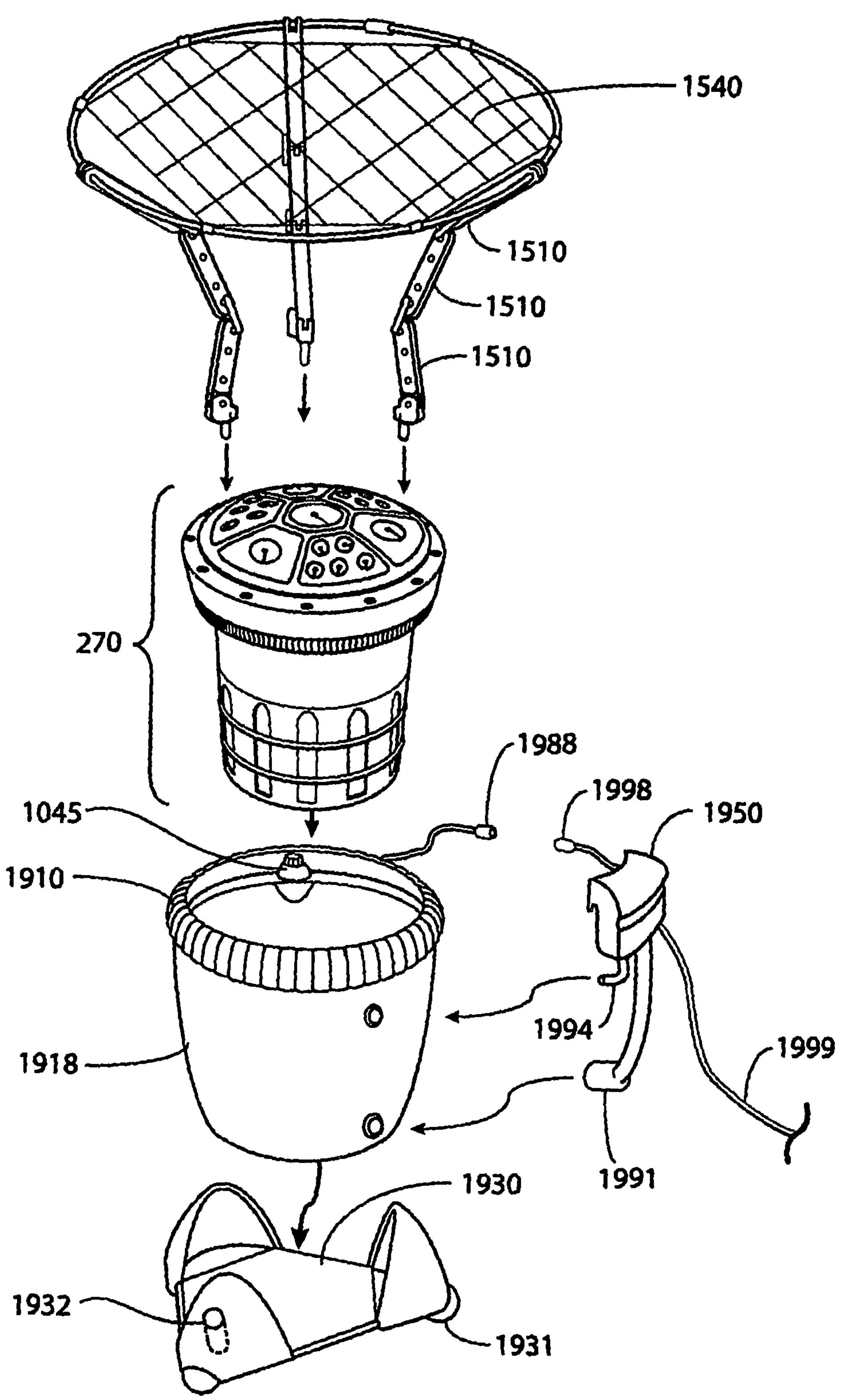
FIG. 19 illustrates an exploded side view of system elements, drive/idler cog and motor integrated directly into a planter tank, in accordance with an illustrative embodiment of the present invention.

FIG. 16 shows a perspective exploded view of two systems 900, 1500 that are situated side by side, both utilizing the same base tank 1570. In some embodiments, the base tank 1570 may be fitted with a center column base 975, which may be in turn fitted with a mast coupling segment 978 or a column drain cap 1675. The mast coupling segment 978 may be configured for coupling with a mast 944 (FIG. 9) to operate the system 900, 1500 with the carousel 1600 that in turn holds propagation modules 200, 230. The column drain cap may support or mount a rotatable planter type propagation module 270 and may use the center base column 975. The center base column 975 may be internally connected to the connection point 991 (FIG. 9) as a drain line for distribution to other systems or equipment or to serve as the drop point for recirculation with a side mount assembly 1950 (FIG. 19).

Figure 17:
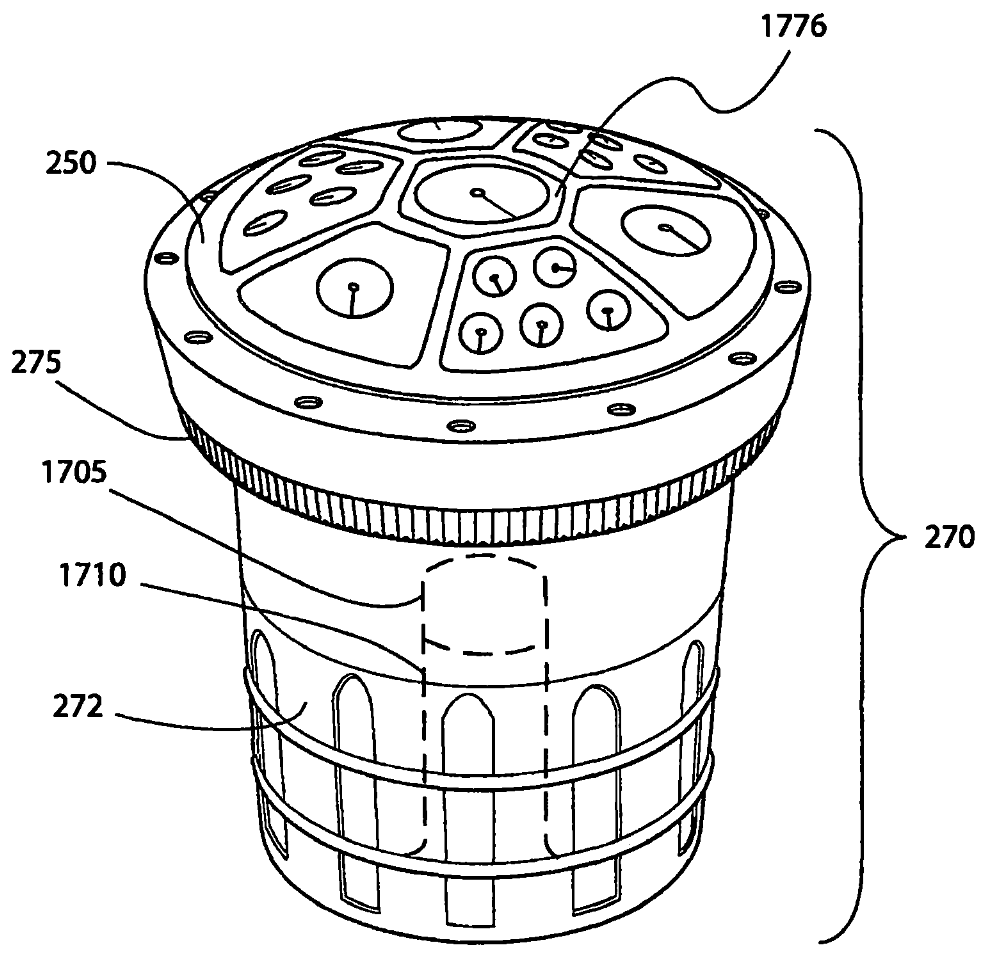
FIG. 17 illustrates a perspective side view of a planter type propagation module, in accordance with an illustrative embodiment of the present invention.

FIG. 17 illustrates a perspective side view of a typical planter type propagation module 270. The module 270 may be fitted with a planter module lid 250 shown with a center site insert 1776. The planter basin 272 may be formed with an internal basin column 1710, which may accept a basin column cap 1705.

Figure 18:
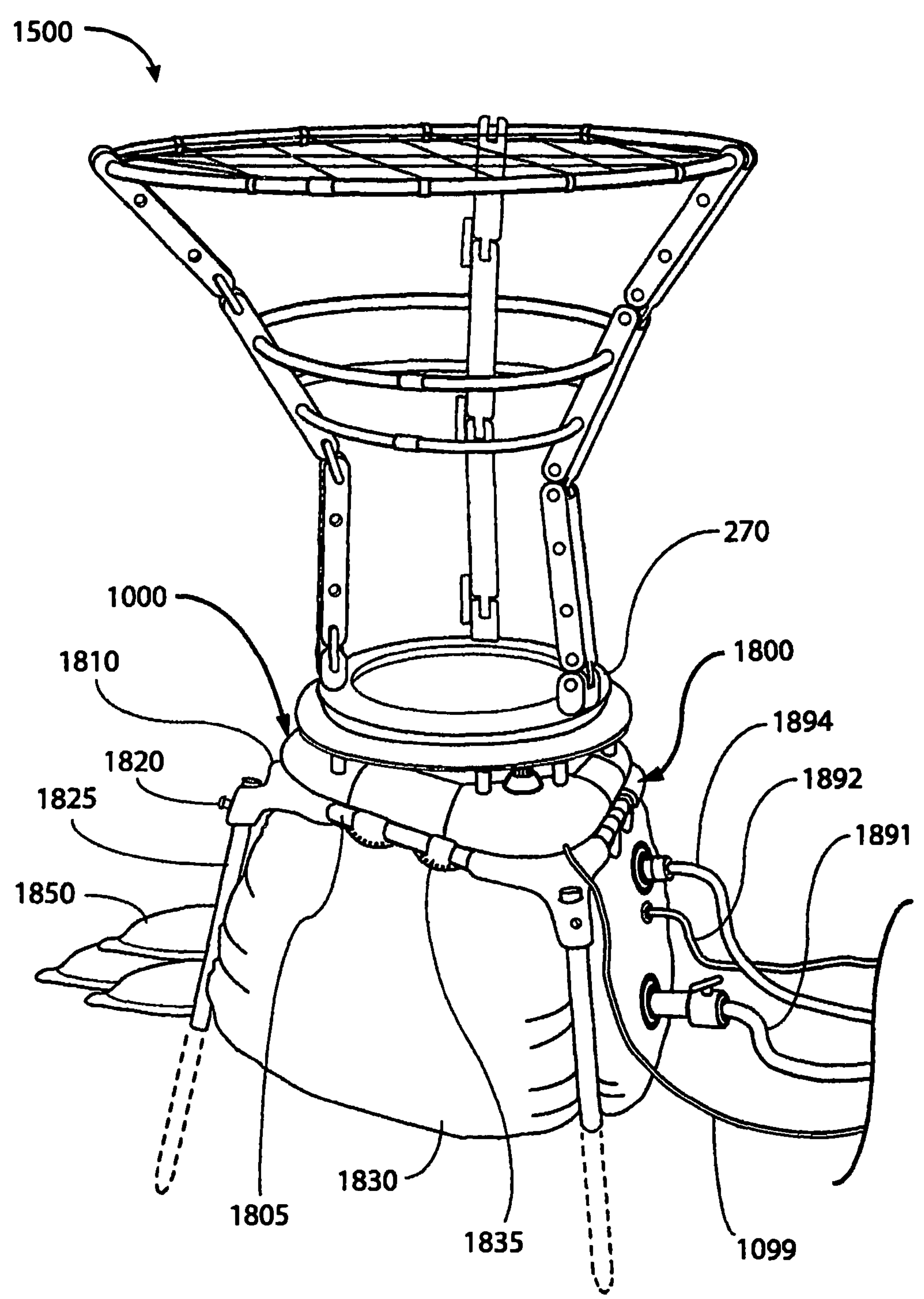
FIG. 18 illustrates a perspective side view of a rotatable system with an alternate tank/base, in accordance with an illustrative embodiment of the present invention.

FIG. 18 shows a perspective side view of a rotatable system 1500 with an alternate base assembly 1800 which supports an alternate base or tank 1830. This view illustrates a system 1500 that utilizes a drive assembly 1000 that holds a planter type propagation module 270 (FIG. 3C) with a Trellis assembly attached. In some embodiments, the base assembly 1800 may include a number of spikes 1825, base brackets 1810 and base rods 1805, and may support a soft sided tank 1830 with connection points. The alternate base brackets 1810 may connect with alternate base rods 1805, which may connect to other alternate base brackets 1810 in the base assembly 1800.

In some embodiments, the spikes 1825 may extend through bracket openings (not illustrated) in the alternate base brackets 1810 and, in some applications, may be driven into the ground. The alternate base assembly 1800 may support and connect with the drive assembly 1000, which in turn may support and rotate a planter type propagation module 270 (FIG. 3C) or a carousel 1600 (FIG. 9). The alternate base assembly 1800 may be leveled sufficiently, and base set screws 1820 may be engaged to secure the base assembly 1800 in the leveled configuration. The base rods 1805 may connect with soft sided tank attachment points 1835 on the soft sided tank 1830 to maintain the soft sided tank 1830 in place. The soft sided tank 1830 may include a drain connection line 1891, a supply connection line 1894, and an air connection line 1892 to connect with a side mount assembly 1950 (FIG. 19) or connect other to systems.

The alternate base assembly 1800 and soft sided tank 1830 may serve to adapt other system elements on uneven ground. A base tank 1570 (FIG. 16) may also be used with the alternate base assembly 1800. In some embodiments, an access hatch (not illustrated) may be included to use a soft sided tank 1830 for holding aquatic animal 120. The soft sided tank 1830 may be made of rubber and/or polyethylene scrim, for example and without limitation. The soft sided tank 1830 may be covered with an insulating layer (not illustrated) and color to absorb solar radiation, so as to heat water or reflect light. In some embodiments, sandbags (not illustrated) may be used to insulate, block light and heat, or help support the system.

FIG. 19 shows an exploded side view of typical system elements. A drive/idler cog 1045 and a motor 1088 (FIG. 10) may be integrated directly into a planter tank 1918. The planter tank 1918 may have connection points for connecting with other systems or equipment, or for connecting with a side mount assembly 1950. The side mount assembly 1950 may allow the system 900, 1500 to be operated as an individual, stand-alone unit in some applications. The side mount assembly 1950 may be fitted with an electrical connector 1998 to connect with and supply power to a motor 1088 via a short motor power cord 1988. The side mount assembly 1950 may also have an inlet line 1991 and an output line 1994 to connect with respective connection points on the planter tank 1918. In some embodiments, the side mount assembly 1950 may have an onboard water pump (not illustrated) to recirculate the water in the attached system 900, 1500.

In some embodiments, the side mount assembly 1950 may also include an air pump (not illustrated) to supply air to the connected system 900, 1500. A power cord 1999 may supply electricity to the side mount assembly 1950. The planter tank 1918 may be transportable on a rolling stand 1930 that may include a roller foot 1931. The planter tank 1918 may also include a planter fixed geared ring rim 1910, so that a carousel 1600 (FIG. 9) may be utilized. The side mount assembly 1950 may include sensors and a readout screen (not illustrated). The sensors may be configured to sense pH, dissolved oxygen, total dissolved solids, temperature, and/or other parameters.

Figure 20:
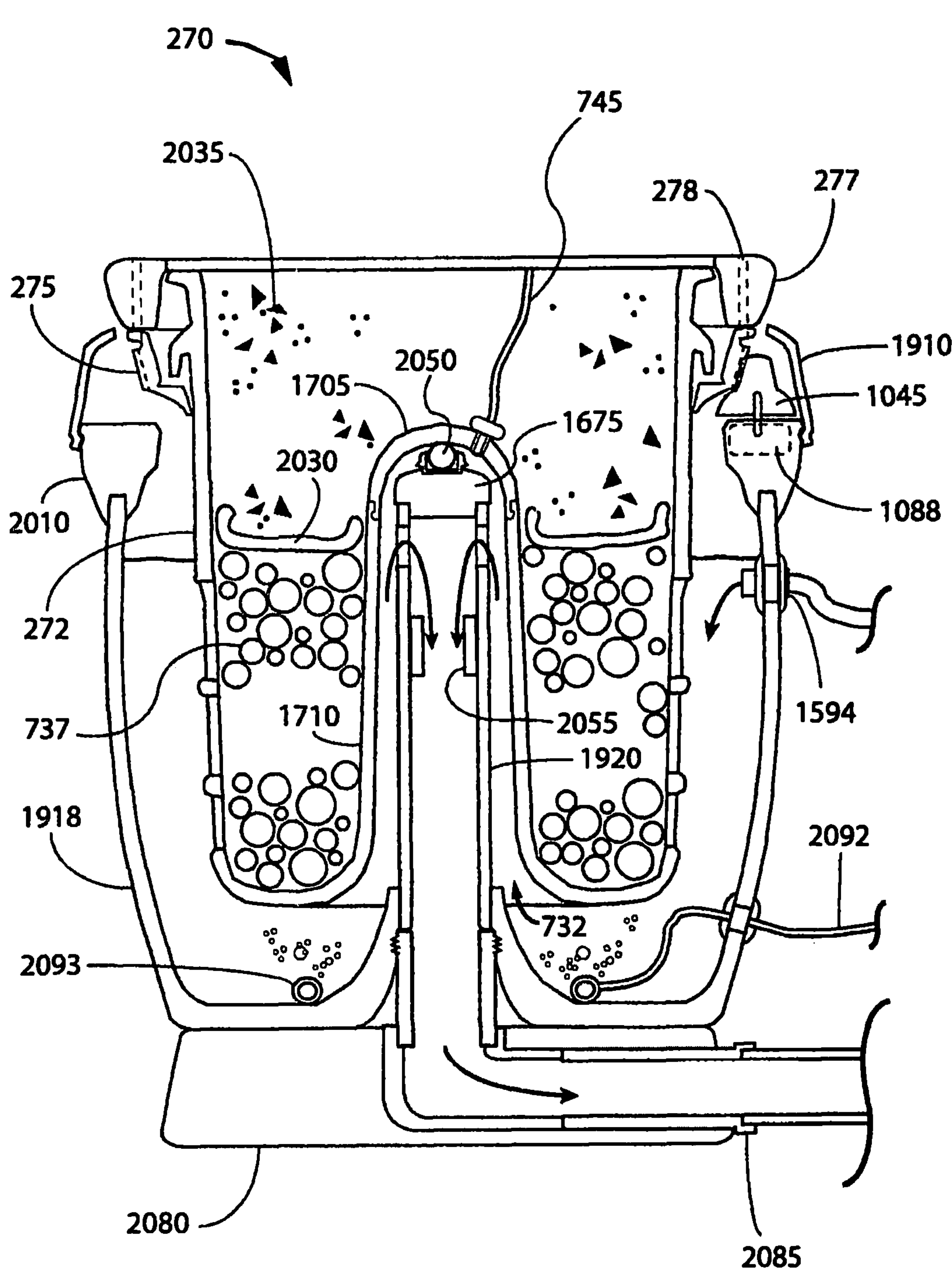
FIG. 20 illustrates a cutaway side view of a planter tank with a planter type propagation module, in accordance with an illustrative embodiment of the present invention.

FIG. 20 shows a cutaway side view of a planter tank 1918 with a planter type propagation module 270 in position in the planter tank 1918. The planter basin 272 of the propagation module 270 may be held between the rim ring 277 and the driven base ring 275, which may be joined together by bolts or pins extending through respective rim openings 278 in the rim ring 277. In some embodiments, the driven base ring 275 may engage with several drive/idler cogs 1045 that may be spaced-apart evenly about a rim unit 2010 that forms part of the planter tank 1918. One of the drive/idler cogs 1045 may be drivingly engaged for rotation by the motor 1088. In some embodiments, an air stone 2093 or ring-shaped unit may be provided in the planter tank 1918. The air stone 2093 or ring-shaped unit may distribute air to the water contained in the planter tank 1918. The air stone 2093 may be connected to an air line 2092 which extends out the side of the planter tank 1918 to connect with an air source (not illustrated).

In some embodiments, the planter tank 1918 may be configured to tie in with and rest upon a small tank base 2080. Accordingly, the drain connection 2085 may tie in with a center column base portion 1920 of the planter tank 1918 via the small tank base 2080. The small tank base 2080 may be made of foam, sealed foam and/or other suitable materials, and may also serve to insulate the planter tank 1918 from ground temperatures. A column drain cap 1675 may be provided at a top opening of the center column base portion 1920 of the planter tank 1918. The column drain cap 1675 may hold or secure a column drain cap ball 2050 in place. The column drain cap 1675 may allow system water to pass through the drain connection 2085. The column drain cap ball 2050 may support the weight of and facilitate rotation of the planter type propagation module 270 or carousel 1600 about its center axis.

In typical application of the system 900, 1500, the system water may rise in the space between the center column base portion 1920 of the planter tank 1918 and the internal basin column 1710 and basin column cap 1705 portion of the planter basin of the propagation module 270 to enter the column drain cap 1675. A low-pressure area may develop in the space between the basin column cap 1705 portion of the planter basin 272 and the column drain cap 1675 as the water flows down to and through the drain connection 2085. This low-pressure area may then induce an auto-siphon effect action to the water exiting via the drain connection 2085. This auto-syphon action may accelerate the rate at which the system water exits the planter tank 1918 through the drain connection 2085. This increased drainage rate of the system water may outpace the infill rate of system water via actuation of a water pump (not illustrated). This may cause the system water to drain rapidly from the planter tank 1918 and also from the lower portion of the submerged planter basin 272 which may hold the soil mix layer 2035, clay pebbles 737, and/or a layer separator 2030 until the siphon is broken, that is, until the Bell portion 732 of the planter basin 272 is subjected to normal atmospheric pressure.

As illustrated in FIG. 20, in some embodiments, a breather line 745 may be attached to the internal basin column cap 1705 of the plant basin 272. The breather line 745 may extend through the soil mix layer 2035 such that roots of the plant 103 cannot clog the end of the breather line 745. The breather line 745 may be plugged or unplugged to vary drainage action. Rapid drainage action in the planter tank 1918 and in the lower media at the planter basin 272 may pull air through the soil mix layer 2035 from the top to the bottom thereof, thus providing enhanced air and oxygen provision to the plant root area of the plant 103. This enhanced aeration and oxygenation may promote growth for the plant 103.

As further illustrated in FIG. 20, the aforementioned auto-siphon action may be further promoted by use of a siphon insert 2055 that may be inserted tightly into the inside of the center column base portion 1920 of the planter tank 1918. The siphon insert 2055 may produce a funneling effect in the system water as it enters the drain and may assist in production of a nearby low-pressure area in the clay pebbles 737. The roots of the plant 103 may also extend through the sides of the planter basin 272 to grow inside the planter tank 1918.

The planter tank 1918, attached plumbing, and planter basin 272 may be configured such that no auto-siphon action occurs; thus, the flow rate of system water entering and exiting the system 900, 1500 may be substantially the same. In some embodiments, a supply line connector 1594 may be situated on the side of the planter tank 1918 and may return system water to the planter tank 1918 from a side mount assembly 1950 (FIG. 19) or other overall system element. The system water entering the planter tank 1918 may be tangentially returned such that it flows around the inside of the planter tank 1918. In some embodiments, the planter tank 1918 may be fitted with a geared ring rim 1910 such that a carousel 1600 (FIG. 9) may be utilized. The geared ring rim 1910 may sit upon the rim unit 2010, as illustrated in FIG. 20.

Figure 21:
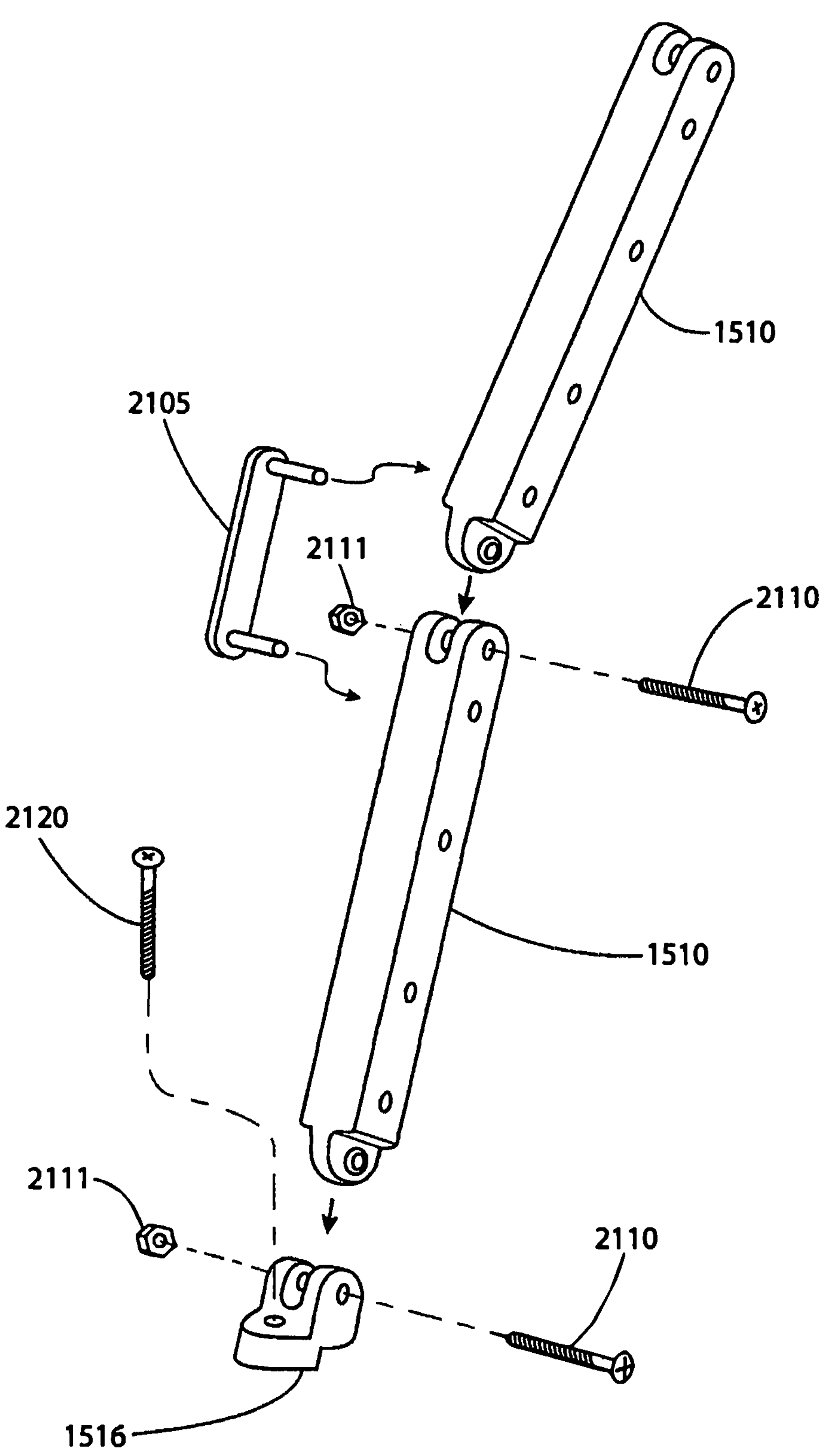
FIG. 21 illustrates an exploded view of modular Trellis arms and connectors, in accordance with an illustrative embodiment of the present invention.

FIG. 21 shows an exploded view of modular Trellis arms 1510 and Trellis base connectors 1516. The modular Trellis arms 1510 may connect together with other Trellis arms 1510 and a Trellis base connector 1516, Trellis bolts 2110 and Trellis nuts 2111 that pass through respective openings (not numbered) at the ends of the arms 1510. The Trellis components may be held in shape with a Trellis bracket 2105 that has pegs (not numbered) inserted into the arm openings in the modular Trellis arms 1510 and Trellis base connector 1516, respectively. A variety of Trellis brackets 2105 with different spacings between the pegs to better hold the adjacent joined Trellis arms 1510 at different angles. The arm openings in the Trellis arms 1510 may be sized to accept Trellis hoops 1556, 1546 (FIG. 15) having different diameters. The Trellis base connectors 1516 may be attached to a rim ring 277 (FIG. 15) or the filter module lower ring 295 (FIG. 10) with bolts 298 that pass through the holes 278 in the rim ring 277, as was heretofore described with respect to FIG. 10.

Figure 22:
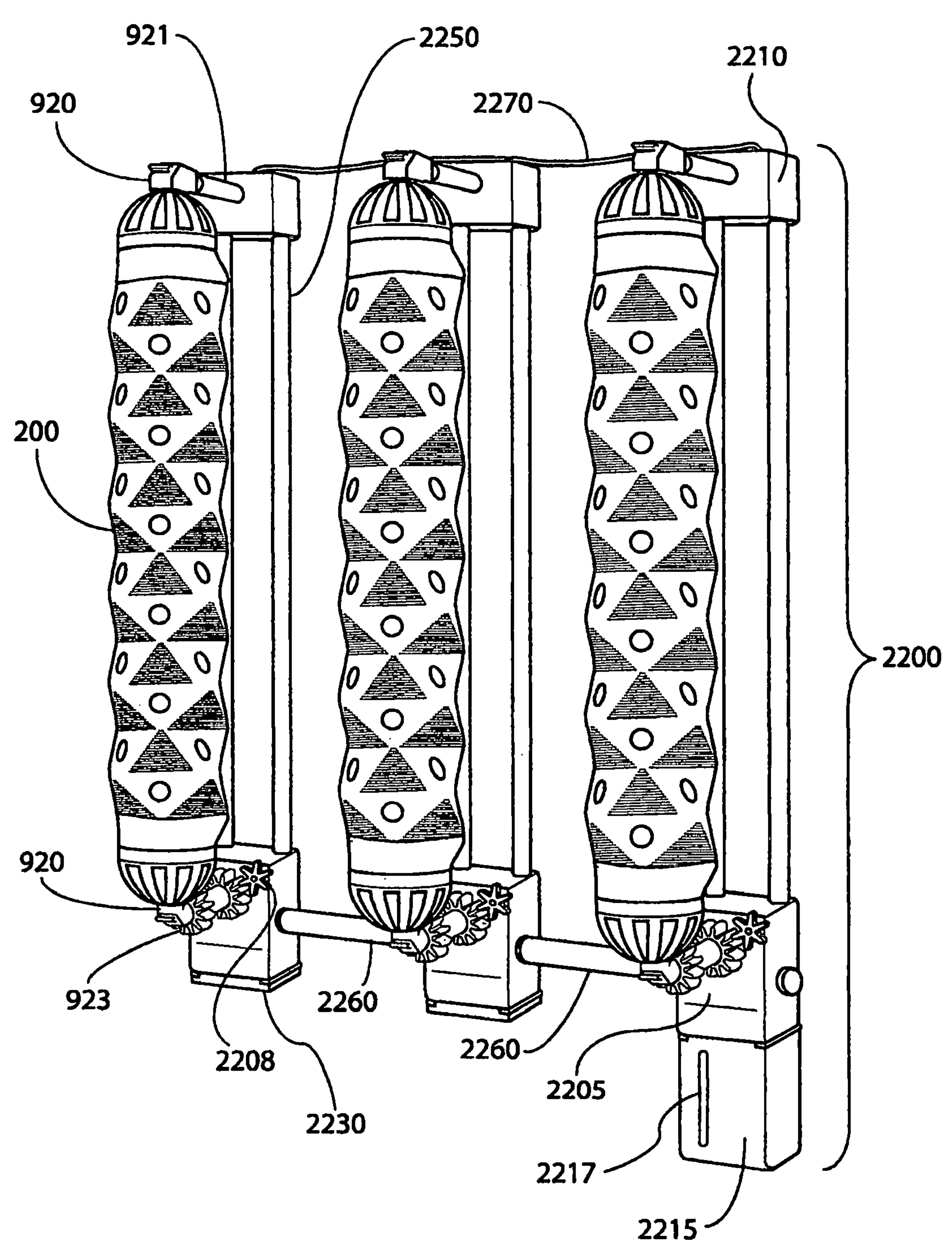
FIG. 22 illustrates a perspective view of wall mountable system, in accordance with an illustrative embodiment of the present invention.
Figure 23:
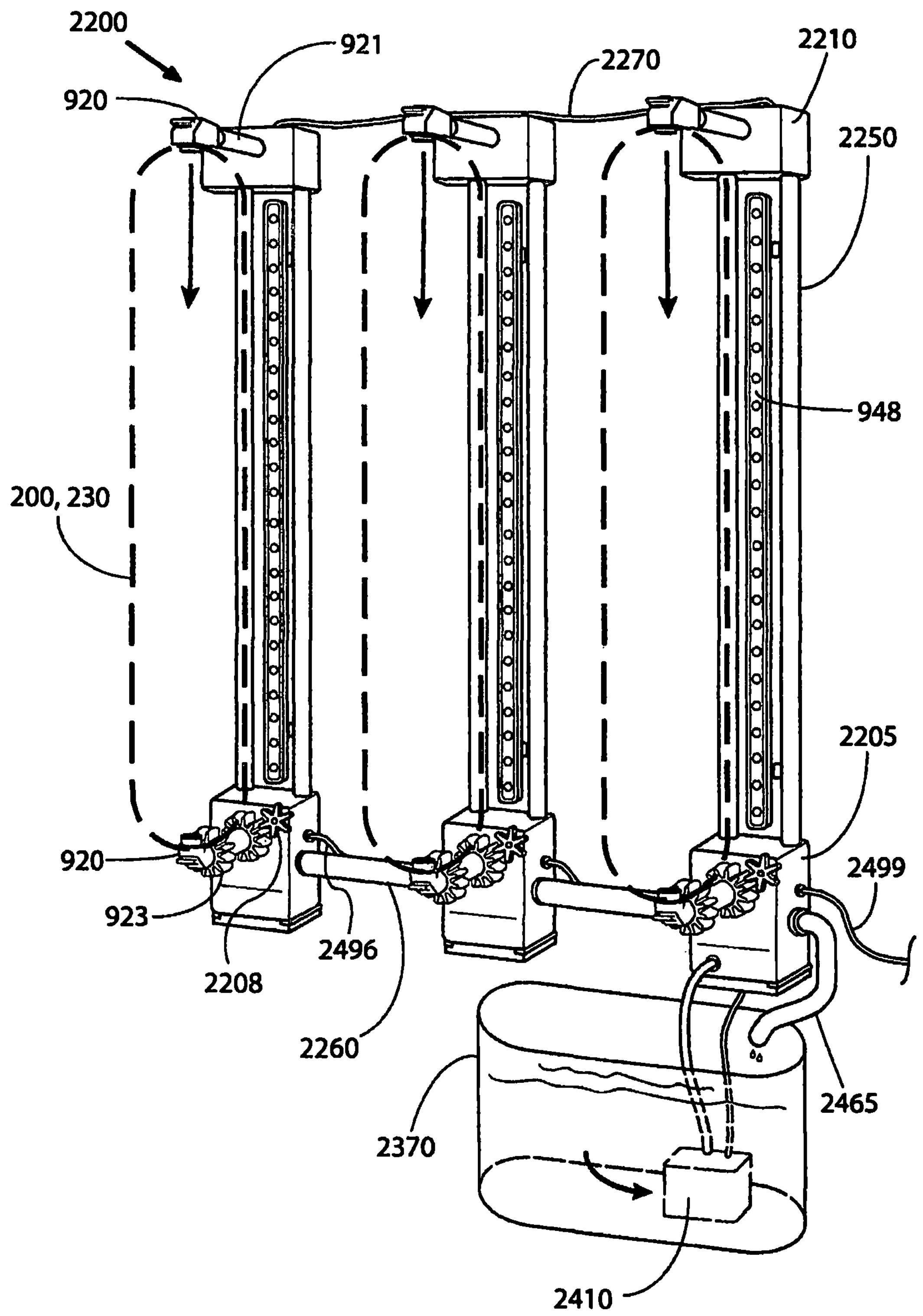
FIG. 23 illustrates support bars holding a light bar, in accordance with an illustrative embodiment of the present invention.
Figure 24:
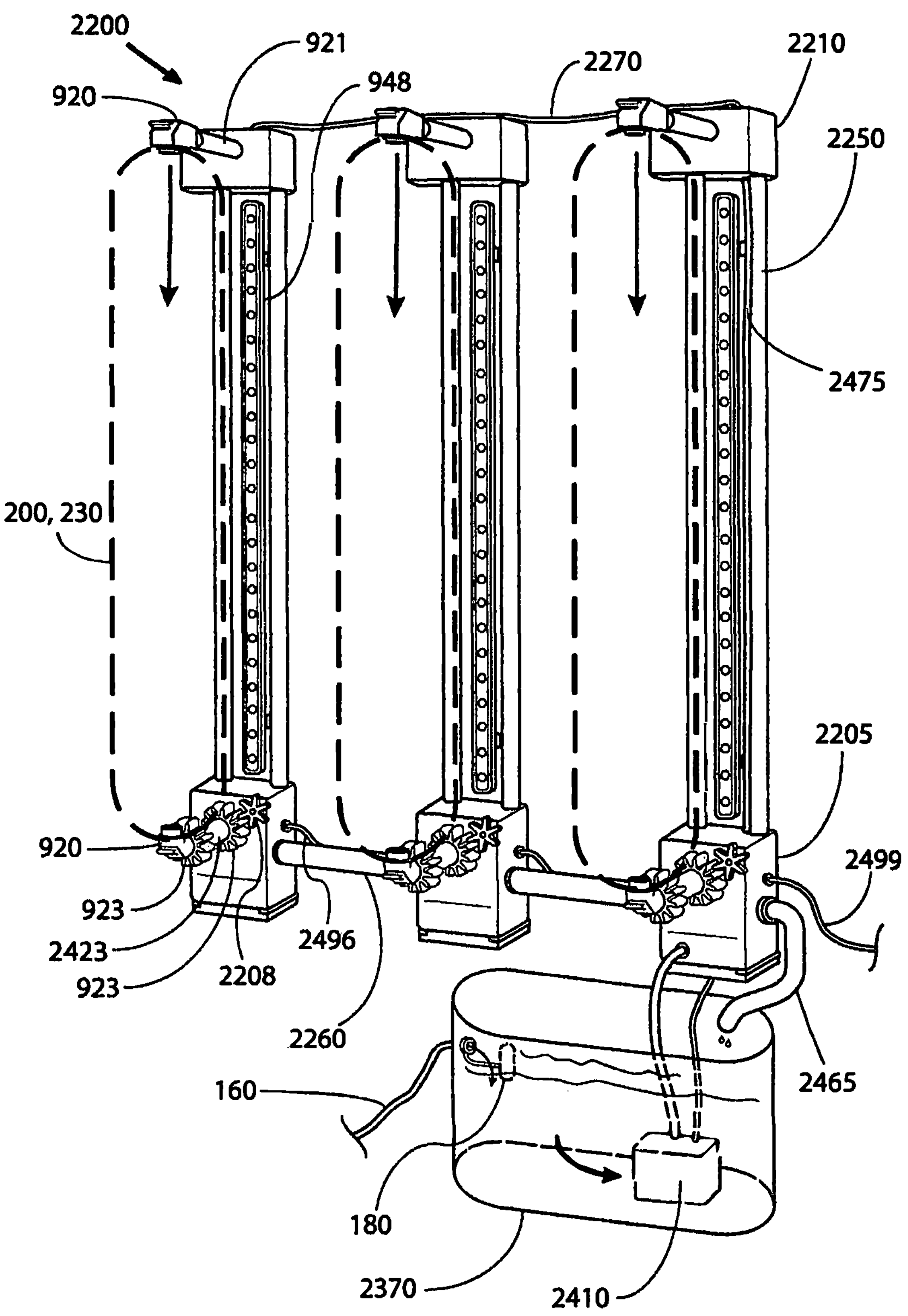
FIG. 24 illustrates a perspective side view of system with a floor reservoir, in accordance with an illustrative embodiment of the present invention.
Figure 25:
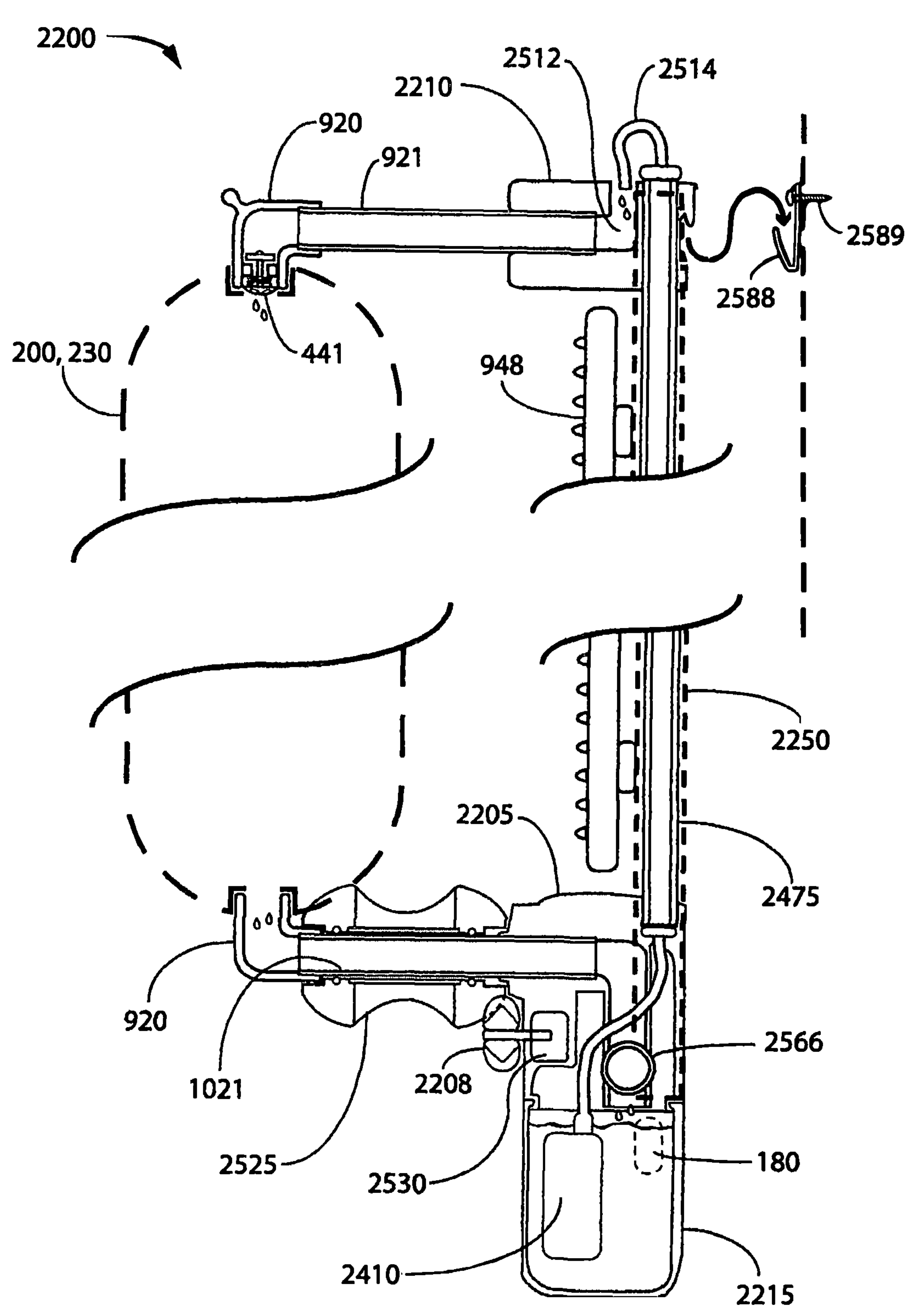
FIG. 25 illustrates a cutaway side view of system, in accordance with an illustrative embodiment of the present invention.

FIGS. 22-25 illustrate a perspective view of a typical wall mountable system 2200 according to some embodiments of the disclosure. A cutaway side view of system 2200 is illustrated in FIG. 25. The system 2200 may support at least one propagation module 200, 230 together with supply lines 2270, drain connector sections 2260, and electrical jumper connectors 2496 (FIG. 24) that may be used to hold or support the at least one propagation module 200, 230. In some embodiments, the propagation modules 200, 230 may be removable and may be interchanged with other propagation modules 200, 300 in other systems. Each propagation module 200, 230 may be rotatable about its center axis typically via the action of a drive gear 2208 that turns a set of geared rollers 923 joined together by a geared roller connector 2423, as illustrated in FIG. 24, with one of the geared rollers 923 typically engaging with the geared cap 210 (FIGS. 6A and 6B) of the propagation module 200, 230.

The geared roller connector 2423 may be made of PVC pipe, metal tubing, and/or other suitable material. As illustrated in FIG. 25, in some embodiments, a single geared roller assembly 2525 may include or encompass and replace the geared roller connector 2423 and meshing geared roller 923 of each propagation module 200, 230. The geared roller assembly 2525 may be formed as one piece or serve in the place of each geared roller 923 and geared roller connector 2423 set. A variety of geared roller assemblies 2525 may be available, with different overall lengths to accommodate longer or shorter sets of upper arms 921 and lower arms 1021 to be used. This expedient may vary the spacing between the propagation module 200, 232 and the other components of the system, or more precisely, the clearance space available for the plants 101 to grow out horizontally from the propagation module or modules 200, 230.

In some embodiments, each system 2200 may include a lower wall housing 2205 and an upper wall housing 2210 which may be joined by multiple, parallel, spaced-apart support bars 2250. The support bars 2250 may be fabricated from PVC pipe, steel and/or other metal tubing, aluminum extrusion, and/or other suitable materials. In embodiments in which they are hollow, the support bars 2250 may serve to contain a vertical supply line 2475 (FIG. 24) the purpose of which will be hereinafter described. As illustrated in FIG. 23, in some embodiments, the support bars 2250 of each system 2200 may to support at least one light bar 948 to supply supplemental light to the plants 101. The respective upper and lower wall housings 2210, 2205 may be fabricated from plastic and/or other suitable materials, and may have a number of openings or notches (not illustrated to accept plumbing connections and to tie in with the support bars 2250 and support the upper arms 921 and the lower arms 1021.

In some embodiments, the lower wall housing 2205 may be fitted with a wall unit reservoir 2215 that may have a see-through level indicator window 2217. The level indicator window 2217 may be fabricated from transparent material, and in some embodiments, may be tinted to resist growth of algae in the wall unit reservoir 2215. The wall unit reservoir 2215 may be removable and suitably positioned to facilitate addition of water and/or nutrient solution to the wall unit reservoir 2215. In some embodiments, a passage (not illustrated) may extend through the lower wall housing 2205 and connect with the wall unit reservoir 2215 to facilitate replacement of the water and/or nutrient solution in the wall unit reservoir 2215 through the passage. As illustrated in FIG. 24, in some embodiments, the wall unit reservoir 2215 may include a pump 2410 that connects with a vertical supply line 2475. The wall unit reservoir 2215 may also house a float valve assembly 180 to facilitate connection with another system 2200 and topping up automatically through use of a fluid line 160. The fluid line 160 may fit into an adapter fitting (not illustrated) which may be tapped into a side opening 2566 (FIG. 25) in the lower wall housing 2205, with an internal portion of the adapter fitting typically interfacing with the float valve assembly 180.

The lower wall housing 2205 also holds the motor 2530 that attaches to the drive gear 2208. The upper wall housing 2210 holds the upper arm 921 that is fitted with an elbow 920 then turn holds and fluidly connects with the propagation module 200, 230. The upper wall housing 2210 has an internal passageway 2512 that connects the upper arm 921 with a supply line 2270 or shorter supply line the connector 2514 that meets with a vertical supply line 2475. The upper wall housing has a recess to fit into a wall mounting bracket 2588 that may be attached to a suitable surface with a screw 2589 or other fastener. In some embodiments, the lower wall housing 2205 may also have a recess that fits into a wall mounting bracket 2588.

As further illustrated in FIG. 22, in applications in which several systems 2200 are connected together, the wall unit reservoir 2215 may be replaced by a seal-up section 2230 that may fit into the lower wall housing 2205, such that the passage (not illustrated) connected to the wall unit reservoir 2215 is sealed and water cannot escape. Multiple drain connector sections 2260 may connect individual systems 2200 by fitting into the side openings 2566 (FIG. 25) of the lower wall housing 2205. The drain connector sections 2260 may include PVC pipe sections or similar conduits that fit together through a friction-fit with the side openings 2566. The connected systems 2200 may be positioned at the same elevation, or the systems 2200 should be mounted such that they descend to a system 2200 having the wall unit reservoir 2215. Individual systems 2200 may be connected to a supply line 2270 (FIG. 24) that connects with the vertical supply line 2475, which may be connected to the pump 2410.

In some embodiments, the supply line 2270 may include tees and/or elbows (not illustrated) which communicate with openings through which system water is distributed into the top of each upper wall housing 2210. These openings may communicate with a passageway 2512 (FIG. 25) that connects to the upper arm 921 of each unit. A water or nutrient solution may flow down through the rotating propagation modules 200, 230 that are held by the overall system 2200, and through the drain connector sections 2260 to the pump 2410 for recirculation.

As illustrated in FIGS. 23-25, in some embodiments, the system 2200 may utilize a floor reservoir 2370 that is fabricated from a sealed metal tank and/or polyethylene tank. FIG. 24 shows a perspective side view of the system 2200 with the floor reservoir 2370. As illustrated in FIG. 25, the pump 2410 may fit inside the larger floor reservoir 2370 instead of the wall unit reservoir 2215. The wall unit reservoir 2215 could then be removed and replaced with a seal up section 2230. As illustrated in FIG. 24, in some embodiments, a drain extension 2465 may then be fitted into the side opening 2566 (FIG. 5) of the system 200 closest to the floor reservoir 2370, and the drain extension 2465 may be directed to empty into the floor reservoir 2370. As illustrated in FIG. 24, the floor reservoir 2370 may be fitted with the float valve assembly 180 and the fluid line 160 for keeping the system 2200 properly topped off.

In some embodiments, at least one connection point (not illustrated) on the lower wall housing 2205 may connect the pump 2410 to the vertical supply line 2475. As illustrated in FIG. 24, multiple electrical jumper connectors 2496 may connect the individual systems 2200 such that the motors 2530 (FIG. 25) receive electrical power through a power cord 2499 connected to a power source (not illustrated). The pump 2410 also may have a connection that ties into the power cord 2499, or alternatively, may have its own cord that extends directly out of the floor reservoir 2370 to a power source. All electrical connections may be waterproof.

Figure 26:
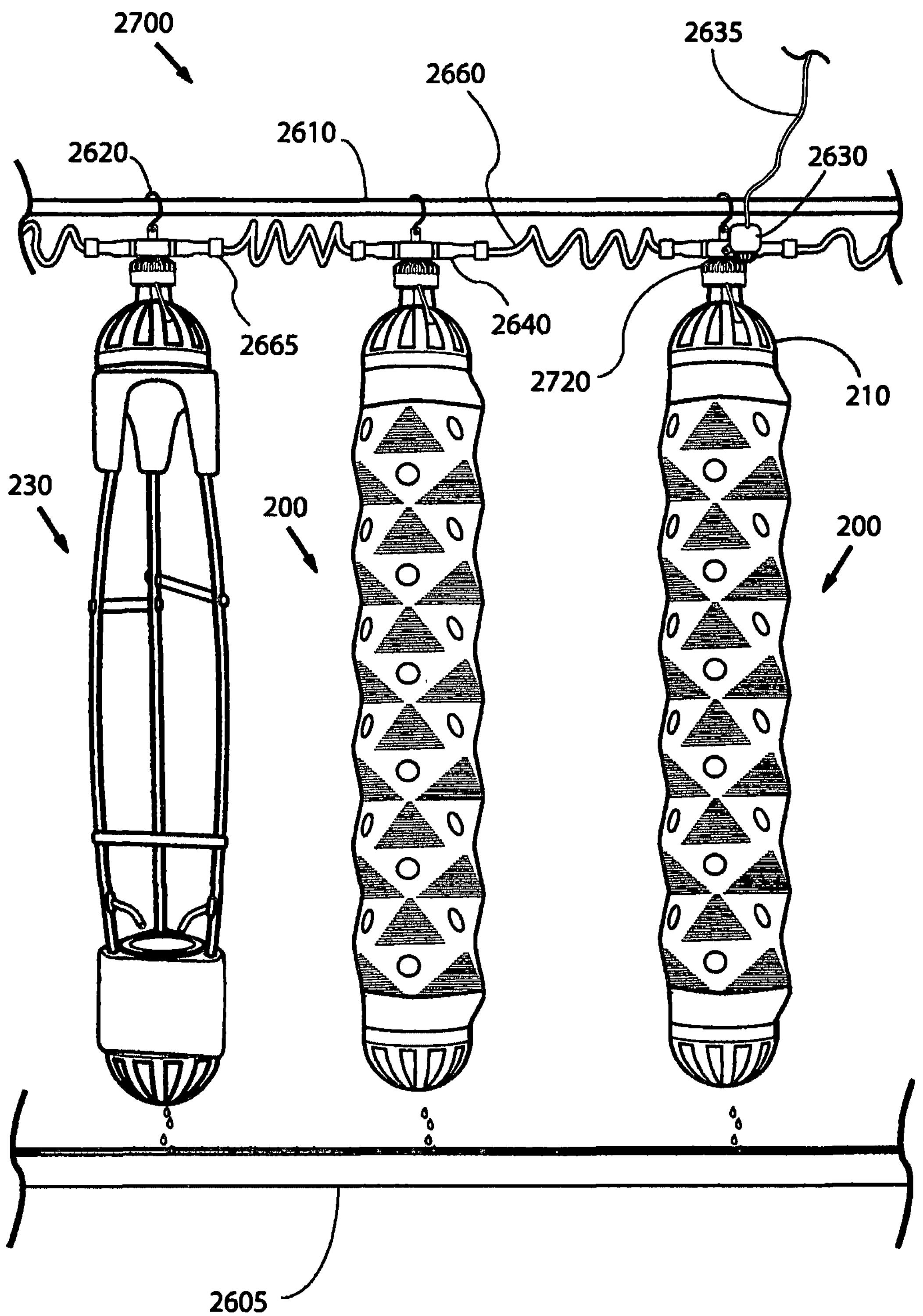
FIG. 26 illustrates a side view of propagation modules connected with hanger assemblies, in accordance with an illustrative embodiment of the present invention.
Figure 27:
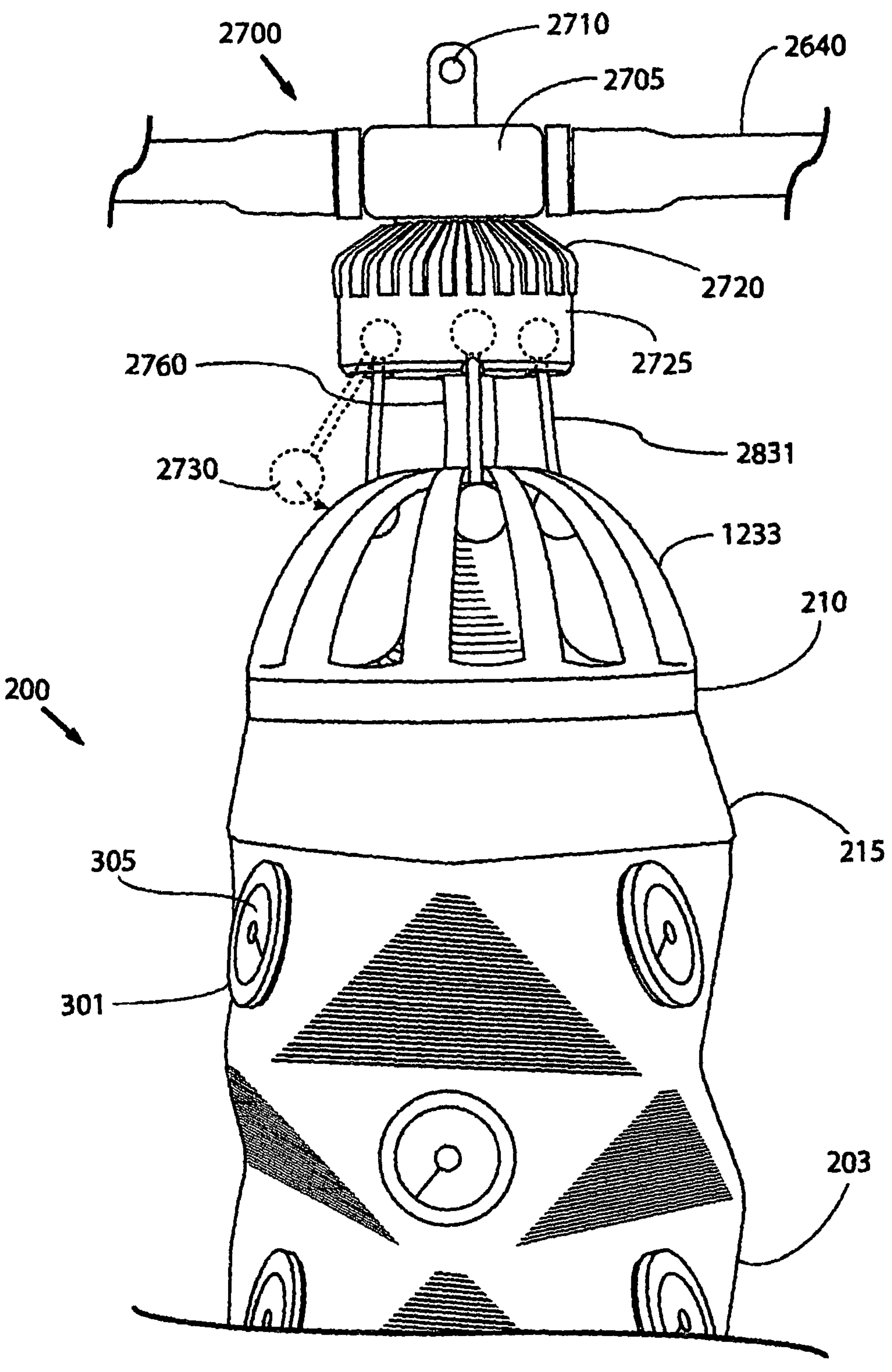
FIG. 27 illustrates a side view of a hanger assembly connecting with the gear cap of the propagation module, in accordance with an illustrative embodiment of the present invention.
Figure 28:
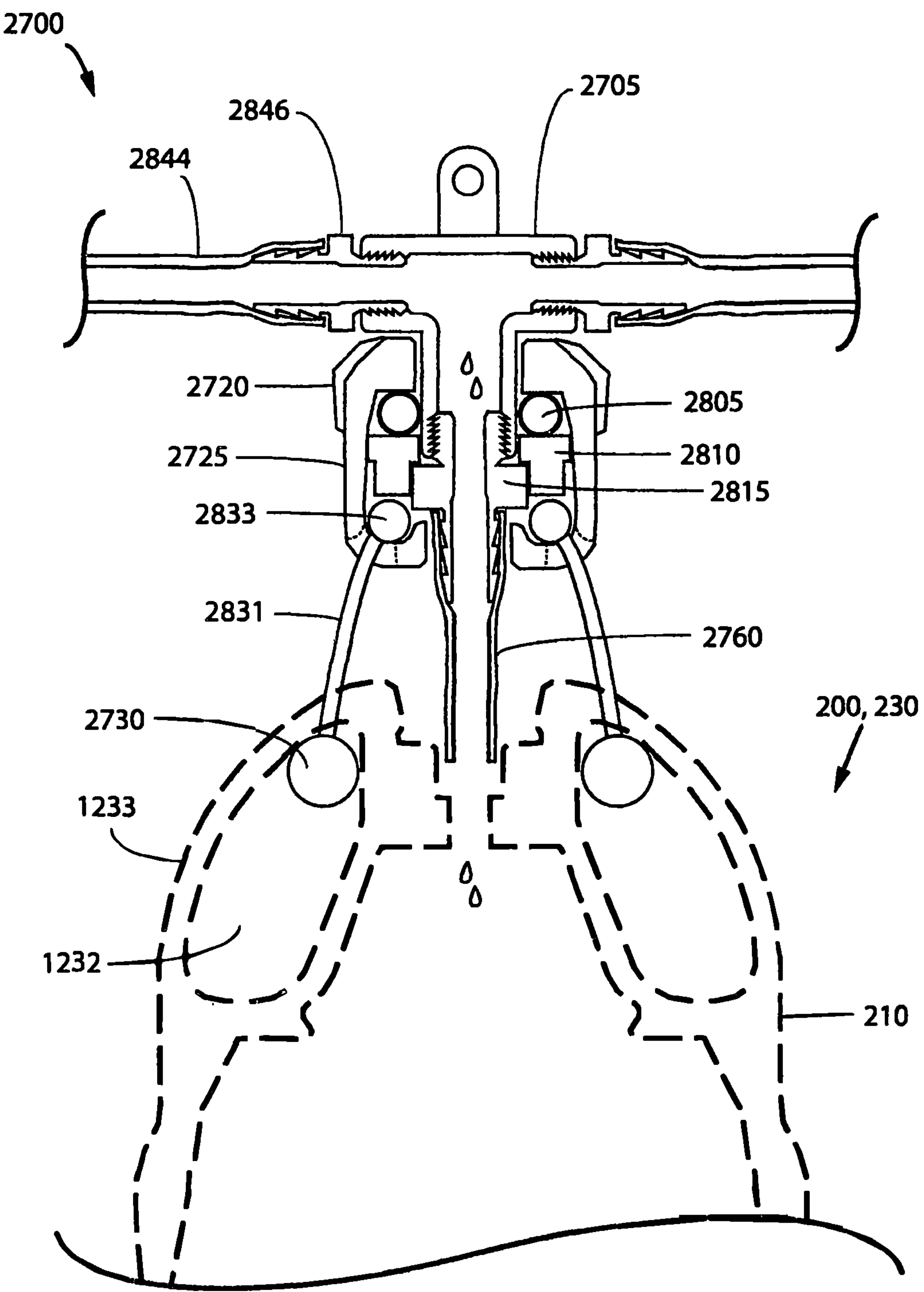
FIG. 28 illustrates a cutaway view of the hanger assembly connecting with a propagation module, in accordance with an illustrative embodiment of the present invention.

Turning now to FIGS. 26-28, a side view of multiple propagation modules 200, 230 interconnected to each other in a hanger assembly 2700 is illustrated. In this configuration, the propagation modules 200, 230 may be held by gripper ends 2730 (FIG. 27) and gripper arms 2831 (FIG.

28) that may form part of the hanger assembly 2700. The propagation modules 200, 230 may be configured for suspension from a fixed point or may be configurable for side-to-side movement along the lateral support bar 2610 using wire hanger 2620. The propagation modules 200, 230 may be configured for fluid connection to an overall recirculation system (not illustrated) through supply coil lines 2660 connected to hanger supply connectors 2640 on each propagation module 200, 230 typically via coil line connectors 2665. The system water may drain from the propagation modules 200, 230 into an uncovered or partially covered gutter 2605, to which a sump tank or other discharge element (not illustrated) may be connected.

As illustrated in FIG. 26, in some embodiments, the hanger assemblies 2700 may be fitted with a hanger rotator 2630 that clamps onto the hanger supply connector 2640 and engages with a rotatable knob teeth portion 2720 (FIG. 27) of the rotatable knob 2725. The hanger rotator 2630 may include a hanger rotator motor (not illustrated) inside a hanger rotator housing (not illustrated). The hanger rotator housing may have a shaft (not illustrated) that drivingly engages a drive gear (not illustrated) for rotation. The drive gear may mesh with knob teeth 2720 (FIG. 27) on a rotatable knob 2725 on each propagation module 200, 230. The hanger rotator motor may be connected to a power source through a power cord 2635. By operation of the hanger rotators 2630, their respective propagation modules 200, 230 may be rotated about their center axes while remaining attached to the hanger assembly 2700.

FIG. 27 illustrates a side view of a propagation module 200 connected to a hanger assembly 2700 through the gear cap 210 of the propagation module 200. The hanger assembly 2700 may include one or more hanger supply connectors 2640. A hanger tee 2705 may engage the hanger supply connector 2640 according to the knowledge of those skilled in the art. A rotatable knob 2725 having rotatable knob teeth 2720 may be supported by the hanger tee 2705. As illustrated in FIG. 28, multiple, movable gripper arms 2831 having gripper ends 2730 may extend from the rotatable knob 2725. A central hanger drop tube 2760 may be disposed in fluid communication with the hanger supply connector 2640 through the rotatable knob 2725. A drop tube connector 2815 may extend outwardly from the hanger drop tube 2760. A hanger race insert 2810 may seat on the drop tube connector 2815. Hanger ball bearings 2805 may be sandwiched between the rotatable knob 2725 and the hanger race insert 2810. The hanger tee 2705 may be molded of plastic and fitted with a hanger opening 2710 (FIG. 27) for the attachment of a wire hanger 2620 (FIG. 26). The hanger tee 2705 may be similar in design to a standard or conventional plumbing tee and may have three rounded threaded openings. The in-line threaded openings of the hanger tee 2705 may accept a respective pair of the hanger supply connectors 2640. The threaded opening of the downward lead of the hanger tee 2705 may accept the drop tube connector 2815 (FIG. 28) which, when threaded in place, may support the hanger race insert 2810 upon which the hanger ball bearings 2805 travel.

As further illustrated in FIG. 28, the rotatable knob 2725 may be kept in place by the drop tube connector 2815. The rotatable knob 2725 may be free to rotate on the hanger ball bearings 2805. The rotatable knob 2725 have the rotatable knob teeth 2720 molded onto its outer portion, and may include openings (not illustrated) through which the gripper arms 2831 extend. The gripper arms 2831 may have ball-like ends to form a pivot 2833 at the rotatable knob 2725. In some embodiments, the hanger assembly 2700 may include three gripper arms 2831 spaced evenly about the lowest part of the rotatable knob 2725. The three gripper arms 2831 may be fitted with gripper ends 2730 that may fit into a gap between individual teeth 1233 of the geared cap 210 of the propagation module 200, 230 with which the hanger assembly 2700 connects.

In some embodiments, the gap between the adjacent teeth 1233 on the geared cap 210 may taper and become narrower towards the center of the geared cap 210. Accordingly, the gripper ends 2730 of the respective gripper arms 2831 may enter into the gap at its wider point and become trapped at its narrow point. By lifting on the propagation module 200, 230, the gripper ends 2730 and gripper arms 2831 may be disengaged from the gaps between the individual teeth 1233 and the propagation module 200, 230 removed therefrom.

In some non-limiting embodiments, the geared cap 210 may have 12 teeth 1233, and thus, 12 gaps into which the gripper arms 2831 and gripper ends 2730 extend. In this manner, an arrangement of three gripper arms 2831 may work well with 12 potential gaps with which the gripper ends 2730 may interface such that the gripper arms 2831 can be evenly-spaced with respect to each other. In other embodiments however, the number of individual teeth 1233 on the geared cap 210 and the number of gripper arms 2831 on the hanger assembly 2700 may vary. In some embodiments, the lower end of the drop tube connector 2815 may be barbed to facilitate connection of the hanger drop tube 2760 therewith. The hanger drop tube 2760 may conduct system water from a supply line such as the coil lines 2660 (FIG. 26) to a central opening in the geared cap 210 of the propagation module 200, 230.

FIG. 28 illustrates a cutaway view of the hanger assembly 2700 with a propagation module 200, 230 connected thereto. The hanger tee 2705 may tie in with threaded and barbed end connectors 2846 for connection of the flexible supply lines 2844 with the hanger tee 2705. The hanger supply connectors 2640 (FIG. 26) may be threaded into the in-line threaded openings (not illustrated) of the hanger tee 2705 to facilitate connection of the supply coil lines 2660 with the hanger supply connectors 2640 typically through the coil line connectors 2665. The hanger assembly 2700 may allow for the propagation modules 200, 230 to be placed and arranged at a variety of locations and may also provide a simple configuration in which to grow and maintain plants 101 growing in the propagation modules 200, 230.

Figure 29:
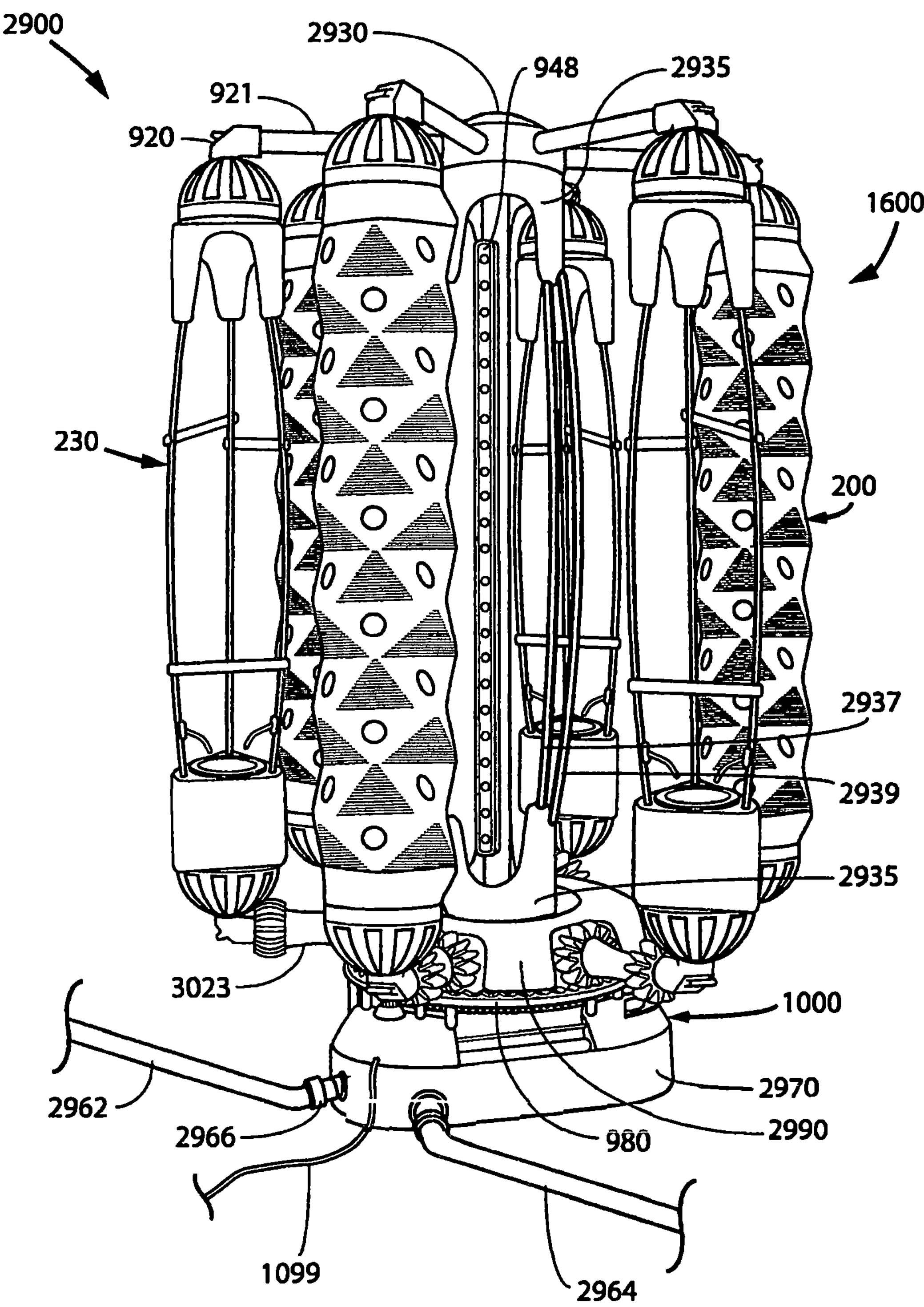
FIG. 29 illustrates a perspective side view of system used with a short tank, in accordance with an illustrative embodiment of the present invention.

Turning now to FIG. 29, a perspective side view of a typical system 2900 having a short tank 2970 is illustrated. The system 2900 may support a rotatable carousel 1600 that may be positioned into a drive assembly 1000 fitted into the short tank 2970. In some embodiments, the short tank 2970 may have at least one connection point opening (not illustrated) which interfaces with at least one connection point and at least one connector 2966 to tie in with at least one supply line 2962 and at least one drain line 2964. The carousel 1600 may be configured to hold various numbers of propagation modules 200, 230 configured to operate at various heights, with different numbers of tube segments 203 and tube segment couplers 204 (FIG. 3A), or different lengths of open center module tubes 235 (FIG. 3B). By swapping out carousel support rods and masts 944 (FIG. 9), longer or shorter versions of the carousel 1600 are possible.

The system 2900 may include a top carousel hub 2930 and a bottom carousel hub 3255 (FIG. 32) having openings to accept a total of six upper arms 921 in some embodiments. In other embodiments, the top carousel hub 2930 and bottom carousel hub 3255 may be fitted with 2-3 sets of upper arms 921 and lower arms 1021 to support a corresponding number of propagation modules 200, 230. A selection of top and bottom carousel hubs 2930, 3255 may be made available to vary the number of propagation modules 200, 230 that can be held. For example and without limitation, a top carousel hub 2930 and a bottom carousel hub 3255 having 12 total openings for upper arms 921 and lower arms 1021 may be configured to hold 12, six, four, three, or two propagation modules 200, 230. Unused openings may be plugged. In some embodiments, the carousel hubs 2930, 3255 may still be rotatable in this configuration.

Figure 32:
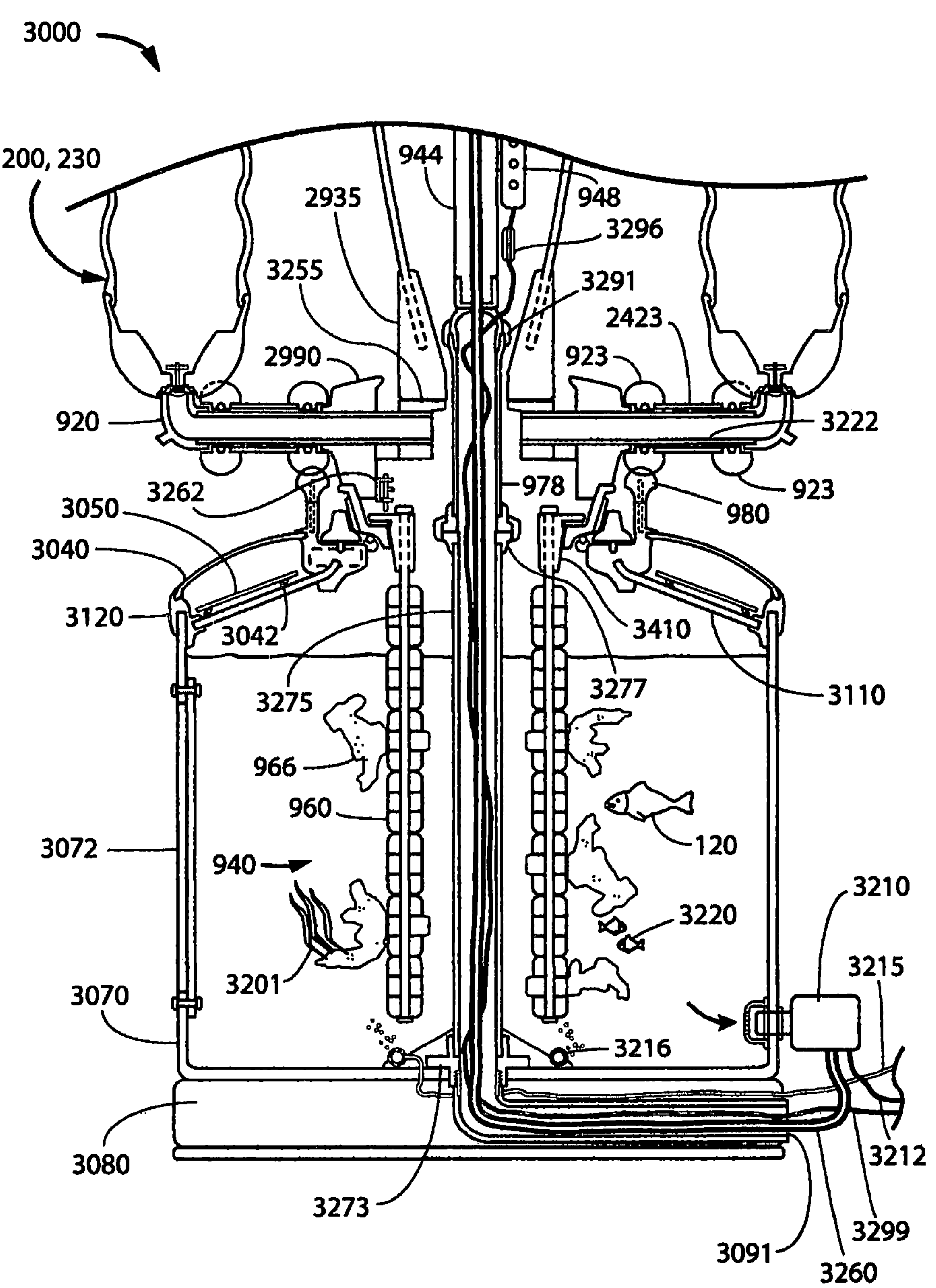
FIG. 32 illustrates a cutaway view of the lower portion of system used with pump, in accordance with an illustrative embodiment of the present invention.

In some embodiments, the system 2900 may include an inner carousel support rod 2937 and an outer carousel support rod 2939, which may be swapped for tubes in other embodiments. The rods 2937, 2939 may fit into a carousel support rod hub 2935 attached to the top carousel hub 2930. Inner and outer support rods 2937, 2939 may fit into a carousel support rod hub 2935 at the bottom that attaches to the bottom carousel hub 3255 (FIG. 32).

In some embodiments, the upper arms 921 may be fitted into the respective arm openings in the top carousel hub 2930 and lower arms 3222 (FIG. 32) may be fitted through respective arm openings in the skirted carousel base 2990, which in turn may be connected to a driven base ring 275 (FIG. 20). In alternative embodiments, the filter module upper ring 296 (FIG. 10) and filter module lower ring 295 may be used in place of the skirted carousel base 2990 (FIG. 29). Furthermore, in some embodiments, instead of only using one geared roller 923 per lower arm 3222, as shown in FIG. 9, two geared rollers 923 may be used along with a geared roller connector 2423 (FIG. 32) to form one connected unit; or in other embodiments, a geared roller assembly 3023 may also be used.

The geared roller assembly 3023 may engage with a fixed gear ring 980 (FIG. 16) may drivingly engaged by the drive assembly 1000. The use of inner carousel support rods 2937 and outer carousel support rods 2939 which may have a gradual bend may serve to provide sufficient support to the top carousel hub 2930 and the bottom carousel hub 3255. The arcing or gradual bend may also resist forces that may otherwise push the top carousel hub 2930 and bottom carousel hub 3255 (FIG. 32) out of proper alignment. In some embodiments, the short tank 2970 (FIG. 29) may be formed such that it has a center column base 975 to support a mast 944, as was heretofore described with respect to FIG. 9. The system 2900 may be operated as a standalone system when connected to the side mount assembly 1950 (FIG. 19), or may be connected to other systems 2900 through use of connection points and supply lines 2962 and drain lines 2964.

Figure 30:
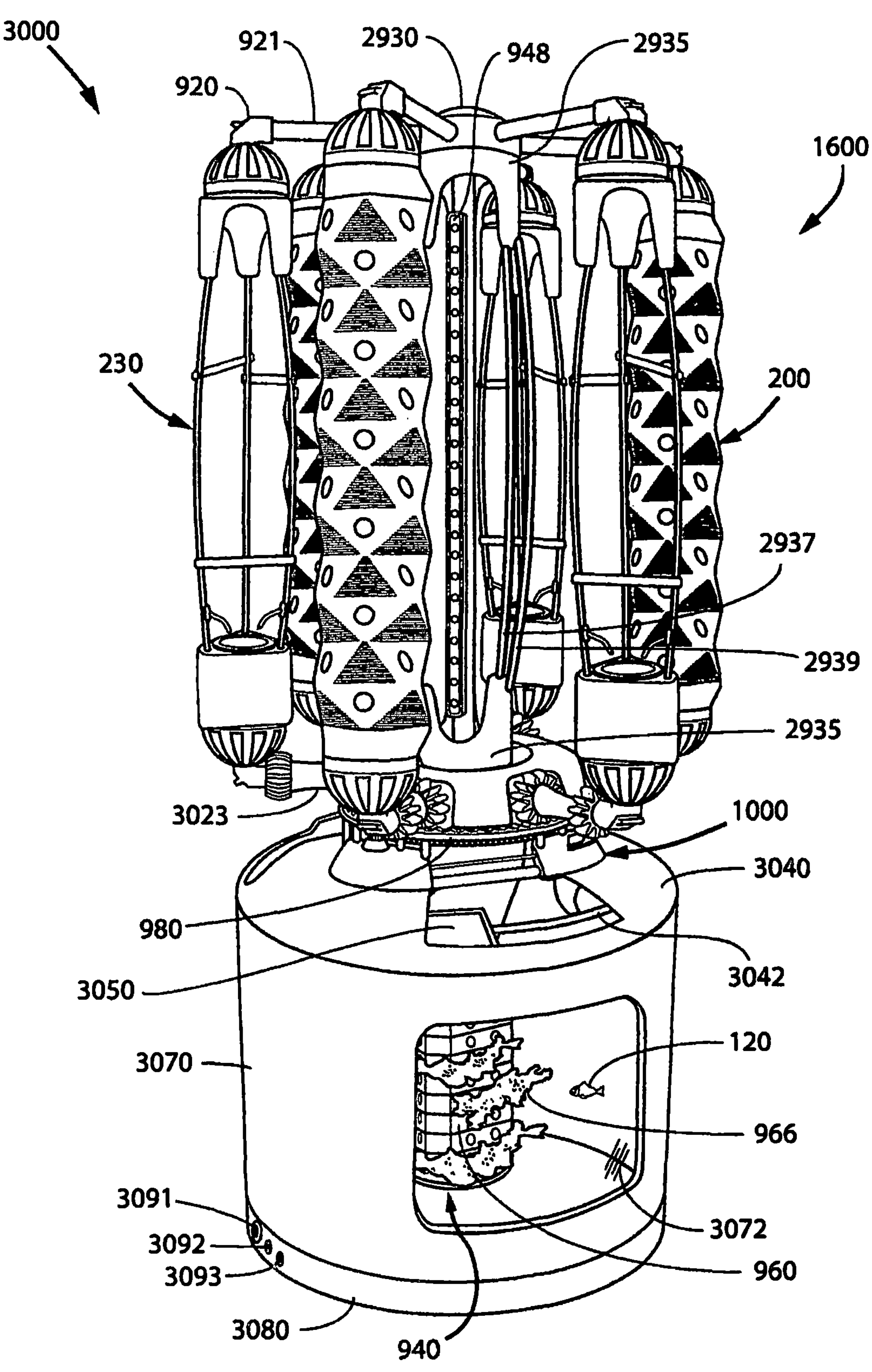
FIG. 30 shows a perspective side view of system used with a large round tank, in accordance with an illustrative embodiment of the present invention.
Figure 31:
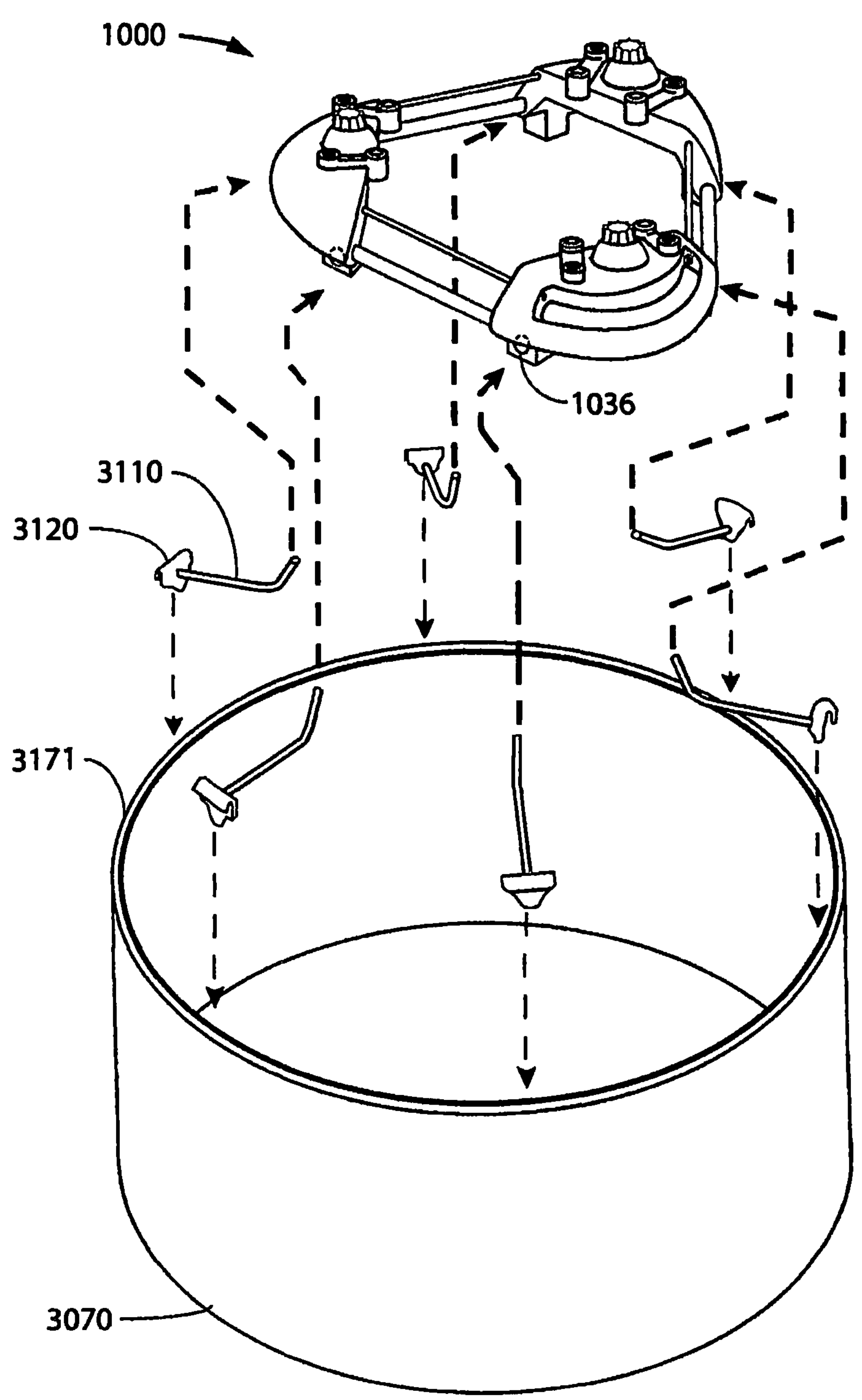
FIG. 31 illustrates a perspective exploded view of a large round tank, a drive assembly, and the arrangement of drive support arms fitted to rim adapters, in accordance with an illustrative embodiment of the present invention.

FIGS. 30 and 31 show perspective side views of a typical system 3000 having a large round tank 3070. The system 3000 may include a propagation module 230 that may be the same as or similar to that of the system 2900 (FIG. 29). The carousel portion of the propagation module 230 may be disposed in engagement with the drive assembly 1000, typically as was heretofore described. The large round tank 3070 may be fitted with at least one window 3072. The drive assembly 1000 may be connected to and supported by drive support arms 3110 (FIG. 31) that in turn may connect with the large round tank 3070. The drive support arms 3110 may be made of steel tubing and/or other suitable material and may fit into rim adapters 3120 that connect with the rim 3171 of the large round tank 3070. As further illustrated in FIG. 31, in some embodiments, multiple drive support arms 3110 may be used together and inserted into respective openings 1036 in the drive assembly 1000. The drive support arms 3110 may connect to the large round tank 3070 and support the carousel 1600 and other attached parts.

In some embodiments, the drive support arms 3110 may also be connected together with other parts that make up a tank lid system. As illustrated in FIG. 30, the tank lid system may include tank lid cover segments 3040, tank lid rings 3042, and tank lid shuttles 3050. The tank lid cover segments 3040 may be made of plastic and/or other suitable material and may support LED light strips 3351 (FIG. 33) on their undersides. The tank lid cover segments 3040 may serve to shield the tank 3070 and to keep an aquatic animal 120 inside the system and cover the tank lid shuttles 3050, which may be used for growing plants. The tank lid rings 3042 attached to the drive support arms 3110 may extend circumferentially around the large round tank 3070. The tank lid rings 3042 may be fabricated from metal and/or other suitable material and may be used to function as part of the structure keeping the drive support arms 3110 laterally connected.

Figure 33:
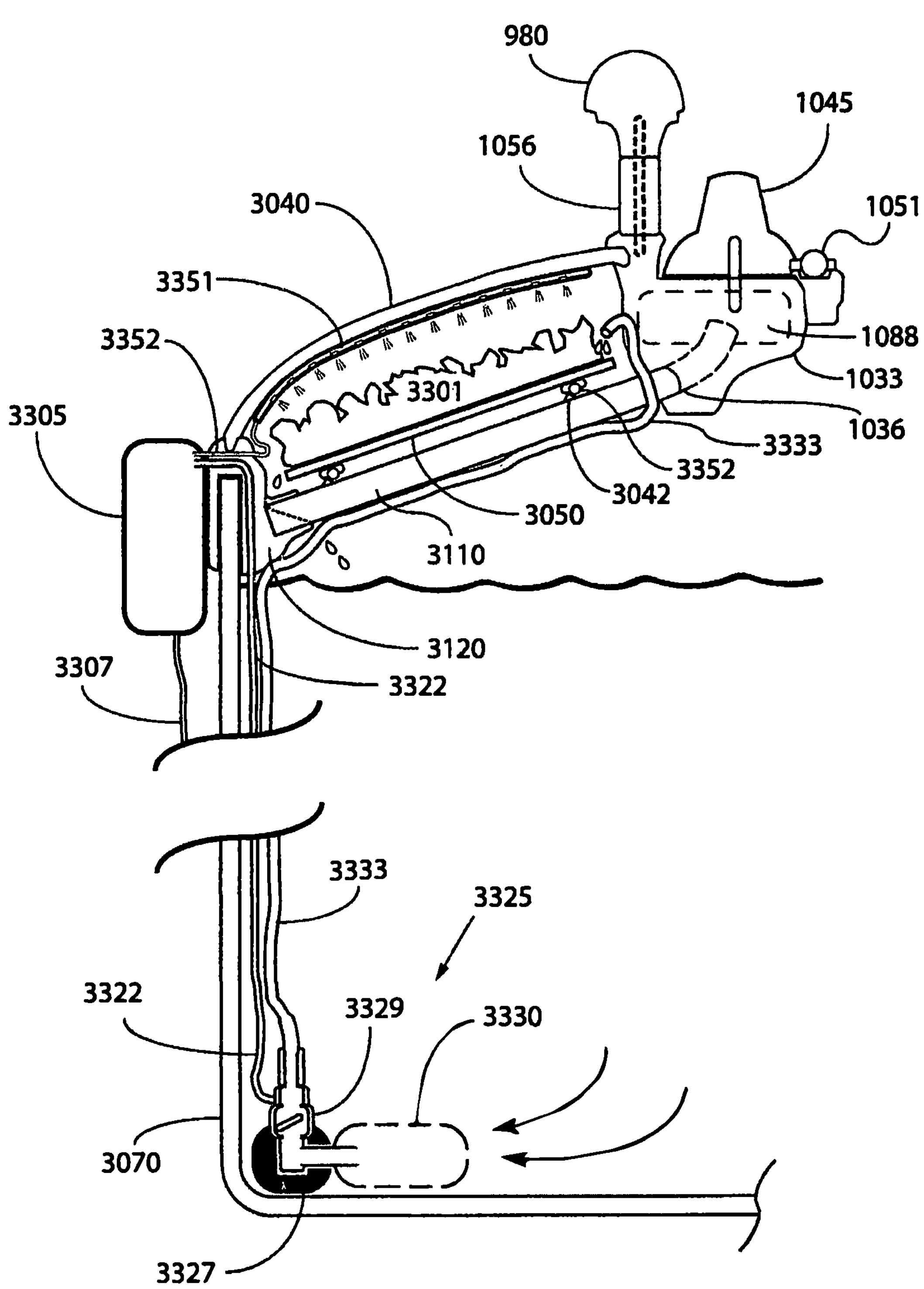
FIG. 33 illustrates a cutaway side view of the large round tank and tank lid system, in accordance with an illustrative embodiment of the present invention.

In some embodiments, the tank lid rings 3042 may also be used as guide rails for the tank lid shuttles 3050 to slide laterally thereon. As illustrated in FIG. 33, the tank lid shuttles 3050 may have small roller bars or roller wheels 3352 attached to their undersides at a spacing that fits the tank lid rings 3042, such that the tank lid shuttles 3050 may glide around the space above the system water that is contained in the large round tank 3070 as the roller wheels 3352 traverse the tank lid rings 3042. In some embodiments, the tank lid shuttles 3050 may be segmented and configured to hold flats of small plants 3301. The tank lid shuttles 3050 may be opaque or may include screen segments (not illustrated) which fill in the gaps between adjacent tank lid cover segments 3040. In some embodiments, the tank lid shuttles 3050 may be slid to the side and under the tank lid cover segments 3040 such that an aquatic animal 120 can be added to or removed from the large round tank 3070, or for feeding the aquatic animal 120. The tank lid shuttles 3050 may also serve to shield the large round tank 3070 from light and to keep aquatic animal 120 from escaping.

In some embodiments, the large round tank 3070 may be made of polyethylene and/or other suitable material. The large round tank 3070 may be formed with a center column base 975 (FIG. 16) or may have a PVC pipe column section 3275 (FIG. 32) fitted into a bulkhead fitting 3273 in the center floor of the large round tank 3070. The large round tank 3070 may rest on top of a tank base 3080 for insulation purposes as well as to contain connecting lines for water, air, and electricity. As illustrated in FIG. 2, the tank base 3080 may have connection points such as but not limited to an input output connection port 3091, an air line connection (not illustrated), and/or an electrical connection (not illustrated) that may operatively connect to the motor 1088 of the drive assembly 1000. The electrical line may run through one of the drive support arms 3110 and then down the inside or outside of the tank wall.

The large round tank 3070 may also contain the habitat assembly 940 with habitat hubs 960 and habitat features 966, as was heretofore described with respect to FIG. 9. The habitat assembly 940 may be rotated about the large round tank 3070 in a similar fashion to system 900. In an alternative configuration, the large round tank 3070 may be fitted with a tank lid system and drive assembly 1000, which may then configured to hold the filter type module 290 (FIG. 3D). The filter type module 290 may be connected to the habitat assembly 940 having habitat hubs 960 and habitat features 966 that may be driven by the drive assembly 1000 to rotate about the tank without the use of a carousel 1600. This configuration may be used in applications in which overhead space for a carousel 1600 is insufficient or extra production of fish is desired.

FIG. 31 illustrates a perspective exploded view of the large round tank 3070, drive assembly 1000, and the arrangement of drive support arms 3110 fitted to respective rim adapters 3120. In this view, the tank lid system and the tank lid rings 3042 (FIG. 33) are not shown.

FIG. 32 shows a cutaway view of the lower portion of the system 3000. The pump 3210 may be connected to the same side of the large round tank 3070 on which system water is drawn from the large round tank 3070 and then pumped through a supply line 3260 that runs into the input output connection port 3091, then flows up the PVC pipe column section 3275, through a mast coupling section (not numbered), and then up the mast 944 to be distributed by the diverter cap 1410 (FIG. 14). The system water may then flow through the propagation modules 200, 230 and return to the large round tank 3070 to complete the recirculation.

FIG. 32 shows an alternative to the filter module basin 291 (FIG. 3D). As illustrated in FIG. 34, a habitat assembly support ring 3410 may rest on a ring washer 3405, or set of ring washers 3405, that in turn may rest upon the inside lip of the driven base ring 275. The habitat assembly support ring 3410 and attached habitat assembly 940, including habitat connecting rods 961, habitat hubs 960, and habitat features 966, may rotate about the center vertical axis of the large round tank 3070. This rotation may occur at a different slower rate than the rate at which the driven base ring 275 is turned, as the drag of the system water on the habitat assembly 940 may slow rotation of the habitat assembly 940 in the system water, and only part of the rotational force from the driven base ring 275 may be transferred to the habitat assembly 940.

In other configurations, system water may circulate inside the large round tank 3070 by use of tangential returns and an additional pump (not illustrated). This expedient may supply, in a forced to turn, the habitat features and the whole habitat assembly 940. If connected by rotation connection pins 3262 to the rest of the overall carousel, the entire habitat assembly 940 could be made to rotate without the use of the motor 1088 in the drive assembly 1000. The motor or drive/idler cog 1045 (FIG. 20) may be disengaged in this configuration. In some embodiments, the habitat hubs 960 may have openings in the middle to allow a fixed pipe column section 3275 (FIG. 32) to pass through the habitat hubs 969 freely without obstruction.

In some embodiments, electricity may be supplied to at least one light bar 948 (FIG. 32) or set of light bars 948 typically through a master power line 3299 that may run through the mast coupling segment 978 (FIG. 16) and down the pipe column section 3275 through the bulkhead fitting 3273, and out through the input/output port connection 3091. The light bar 948 may be connected or disconnected through a waterproof electrical connector 3296. The mast power line 3299, which typically runs the light bars 948, may be connected to a timer or power switch (not illustrated) as it connects to a power source (not illustrated). In yet other embodiments, an air pump (not illustrated) may supply air to an air line (not illustrated) that connects with the air line connection 3092, which may then run to an air delivery ring 3216. This arrangement may supply oxygen to the aquatic animal 120.

In some embodiments, the habitat hubs 960 and habitat features 966 may provide attachment points for aquatic plants 3201, and may also provide overhangs and other areas in which smaller fish 3220 may hide from larger aquatic animals 120. This may facilitate the raising of multiple species or different sizes of fish in the same tank a viable option. Changes in organism health, food sources, spawning behavior, and/or other dynamics may be changed by the use of habitat hubs 960 and habitat features 966. Furthermore, self-sustaining system dynamics may also be made more possible with use of hub habitat hubs 960 and habitat features 966.

FIG. 33 illustrates a cutaway side view of a typical design for the large round tank 3070 and tank lid system. In some embodiments, flats of plants 3301 may be grown on the movable tank lid shuttles 3050, or alternatively, the tank lid shuttles maybe opaque or utilize screen sections to cover and protect the large round tank 3070. A rock wool starter plug sheet, microgreen grow mats, and/or other material (not illustrated) may be placed on the inclined tank lid shuttle 3050. Seeds and/or cuttings (not illustrated) may also be propagated on the plug sheets or grow mats. Furthermore, system water from the large round tank 3070 may irrigate the flats of plants 3301 typically by use of an air pump 3305. The air pump 3305 may be part of a side mount assembly 1950 (FIG. 19) and may force air down an airlift air line 3322 into an airlift intake base 3325. The airlift intake base 3325 may be weighted with airlift intake base ballast 3327 to keep it properly positioned.

System water entering from the large round tank 3070 may enter through a screened intake base filter 3330 to remove large particles and/or small fish from the water. The system water may be drawn into the airlift intake base 3325 by the action of air and water mixing and then flowing up the airlift tube 3333, where the air/water mixture may then be discharged from the end of the airlift tube 3333 into the tank lid shuttles 3050. The discharged air/water mixture may irrigate the flats of plants 3301. The action of the water rising in the airlift tube 3333 may be aided by a check valve 3329 positioned in the airlift intake base 3325. The airlift tube 3333 may be attached to drive support arms 3110 (FIG. 31), or in other configurations, may extend through the drive support arms 3110. In some embodiments, the tank lid system may include tank lid cover segments 3040, which may support the LED light strips 3351 that illuminate the flats of plants 3301.

FIG. 34 illustrates a cutaway detail side view the drive assembly 1000 and engagement with the lower portion of the carousel 1600 of the system 3000. This view illustrates how the driven base ring 275 may rest upon the driven base ring support rollers 1051. The driven base ring support rollers 1051 may facilitate rotation of the driven base ring 275 and correct engagement of the driven base ring 275 with the drive/idler cogs 1045 (FIG. 20). In this view, the driven base ring 275 may be attached to a skirted carousel base 2990 with bolts 3491. The fixed gear ring 980 may be attached to the drive assembly 1000 with bolts or pins 3481 that pass through the risers 1056. As the carousel 1600 is rotated, the geared roller 923 (FIG. 9) closest to the center may engage with the fixed gear ring 980 and revolve around the outside of the lower arm 3222. This revolution of the geared roller 923 may be transferred through the geared roller connector 2423 (FIG. 32) and to the attached outer geared roller 923, which may, in turn, engage the propagation module 200, 230.

Figure 35:
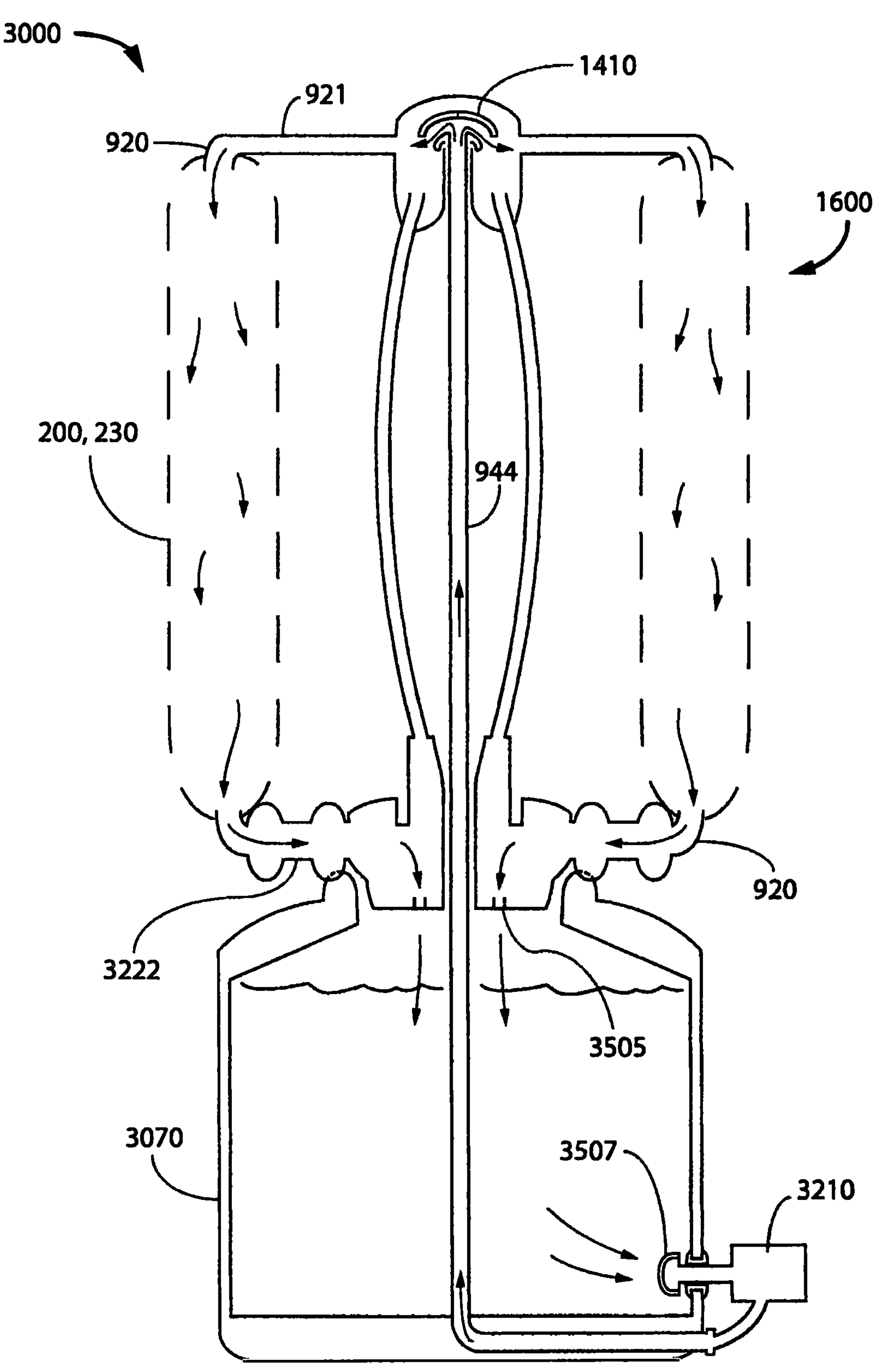
FIG. 35 illustrates a simplified side view of system water flow path, in accordance with an illustrative embodiment of the present invention.

FIG. 35 illustrates a simplified side view of the system 3000 diagramming a typical flow path of the system water through the system 3000. In other embodiments or configurations of the system 3000, alternative flow paths may apply. In this configuration, system water may be drawn through a screened opening 3507 to a pump 3210. The system water may then flow from the pump 3210 up the mast 944, where it may be distributed by a fixed diverter cap 1410 into the rotating center cavity at the top carousel hub 3255. The water may then travel through the upper arms 921 with attached elbows 920 rotating about the cent axis, and orbiting the double rotating propagation modules 200, 230. The system water may travel through the propagation modules 200, 230 and discharge from the elbows 920 at the bottom before traveling through the lower arms 3222 where the system water may then fall through gaps 3505 in the lower portion of the carousel 1600. The system water may then return to the tank 3070.

Figure 36:
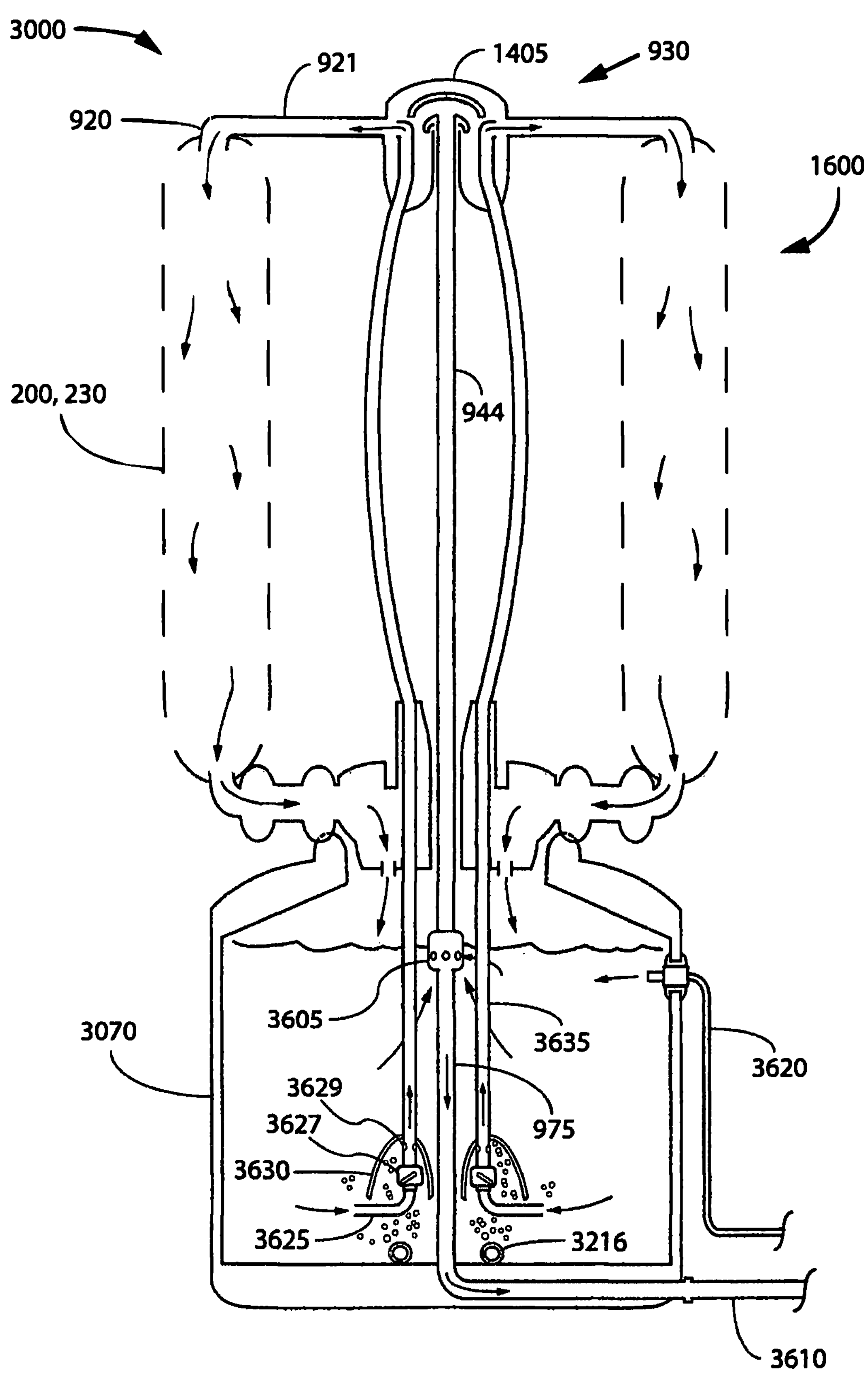
FIG. 36 illustrates a simplified side view of an alternate system water flow path, in accordance with an illustrative embodiment of the present invention.

FIG. 36 illustrates a simplified side view system 3000 diagramming an alternate flow path of the system water through the system 3000. In this alternative configuration, the center column base 975, or pipe column section, may support and center the mast 944 while serving as a drain. The system water may enter the center column base 975 through openings in a mast coupling segment 3605 which may couple the mast 944 to the center column base 975. The system water may fall through the center column base 975 to a drainpipe 3610. The system water may then flow to a pump (not illustrated) which may pump the system water through a supply line 3620 which returns the system water to the tank 3070. System water may be supplied to the rotating propagation modules 200, 230 by airlift action. In this regard, an air pump (not illustrated) may supply air to an air delivery ring 3216, which may release air into the system water in the tank 3070.

As further illustrated in FIG. 36, at least one water entry pipe 3625 may be disposed in the lower portion of the tank 3070. An airlifting tube 3635 may communicate with each water entry pipe 3625. The airlifting tube 3635 may extend from the tank 3070 along the center column base 975 and the mast 944 and terminate in fluid communication with the upper arms 921 at the top cap 1405. From the air delivery ring 3216, air bubbles may rise in the system water in the tank 3070 and may be captured by rotating collection funnels 3630 which may be rotatably attached to the respective airlifting tubes 3635 according to the knowledge of those skilled in the art. The collection funnels 3630 may concentrate the air bubbles, after which the resulting air may pass from the system water in the tank 3070 through openings 3629 in the airlifting tubes 3635. In the airlifting tubes 3635, the air may mix with system water that enters the water entry pipes 3625 from the tank 3070. In some embodiments, the water entry pipes 3625 may be oriented horizontally, with water entry points that are largely out of the rising column of air bubbles. The airlifting action may be aided by check valves 3627 in the airlifting tubes 3635. This air and water mixture may then rise in the airlifting tubes 3635, which may pass through the center open portion of the aquatic habitat assembly 940 rotating at a different rate than the carousel 1600, or may pass as part of the aquatic habitat assembly 940 connected to the rotating carousel 1600. At the top of the airlifting tubes 3635, the air and water mixture may pass the top carousel hub 930 and may be diverted to spill the water into the center cavity of the top carousel hub 930. The system water may then flow through the upper arms 921 and attached elbows 920 before entering the respective propagation modules 200, 230, and finally, back into the tank 3070. It is significant to note that this alternate water flow path may or may not incorporate aquatic habitat assemblies.

Figure 37:
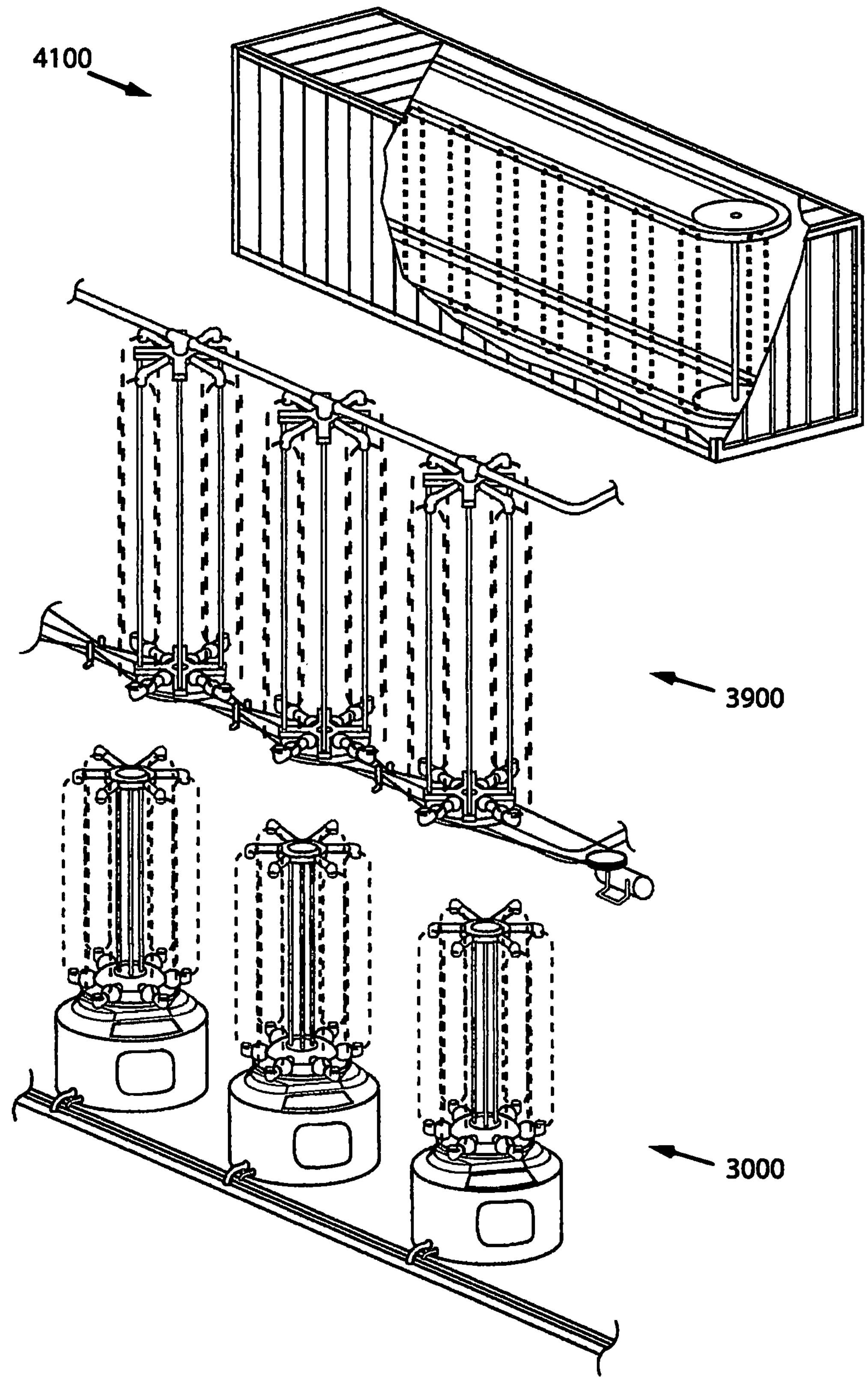
FIG. 37 illustrates a perspective view of three separate system configurations that are adapted for larger scale growth of plants, in accordance with an illustrative embodiment of the present invention.

FIG. 37 illustrates a perspective view of three separate system configurations that are adapted for larger scale growth of plants. The three system configurations may utilize propagation modules 200, 230 for vertical orientation. The tank 3070, propagation modules 200, 230 and other system elements of the system 3000 may be connected to a main supply line and a main drain line (not numbered) that may connect to other system elements, including larger capacity air and water pumps.

A system 3900 may utilize a drive belt drivingly coupled to a motor to rotate the carousels 1600 which hold the propagation modules 200, 230. This system configuration may utilize an overhead supply pipe assembly (not numbered) that may tie in with support members such as a ceiling of an insulated shipping container or a greenhouse purlin, for example and without limitation. As illustrated in FIGS. 41-44, in a system 4100, the propagation modules 200, 230 may rotate about their center axes, and may additionally travel along at least one oval-shaped track 4250, 4475. This system configuration may require overhead support, such as by an insulated shipping container 4105, for example and without limitation.

Figure 38:
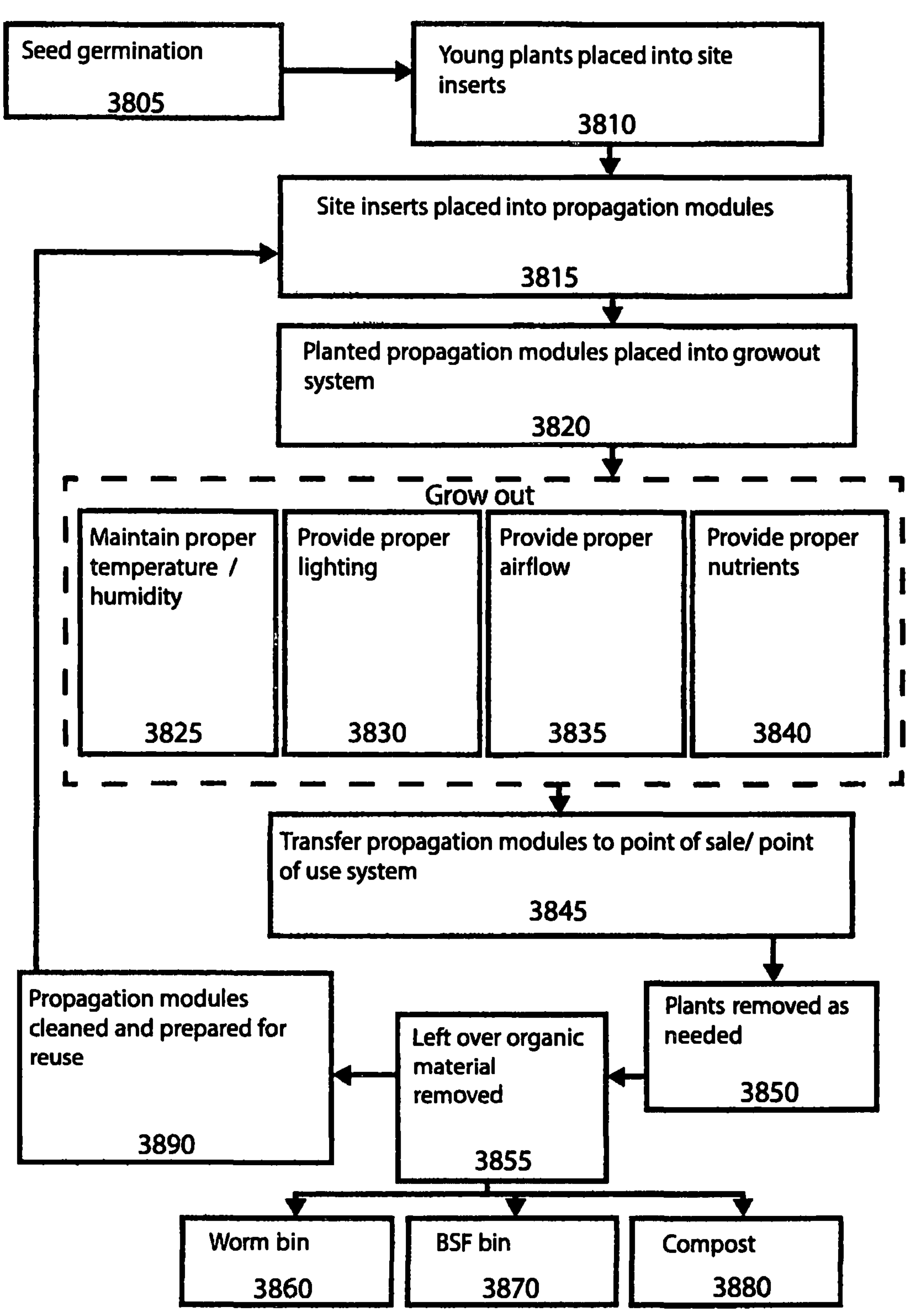
FIG. 38 illustrates a flowchart of a process for operating large-scale production systems and the tie in with smaller scale point-of-sale systems, in accordance with an illustrative embodiment of the present invention.

FIG. 38 illustrates a typical flowchart for operating large-scale production systems that tie in with smaller scale point-of-sale systems. A Step 3805 may include providing seed germination. In Step 3810, young plants may be placed into site inserts. In Step 3815, the site inserts may be placed into propagation modules. Step 3820 may include placement of the planted propagation modules into grow-out systems. The grow-out section of the flowchart illustrates that Step 3825 may include maintaining proper temperature and humidity; Step 3830 may include providing proper lighting; Step 3835 may include providing proper airflow; and Step 3840 may include providing proper nutrients.

In some embodiments, a Step 3845 may include transferring propagation modules to a point-of-sale/point-of-use system. Step 3850 may include removing the plants, as needed. Step 3855 may include removing leftover organic material. Step 3890 may include cleaning the propagation modules and preparing them for reuse. In some embodiments, the leftover organic material can be recycled. Recycling may include a Step 3860 of placing the leftover organic material it in a worm bin; a Step 3870 of placing the plants in a Black Soldier Fly (BSF) composition; and a Step 3880 of placing the leftover plant parts in compost. Those skilled in the art will recognize that BSF can rapidly consume numerous types of waste beyond just leftover plant waste such as food waste from markets and restaurants. BSF has high protein and fat content, and thus, makes good fish food.

Figure 39:
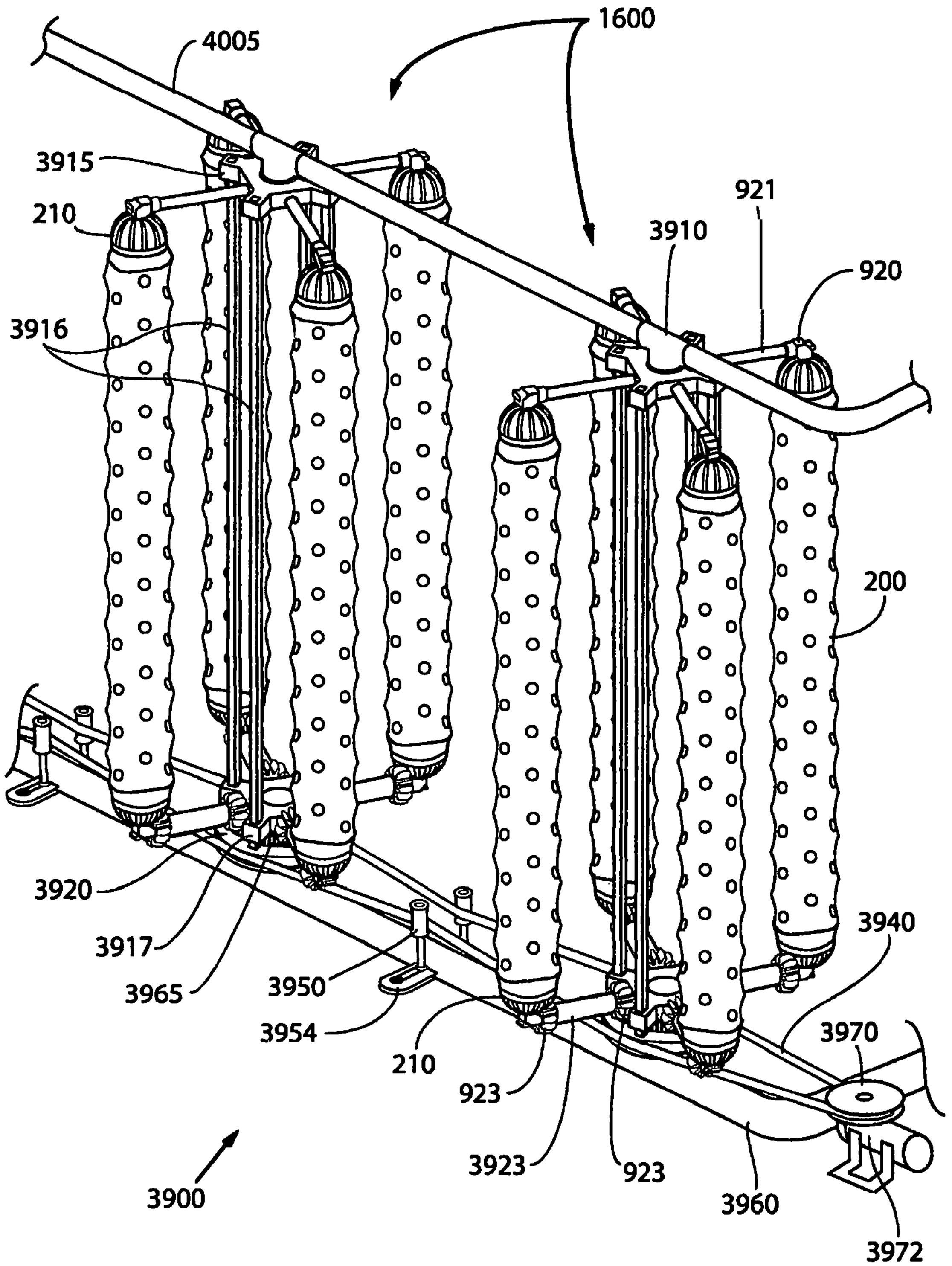
FIG. 39 illustrates a perspective side view of system used to drive a drive belt that engages with the base pulley ring connected to the rest of the carousel components, in accordance with an illustrative embodiment of the present invention.
Figure 40:
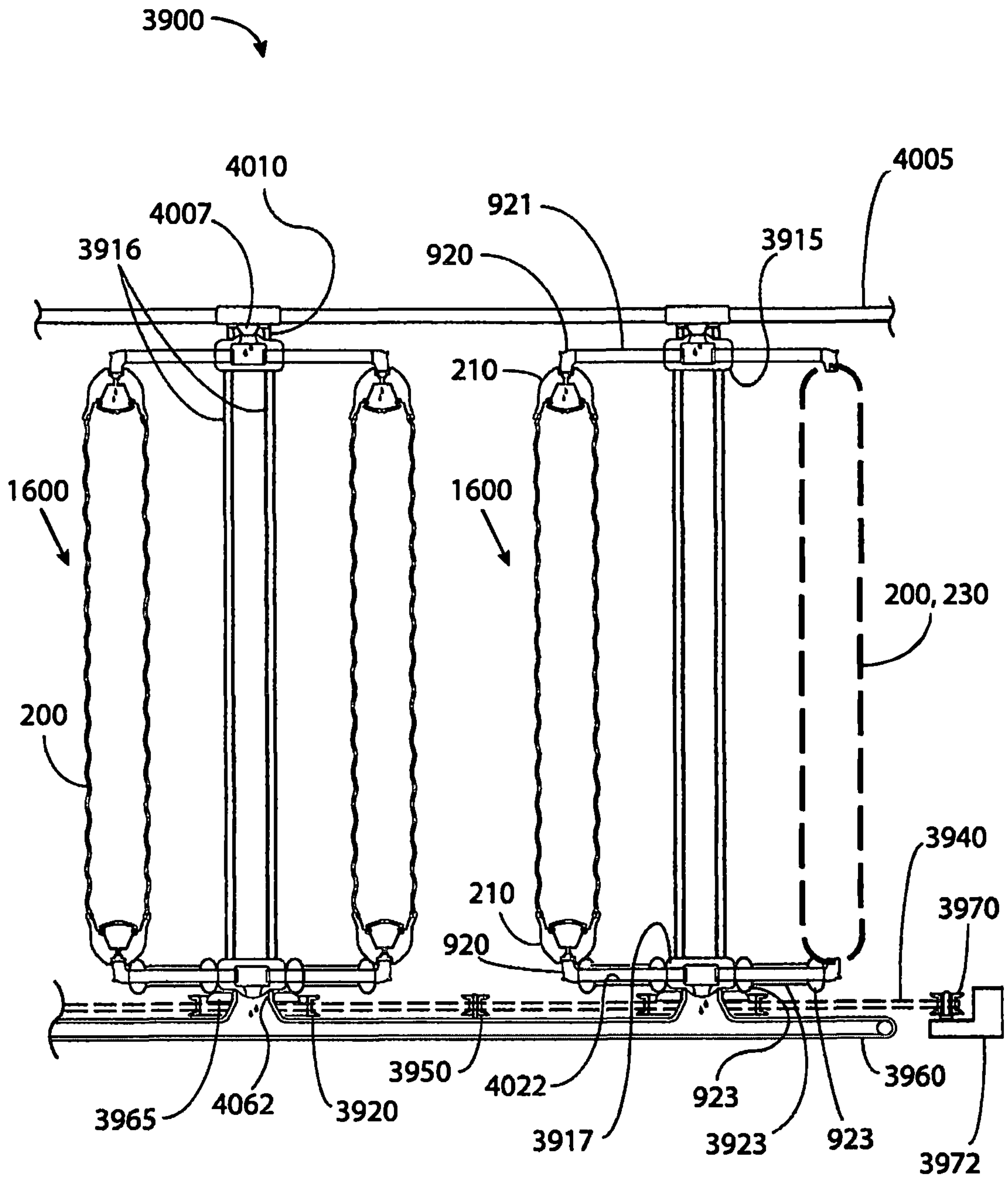
FIG. 40 illustrates a cutaway side view of system operational inside a shipping container, in accordance with an illustrative embodiment of the present invention.

FIG. 39 illustrates a perspective side view and FIG. 40 illustrates a cutaway side view of the system 3900 which may be used to drive a drive belt 3940 that engages with a base pulley ring 3920 coupled to the rest of the carousel components. The carousels 1600 may rotate about their center vertical axis. In this manner, the propagation modules 200, 230 can be rotated about their respective center axis while being orbited or rotated in a circle along with the corresponding carousel 1600. This rotating, orbiting movement of the propagation modules 200, 230 may provide plants situated in the propagation modules 200, 230 even exposure to a light source (not illustrated) such as artificial lights positioned to the side of the carousels 1600, for example and without limitation, and may also provide uniform airflow to the plants.

The rotating/orbiting motion of the propagation modules 200, 230 may also enable insertion of the propagation modules 200, 230 from one side of the carousel 1600, and manipulation of and other interactions with the propagation modules 200, 230, such as visual inspection or plant treatment, may be carried out at set points. The carousels 1600 may include upper carousel hubs 3915, lower carousel hubs 3917, connecting struts 3916, upper arms 921, lower arms 4022 (FIG. 40), elbows 920, geared rollers 923, geared roller connectors 3923, and base pulley rings 3920. The upper and lower arms 921, 4022 may pinch and hold the propagation modules 200, 230 as they are being rotated through engagement of the geared rollers 923 with the geared caps 210 (FIG. 3A) of the propagation modules 200, 230. Furthermore, the stationary components of this configuration may include upper pivot rings 4010, upper supply lines 4005, lower pivot rings 4062, fixed pivot ring gears 3965, lower drain lines 3960, drive belt tensioners 3950, and a motor 3970 to drive the belt drive gear 3970.

In the system configurations illustrated in FIGS. 39 and 40, the upper carousel hubs 3915 and lower carousel hubs 3917 may be generally cross-shaped parts with openings (not illustrated) which accept the respective upper arms 921 and lower arms 4022 that are positioned between the carousel hubs 3915, 3917 extending farthest out. As shown, the carousel hubs 3915, 3917 may accept four sets of upper arms 921 and lower arms 4022. The carousel hubs 3915, 3917 could however, be designed to hold a different number of sets of upper arm 921 and lower arms 4022.

The connecting struts 3916 may connect the upper carousel hubs 3915 to the lower carousel hubs 3917. The connecting struts 3916 may extend through the lower carousel hub 3917 to connect with the base pulley ring 3920. In some embodiments, the connecting struts 3916 may be fabricated from metal extrusion tubing and/or other suitable material. The connecting struts 3916 may be held in place using of bolts, brackets, set screws, and/or other fastening hardware (not illustrated). In some embodiments, the connecting struts 3916 may be rigid and straight. In other embodiments however, the connecting struts 3916 may be arced or curved, similar to the inner and outer carousel support rods 2939 (FIG. 30) heretofore described with respect to the system 2900 and the system 3000. In this alternative way of connecting the upper and lower carousel hubs, the whole carousel acts as a spring and could be fashioned so that the carousel 1600 can be compressed for insertion or removal from its running position between the upper pivot ring 4010 and lower pivot ring 4062.

In some embodiments, geared rollers 923 are attached to geared roller connectors 3923, which fit around and revolve around the outside of the lower arms 4022. The innermost geared roller 923 engages with the fixed pivot ring gear 3965 that is attached to the lower pivot ring 4062. The geared roller connector 3923 connects the innermost geared roller 923 two and outermost geared roller 923.

As further illustrated in FIGS. 39 and 40, in some embodiments, the outermost geared roller 923 may engage with the geared cap 210 (FIG. 3A) of the propagation module 200, 230. The outermost geared roller 923 may revolve the propagation module 200, 230 as a carousel 1600 is turned typically by action of the drive belt 3940 engaging the base pulley ring 3920. In some embodiments, the upper carousel hub 3915 may be formed with a shallow bulge (not illustrated) positioned within the upper pivot ring 4010 as the carousel 1600 rotates. An opening (not illustrated) may facilitate entry of system water into the center cavity of the upper carousel hub 3915. The opening may be positioned at the center of the shallow bulge in the upper carousel hub 3915.

As illustrated in FIG. 40, in some embodiments, a funnel port 4007 may be positioned above the centered opening in the upper carousel hub 3915. The funnel port 4007 may connect to the upper supply line 4005. The funnel port 4007 may distribute fluid into the centered opening in the upper carousel hub 3915. At the bottom of the carousel 1600, a shallow bulge (not illustrated) may protrude from the lower portion of the lower carousel hub 3917 with an exit opening (not illustrated) at the center of rotation. Fluid may discharge through the exit opening and flow through the lower drain line 3960 to a pump or other system element (not illustrated). The entire carousel 1600 may rotate with the shallow bulge positioned within the upper pivot ring 4010 and the lower pivot ring 4062. Ball bearings (not illustrated) may be provided at contact points between the upper and lower carousel hubs 3915, 3917 and the respective upper and lower pivot rings 4010, 4062.

In some embodiments, a motor 3972 turns a belt drive gear 3970, which in turn moves the drive belt 3940, which engages the base pulley ring 3920 of the carousel 1600 of the system. The drive belt 3940 is aided in engagement by drive belt tensioners 3950 that may be fitted to drive belt tensioner holders 3954 with slots to move the drive belt tensioners 3952 lesser or increase the amount of slack in the drive belt 3940. In some embodiments, the end of the run of carousels 1600 may have a drive belt idler.

Figure 41:
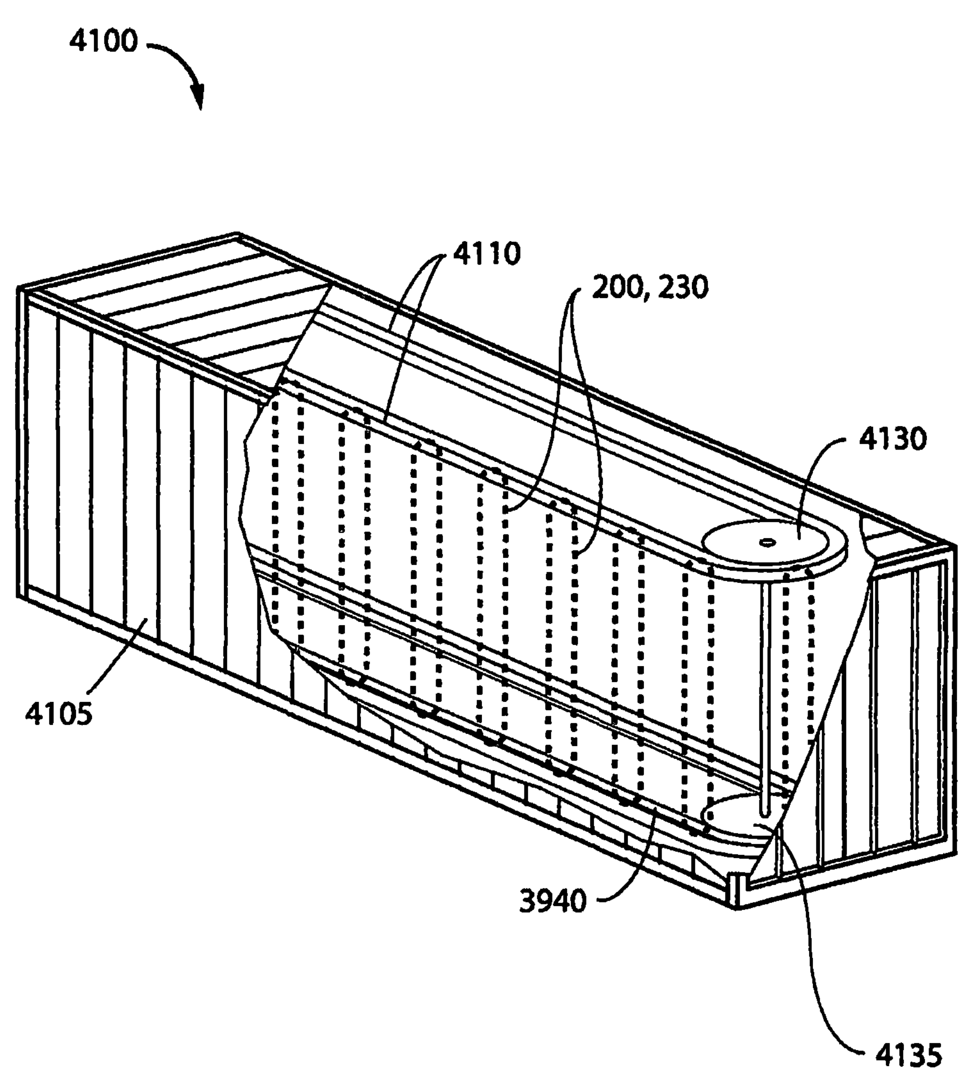
FIG. 41 illustrates a perspective sectional view of system with a belt rotating propagation modules in shipping container, in accordance with an illustrative embodiment of the present invention.

FIG. 40 illustrates a cutaway side view of the system 3900 which may be operational inside a shipping container 4105 or other suitable container or location with a fixed overhead surface. FIG. 41 shows a perspective sectional view of the system 4100 with a drive belt 3940 configured to rotate propagation modules 200, 230 in the shipping container 4105. A drive motor (not illustrated) may drivingly engage the drive belt 3940. The propagation modules 200, 230 may rotate about their respective center vertical axis while traveling in a loop around the interior of the shipping container 4105. This rotation and travel path of the propagation modules 200, 230 may facilitate travel of the propagation modules 200, 230 past set points (not illustrated) for insertion and/or removal of the propagation modules 200, 230 as well as monitoring, treatment, lighting, and airflow.

Figure 42:
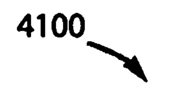
FIG. 42 illustrates a perspective sectional view of propagation modules in a shipping container, in accordance with an illustrative embodiment of the present invention.
Figure 42:
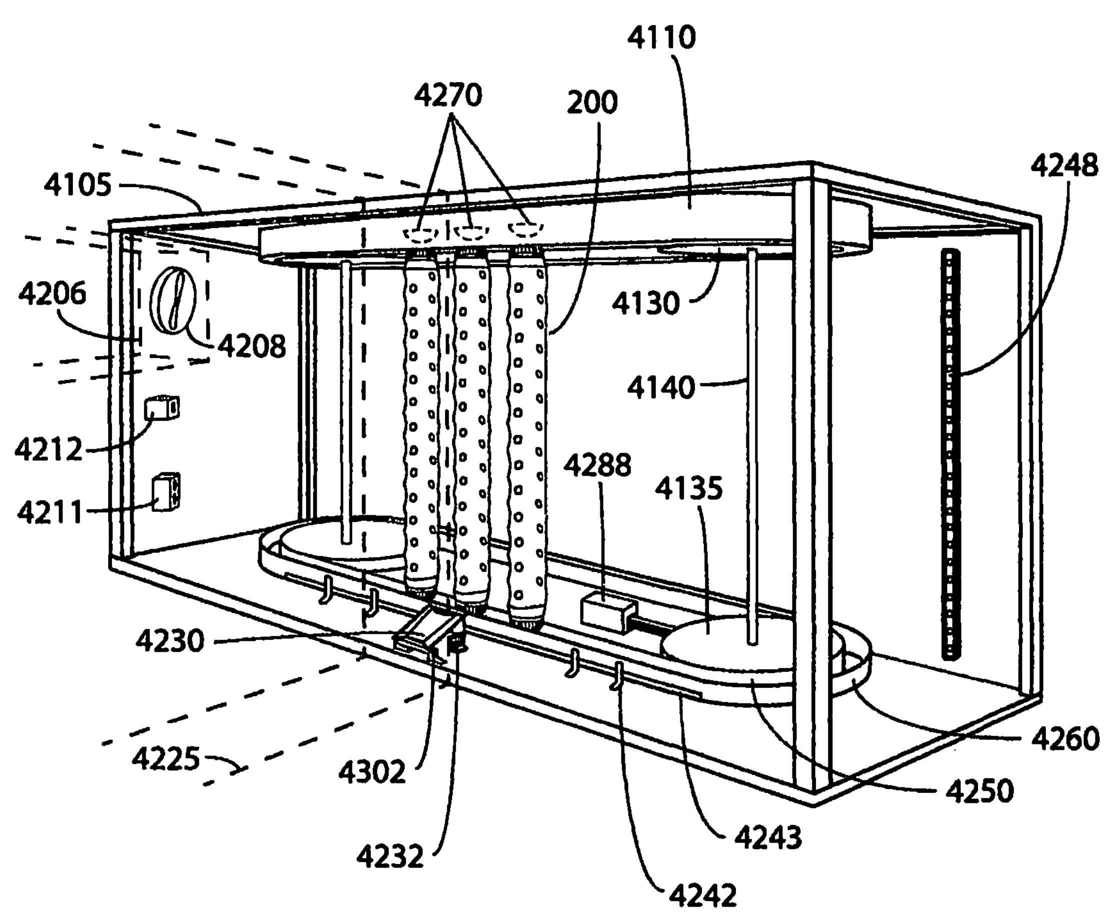
Figure 43:
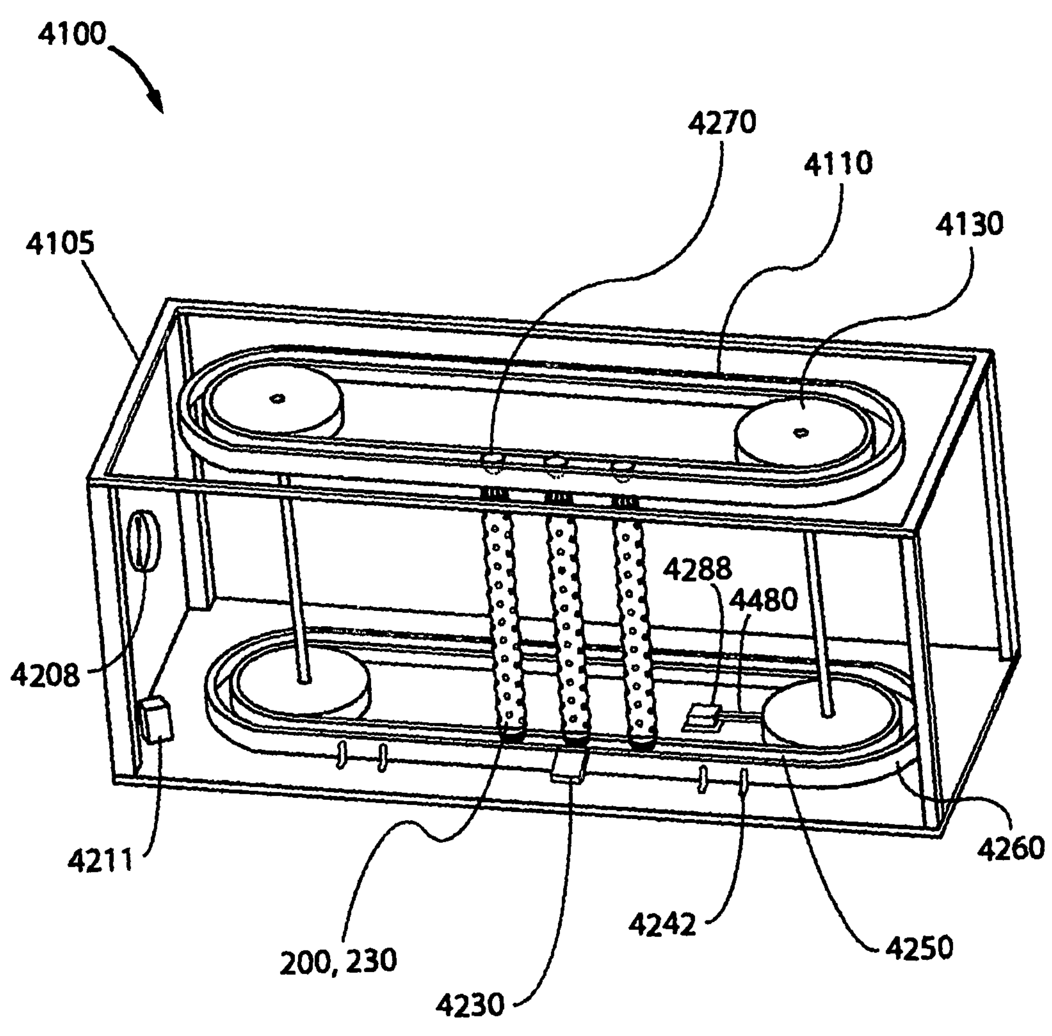
FIG. 43 illustrates perspective sectional view of a first alternative set of propagation modules in a shipping container, in accordance with an illustrative embodiment of the present invention.
Figure 44:
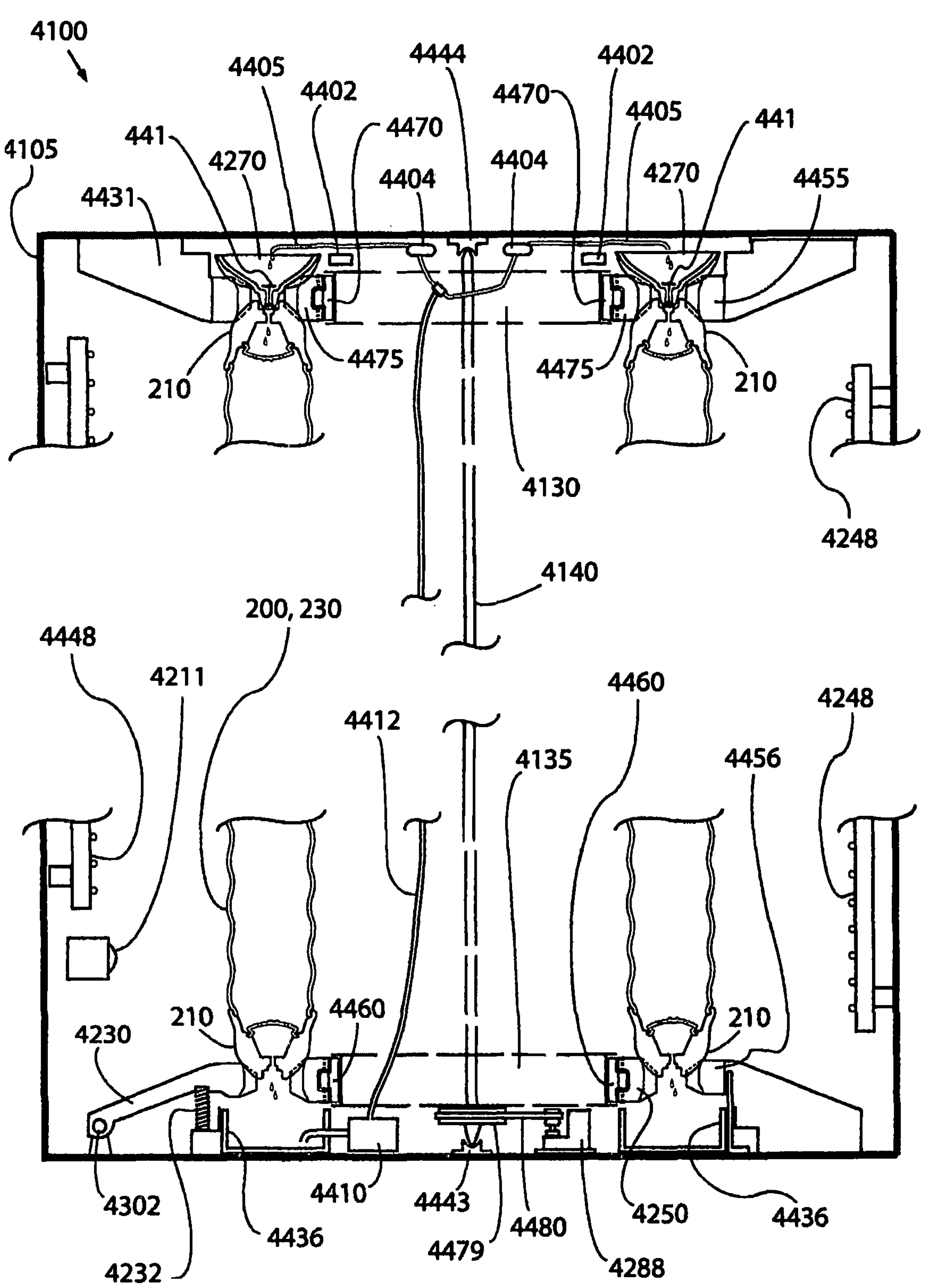
FIG. 44 illustrates a cutaway side view of propagation modules in a shipping container, in accordance with an illustrative embodiment of the present invention.

FIG. 42 illustrates perspective sectional view of propagation modules 200, 230 in the shipping container 4105 of the system 4100. FIG. 43 illustrates a perspective sectional view of first alternative propagation modules 200, 300 in the shipping container 4105. FIG. 44 illustrates a side sectional view of second alternative propagation modules 200, 300 in the shipping container 4105. In these configurations, the propagation modules 200, 230 may be secured and rotated by revolving geared tracks which, in some embodiments, may include an upper geared track 4475 and a lower geared track 4250.

In some embodiments, the propagation modules 200, 230 may also be supported and engaged by fixed geared edges 4455, 4456. In one embodiment, system comprises an upper fixed gear edge 4455 and a lower fixed gear edge 4456. The upper geared track 4475 and upper fixed gear edge 4455 may be positioned at the same elevation, with both typically meshing with the geared cap 210 at the top of each propagation module 200, 230. Likewise, the lower geared track 4250 and lower fixed geared edge 4456 may be positioned at the same elevation, with both typically meshing with the geared cap 210 at the bottom of each propagation module 200, 230.

In some embodiments, upper and lower gaps (not illustrated) may separate the upper and lower geared tracks 4475, 4250 from the respective upper and lower fixed gear edges 4455, 4456. At the upper gap, system water may be delivered to the propagation modules 200, 230 through pucks 4270 that may travel around in the loop. At the bottom gap, system water may empty from the propagation modules 200, 230, and may be contained by a catchment 4436. The upper geared track 4475 may be tensioned between and engaged by a pair of upper track wheels 4130. In like manner, the lower geared track 4250 may be tensioned between and engaged by two lower track wheels 4135. The upper and lower track wheels 4130, 4135 may be connected by track wheel connecting rods 4140 such that the upper and lower track wheels 4130, 4135 may rotate as a single connected unit. A first set of upper and lower track wheels 4130, 4135 may be driven by a track drive motor (not illustrated) which may drivingly engage a belt pulley 4479 through a belt 4480.

Another set of connected upper and lower track wheels 4130, 4135 may be free-spinning. The track wheel connecting rods 4140 may be set into upper pivot points 4444 and lower pivot points 4443. The upper geared track 4475 may be configured to travel around, and held in proper position by, an upper track guide 4470. Likewise, the lower geared track 4250 may be configured to travel around, and held in proper position by, a lower track guide 4460. The upper and lower geared tracks 4475, 4250 may have the same or a similar design, and may include teeth segments (not illustrated) that mesh well with the geared caps 210 of the propagation modules 200, 230.

Figure 46:
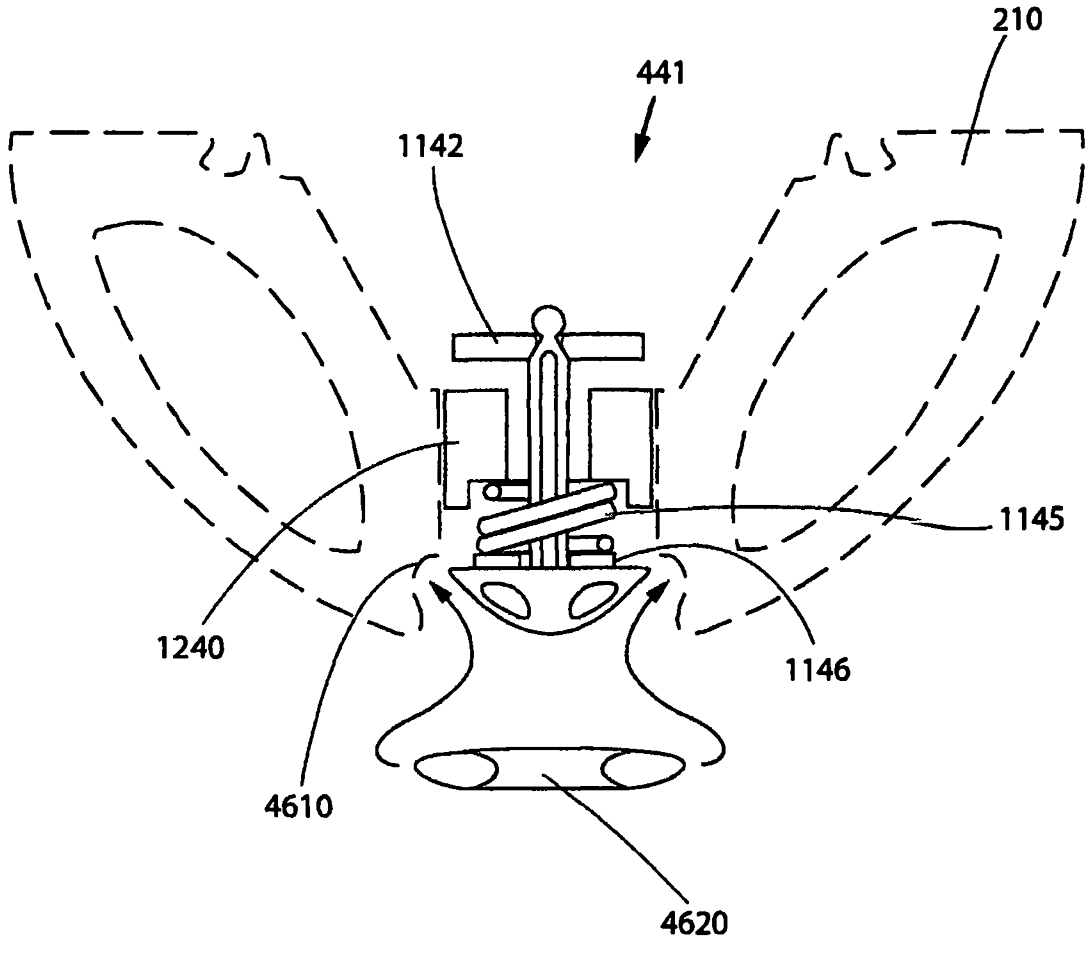
FIG. 46 illustrates a cutaway view of a typical flow stopper, in accordance with an illustrative embodiment of the present invention.

The teeth segments of the upper and lower geared tracks 4475, 4250 may have bevels (not illustrated) on the upper and lower portions. The bevels on the upper and lower geared tracks 4475, 4250 may mesh with and drive the pucks 4270. The pucks 4270 may travel in unison with the respective propagation modules 200, 230 as they circulate about the loop and may be stationary when propagation modules 200, 230 are removed. In some embodiments, the pucks 4270 may be fitted with flow stoppers 441. The flow stoppers 441 may be inserted at the bottom of the respective propagation modules 200, 230. As illustrated in FIG. 46, the flow stoppers 441 may be removed or held in the open position by stopper clips 4620 that fit into respective grooves 4610 in the center opening of the geared cap 210. The upper and lower geared tracks 4475, 4250 may include track segments that are held together with pins (not illustrated), or alternatively, may be formed in the configuration of a belt. In some embodiments, the upper and lower geared tracks 4475, 4250 may also have a flanged recess (not illustrated) that fits with the respective upper and lower track guides 4470, 4460.

The traveling propagation modules 200, 230 may be supplied with system water that flows through the traveling pucks 4270. A puck opening (not illustrated) in the center of the puck 4270 may direct the system water into the center opening in the top geared cap 210. In some embodiments, a centered protrusion (not illustrated) may be formed in the puck 4270. An opening in the centered protrusion may direct the system water into the top geared cap 210. In some embodiments, feeder lines 4405, which may be fixed to a surface (not illustrated) just above the pucks 4270, may supply system water to the pucks 4270.

In some embodiments, the flow of system water in the feeder lines 4405 may be selectively turned on and off by operation of solenoid valves 4404. The solenoid valves 4404 may operate in conjunction with puck sensors 4402 and module sensors 4211 that may work together such that the system water is delivered correctly to the traveling pucks 4270 and the traveling propagation modules 200, 230.

Figure 45:
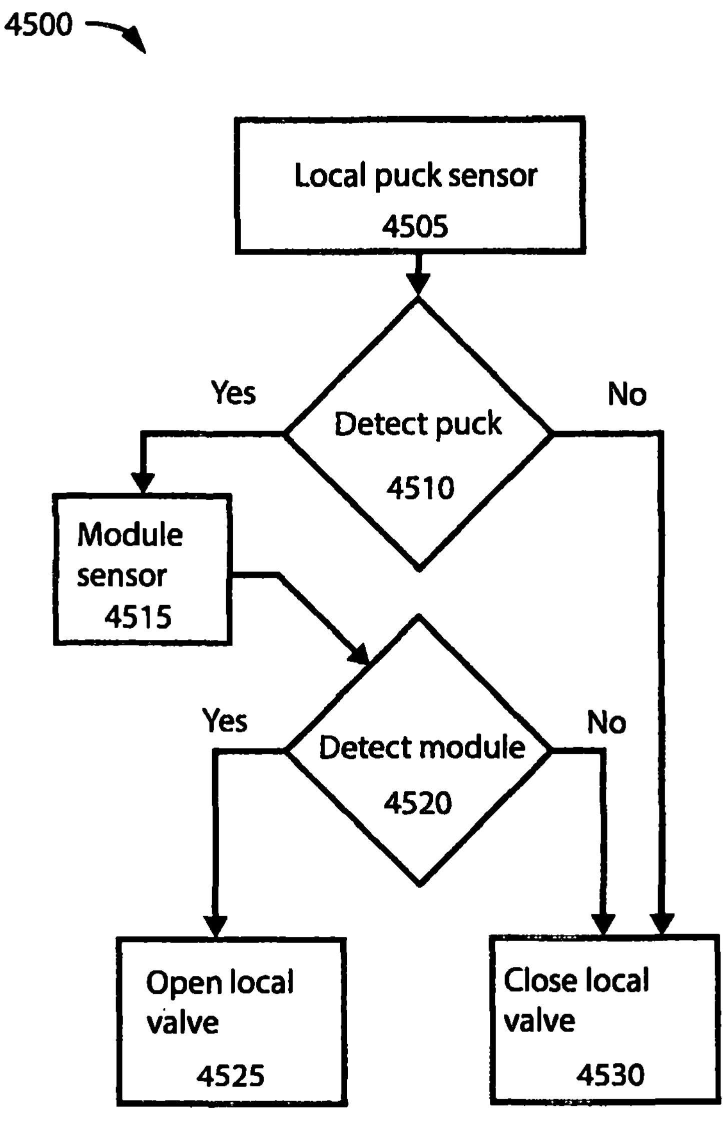
FIG. 45 illustrates a flowchart diagram for typical operation of the solenoid valves in the system, in accordance with an illustrative embodiment of the present invention.

FIG. 45 illustrates a typical algorithm 4500 which is suitable for operation of the solenoid valves 4404 in the system 4100. At Step 4505, a local puck sensor 4402 (FIG. 44) may include at least one pushbutton type sensor, at least one Hall Effect sensor and/or other suitable sensor type. At Step 4510, a query may determine whether the puck sensors 4402 detect the puck 4270 as it passes underneath the appropriate feeder line 4405. At Step 4515, the puck sensors 4402 may detect the puck 4270 as it passes underneath the appropriate feeder line 4405. At Step 4520, a query may determine whether the module sensor 4211 detects the presence or movement of the propagation module 200, 230. The module sensor 4211 may include at least one infrared proximity sensor, at least one ultrasonic sensor, and/or other suitable sensor type. Accordingly, at Step 4525, at least one local valve 4404 may be opened. System water may be delivered to the solenoid valves 4404 through the supply line 4412 that may be connected to a pump 4410 which draws the system water from the catchment 4436. Alternatively, the system water may be supplied from a water source (not illustrated) outside the shipping container 4105, directly to the solenoid valves 4404 with the catchment 4436 also being connected to system elements outside the shipping container 4105. A manifold (not illustrated) may connect a number of the solenoid valves 4404 with attached feeder lines 4405 to the water source. At Step 4530, the local valve 4404 may be closed.

If the query at Step 4510 determines that the puck sensors 4402 do not detect the puck 4270 as it passes underneath the appropriate feeder line 4405, then the local valve 4404 may be closed at Step 4530. Similarly, if the query at Step 4520 determines that the module sensor 4211 does not detect the presence or movement of the propagation module 200, 230, then the local valve 4404 may be closed at Step 4530.

The propagation modules 200, 230 may be inserted or removed from the loop using a loading ramp 4230 (FIG. 44). The loading ramp 4230 may be in line with the loading passageway 4225 (FIG. 43). The loading ramp 4230 may be situated at the same elevation as the lower fixed gear edge 4456 and may be formed such that it has gear teeth (not illustrated) that match and mesh with the companion lower fixed gear edge 4456. In this manner, when it passes by, being driven by the tracks 4475, 4250, a propagation module 200, 230 may pass by as if the loading ramp 4230 were the fixed gear edge 4456. The loading ramp 4230 may be attached with a pivot rod 4302 and may have a number of ramp springs 4232 attached to the underside of the loading ramp 4230. The loading ramp 4230 may be deployed in a downward position when a propagation module 200, 230 is inserted or removed. In some embodiments, the loading passageway 4225 may include a well-sealed corridor door (not illustrated) which connects to or communicates with a cut (not illustrated) in the side of the shipping container 4105.

As illustrated in FIG. 43, the shipping container 4105 may have several loading passageways 4225 and several corresponding loading ramps 4230. In some embodiments, each loading ramp 4230 may be located along one of the curved lower fixed gear edges 4260 of the track 4250, with the loop-side edge of the loading ramp 4230 typically matching the curvature and gears of the curved lower fixed gear edge 4456 (FIG. 44). The loading and unloading of propagation modules 200, 230 may occur at one of the ends of the shipping container 4105, and the opening of the shipping container 4105 may serve as the entry point for the propagation modules 200, 230 for loading and unloading.

In some embodiments, an upper guide ramp 4431 may be used along with the loading ramp 4230 to help guide the top of a propagation module 200, 230 as it is being inserted or removed. Upper edge support segments 4110 (FIGS. 42 and 43) may secure the upper fixed gear edges 4455 in the proper position. Lower edge support segments 4243 may secure the lower fixed gear edges 4456 in the proper position. Support brackets 4242 may secure lower edge support segments 4243 and may be used to make fine-tuned adjustments so that the distance between the upper fixed gear edges 4455 and the lower fixed gear edges 4456 remain correct.

When operated inside an insulated shipping container 4105, the system 4100 may be illuminated using artificial light such as by using LED light bars 4248 that may be attached to the walls inside the shipping container 4105. The motion of the propagation modules 200, 230 within the shipping container 4105 may ensure uniform light exposure to the plants 101. Ideally, the shipping container 4105 may be well-sealed, with any loading passageways 4225 also being well-sealed, and main access points may incorporate airlocks and tight-fitting doors (not illustrated). With well-sealed structures and passageways, the shipping container 4105 may be operated and/or transported with positive, negative or neutral air pressure in the shipping container 4105, depending on the desired growing conditions.

In operation of the shipping container 4105, air or air with carbon dioxide enrichment may flow through air ducting (not illustrated). In applications in which the systems are run in an environment with net positive air pressure, potential infiltration of pests or contaminants is lessened, in applications in which the systems are run in an environment with net negative air pressure growing conditions such as humidity may be easier to control. A fresh air exchange with the interior of the shipping container 4105 may be required. Accordingly, as illustrated in FIG. 42, air ducting 4206 may provide proper air exchange. The air ducting 4206 may be fitted to the shipping container 4105 or other growing environment at one or several locations or sets of locations. For example and without limitation, one set of air ducting 4206 may serve as the fresh air supply, whereas another set of air ducting 4206 may serve to ventilate air from the shipping container 4105.

Air supply ducting 4206 and air removal ducting (not illustrated) may be located at opposite ends of the shipping container 4105. If the rate of distribution of air into exceeds the rate of distribution of air from the shipping container 4105, the growing environment inside the shipping container 4105 will have positive inside air pressure. This may help keep plant pests and potential contaminants out of the growing environment. The supply air flowing into the shipping container 4105 may be filtered to remove potential contaminants from the air. In some applications, the supply air may be treated with air chillers or heaters (not illustrated) to lower or raise, respectively, the temperature of the air, as needed.

Use of HEPA type filters or ultraviolet treatment may be used to treat the supply air before or as it is distributed into the shipping container 4105. In some applications, dehumidifiers (not illustrated) may be utilized inside the shipping container 4105 or connected to the air ducting 4206. Dehumidification may also be part of water reclamation and water processing systems. In some embodiments, air circulating fans 4208 may also be positioned inside the growing environment in the shipping container 4105 to direct incoming air for general circulation or to direct outgoing air. Because of the rotation and path movement of the propagation modules 200, 230, fewer fans 4208 may be needed to ensure proper airflow than may be the case in other containerized growing systems.

In some embodiments, monitoring cameras 4212 may be located inside the growing environment. Other monitoring equipment and sensors (not illustrated) to measure temperature, humidity, light levels, and other factors may be located inside the growing environment. Because of the typical rotation and path movement of the propagation modules 200, 230, the lighting requirements may be somewhat different than those for lighting plants 101, 102 that are not moved within the growing environment.

In various applications, different types of lighting fixtures may be located inside the growing environment. In some applications, an ultraviolet light fixture 4448, for example and without limitation, may be intermittently used to keep the surfaces of the propagation modules 200, 230, and plants housed therein clean and free of contaminants such as mold spores. Ultraviolet light or other spectrum light fixtures may be used to change or vary plant growing cycles or plant compounds. In some embodiments, light reflecting sheeting and/or other surface treatment (not illustrated) may be applied to the interior surfaces of the shipping container 4105 to help maximize lighting efficiency.

FIG. 46 illustrates a cutaway view of a flow stopper 441 as it typically fits with the geared cap 210, and the manner in which a stopper clip 4620 may be inserted into a groove 4610 in the geared cap 210 to keep the flow stopper 441 in the open position.

Figure 47:
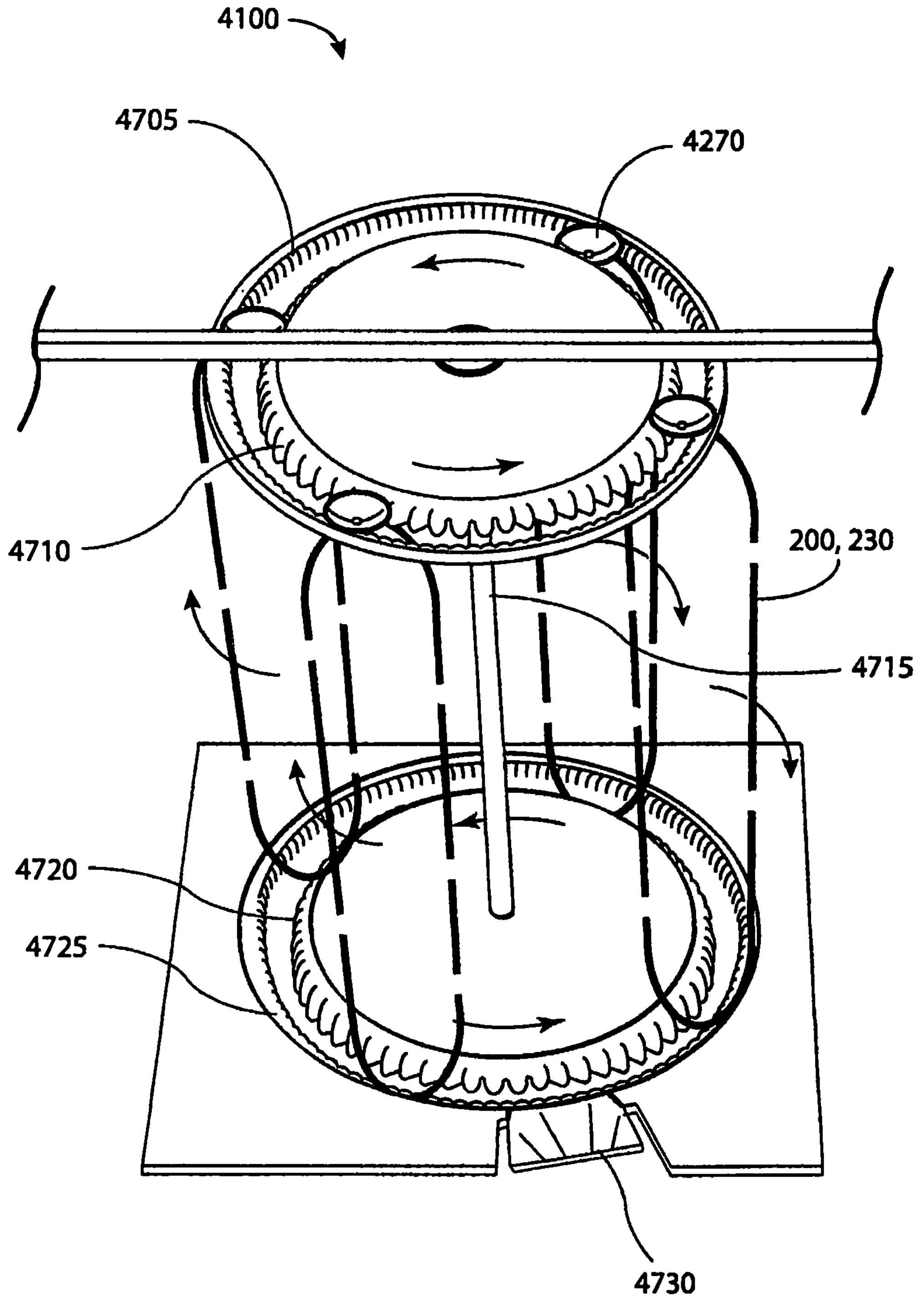
FIG. 47 illustrates a perspective view of a typical variant system to circulating system, in accordance with an illustrative embodiment of the present invention.

FIG. 47 illustrates a perspective view of a typical variant system to circulating system 4100. This system 4100 may transport the propagation modules 200, 230 in a circular orbit as they are rotated about their respective center axes. This configuration may utilize an upper geared wheel 4710, a lower geared wheel 4720, a connecting rod 4715 connecting the upper gear wheel 4710 and the lower geared wheel 4720, an upper geared circle edge 4705 and a lower geared circle edge 4725 to rotate the propagation modules 200, 230 in the orbit. The system 4100 may additionally include at least one loading ramp 4730. At least one puck 4270 may be used to deliver and recirculate the water, as was heretofore described with respect to the system 4100 in FIGS. 41-44.

Figure 48:
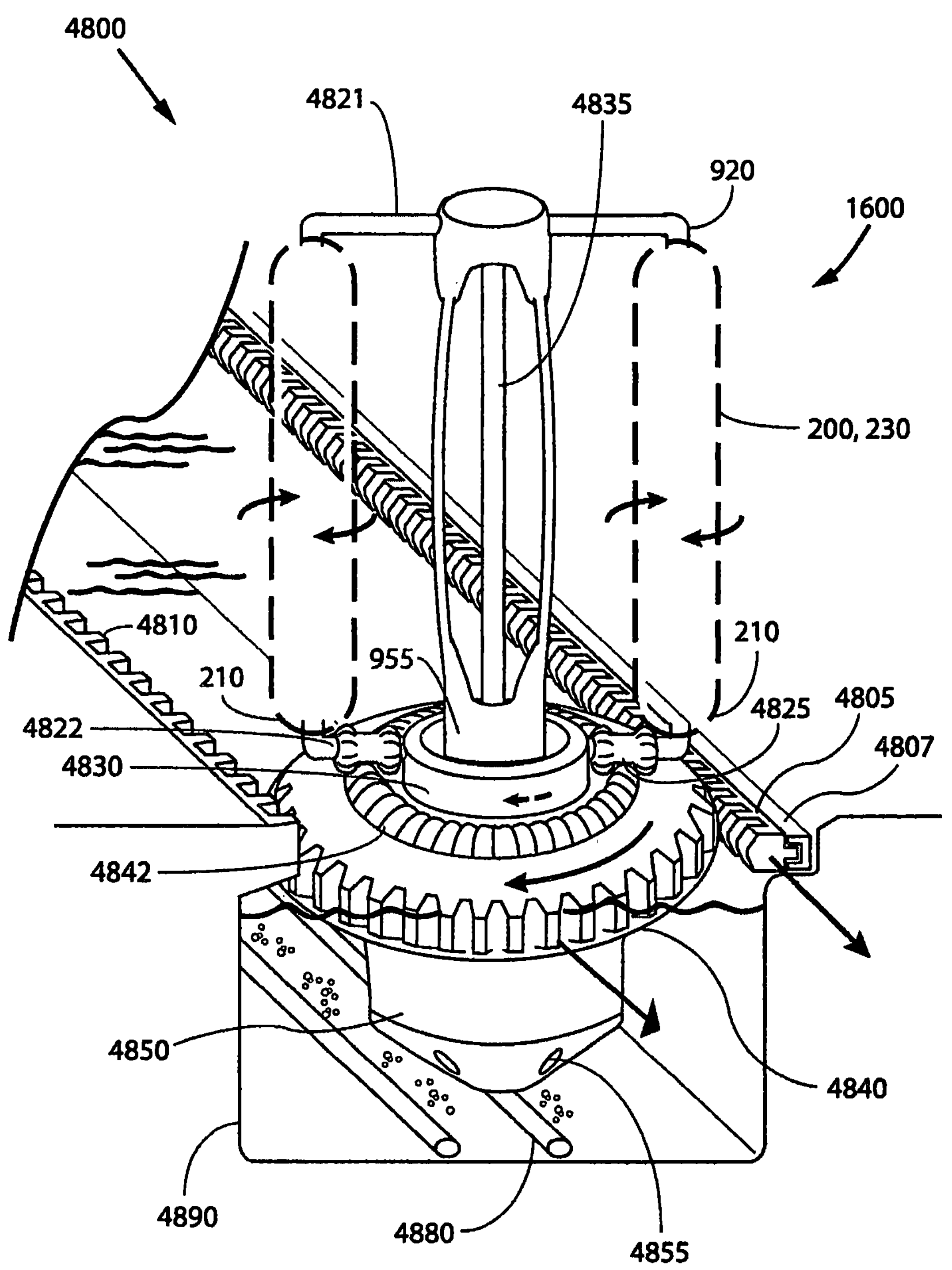
FIG. 48 illustrates a perspective view of a typical system using a geared float, in accordance with an illustrative embodiment of the present invention.

FIG. 48 illustrates an effective simplified view of the system 4800. The system 4800 may utilize a geared float 4840 to the support the system 4800 on the surface of a water-filled tank or channel 4890. The geared float 4840 may engage with the fixed gear channel edge 4810 and a moving channel track 4805. The channel track 4805 may be configured in the form of a loop that is tensioned and motivated by track wheels (not illustrated), with the water-filled channel 4890 also typically forming a loop. Accordingly, movement of the channel track 4805 may rotate and move the geared float 4840 in the same direction as the channel track 4805.

A ballast body 4850 may be disposed beneath the geared float 4840. A number of openings (not illustrated) may be provided along the lower side of the ballast body 4850. The openings may serve as water entry points 4855. A collection funnel 4905 (FIG. 49) may be provided at the center bottom of the ballast body 4850. The collection funnel 4905 may concentrate air bubbles discharged from air delivery lines 4880. The concentrated air bubbles may enter a mast tube 4835 and mix with water from the water entry points 4855. This mixing of air and water may form an air lift.

The air lifting the water up the mast tube 4835 may be aided by entry check valves 4910 (FIG. 49) next to the water entry points 4855 and by one or more mast check valves 4915 which may be positioned along the mast tube 4835. A distribution cap 1410 may be provided at the upper end of the mast tube 4835. Rising air and water may exit the mast tube 4835 at the distribution cap 1410, with the water falling into a cavity (not illustrated) in the center of the top carousel hub 4931. The water may then be distributed through a number of upper arms 4821 fitted to the top carousel hub 4931 and discharged from elbows 920 at the respective ends of the upper arms 4821 into the respective propagation modules 200, 230 held between the elbows 920 attached to the upper arms 4821 and lower arms 4822.

Figure 49:
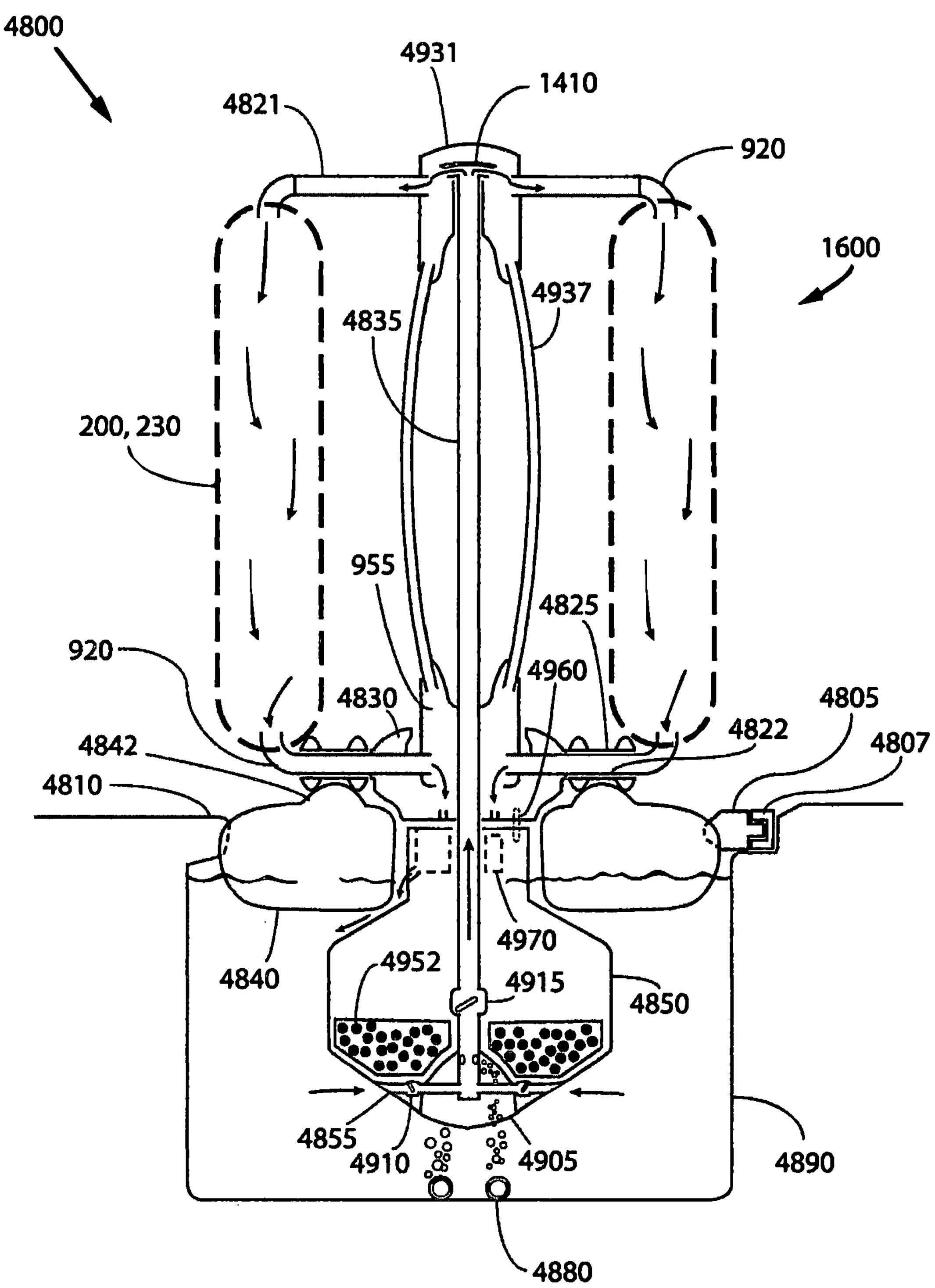
FIG. 49 illustrates a sectioned view of a typical system using a geared float, in accordance with an illustrative embodiment of the present invention.

As illustrated in FIGS. 48 and 49, the geared roller assemblies 4825 may be fitted into the lower arms 4822 and engaged with the geared caps 210 of the propagation modules 200, 230 being held. The lower arms 4822 may be fitted to a carousel base 4830 and passed through to the bottom carousel hub 955. The carousel base 4830 may be connected with the ballast body 4850 in a similar fashion to the system 3000, as was heretofore described with respect to FIG. 34. The ballast body 4850 may be free to rotate independently of the carousel 1600, or alternatively, maybe coupled to the ballast body 4850 by pins 4960 so that the movement of the carousel 1600 and ballast body 4050 is simultaneous. System water falling from the lower arms 4822 may pass through a bio filter 4970, which may be housed in the ballast body 4850, before returning to the water-filled channel 4890.

The geared float 4840 may surround but remain disconnected or uncoupled from the ballast body 4850. The upper portion of the geared float 4840 may have a convex geared segment 4842 that meshes with the geared roller assembly 4825. Rotation of the geared float 4840, and thus, of the geared segment 4842 may cause rotation of the geared roller assemblies 4825 about the respective lower arms 4822. The ballast body 4850 may be coupled to the carousel base 4830 in a similar manner that the habitat assembly support ring 3410 is coupled to a ring washer 3405 to the inside lip of the driven base ring 275 (FIG. 32).

In some embodiments, the buoyancy of the ballast body 4850 may be modified. The ballast body 4850 may contain ballast 4952 (FIG. 49) in its lowest portion. The rest of the ballast body 4850 may be hollow and watertight except for the bio filter 4970. This may give the ballast 4952 buoyancy in the water-filled channel 4890. This hollow space in the ballast body 4850 may be filled with weight to selectively modify the buoyancy of the ballast body 4850 and the magnitude of downward force exerted on the connection area of the ring washer 3405 with the carousel base 4830. Thus, modifying the magnitude of downward force that the ballast body 4850 applies to the connection area with the carousel base 4830 may vary the manner in which the carousel rotates relative to other system elements such as the edge of the channel 4890.

The top carousel hub 4931 and bottom carousel hub 955 may be connected by carousel supports 916 (FIG. 14) in a manner which may be similar to that heretofore described with respect to the system 900. Alternatively, the top carousel hub 4931 and the bottom carousel hub 955 may be connected by carousel support rods 4937, which may be configured to be similar to those described and illustrated with respect to the system 3000 in FIGS. 34-36. In some embodiments, the carousel hubs 4931, 955 may also use carousel support rod hubs 4835 connected to the top and bottom carousel hubs 4931, 955. The channel track 4805 may be maintained in proper position by channel track guides 4807. Both the channel track 4805 and the geared channel edge 4810 may be formed with teeth that engage with the geared float 4840, but also allow for the geared float 4840 to rise and fall as it floats on the surface of the water. The channel 4890 may contain aquatic organisms such as one or more aquatic animals 120 and may be connected to other system elements such as raceways (not illustrated) for moving fish populations in or out of the channel 4890, for example and without limitation.

In some embodiments, the channel 4890 may be fitted with drain lines and supply lines (not illustrated) which may connect with other system elements such as pumps and filters (not illustrated), for example and without limitation. Furthermore, air delivery lines 4880 may be connected to an air pump (not illustrated) and may supply oxygen to the water in the channel 4890. In some embodiments, the floating carousel unit illustrated in FIGS. 48 and 49 may be positioned in a tank, pond, or other body of water (not illustrated) and may be operated so that the floating carousel unit does not travel along the path.

FIG. 50A illustrates an overhead view of a typical rotation travel path made by propagation modules 200, 230 held by a system. This illustration shows the direction of overall carousel rotation and how each individual propagation module 200, 230 may rotate about its own center axis while being held in place by the carousel 1600. This rotational configuration of the propagation modules 200, 230 may serve to uniformly expose the propagation modules 200, 230 to light. In some applications, a number of light sources (not illustrated) may be used to illuminate the propagation modules 200, 230 as the propagation modules 200, 230 rotate. A proximity sensor 5044 may be used in conjunction with a light source to turn the light source on and off and thereby vary the rate of pulsed light or to change the light intensity based typically on the proximity of a propagation module to the light source along its path of travel.

FIG. 50B illustrates a simplified overhead view of a typical rotation and looped travel path of one or more propagation modules 200, 230 in a looped system. This illustration shows the manner in which the propagation modules 200, 230 may move within the system 4100, and further illustrates the manner in which the floating carousel units can move as shown in FIG. 48 and FIG. 49. In some embodiments, side-positioned light fixtures 5048 and center-positioned light fixtures 5054 can both be used while the propagation modules 200, 230 travel along the looped path within the system 4100.

Figure 51:
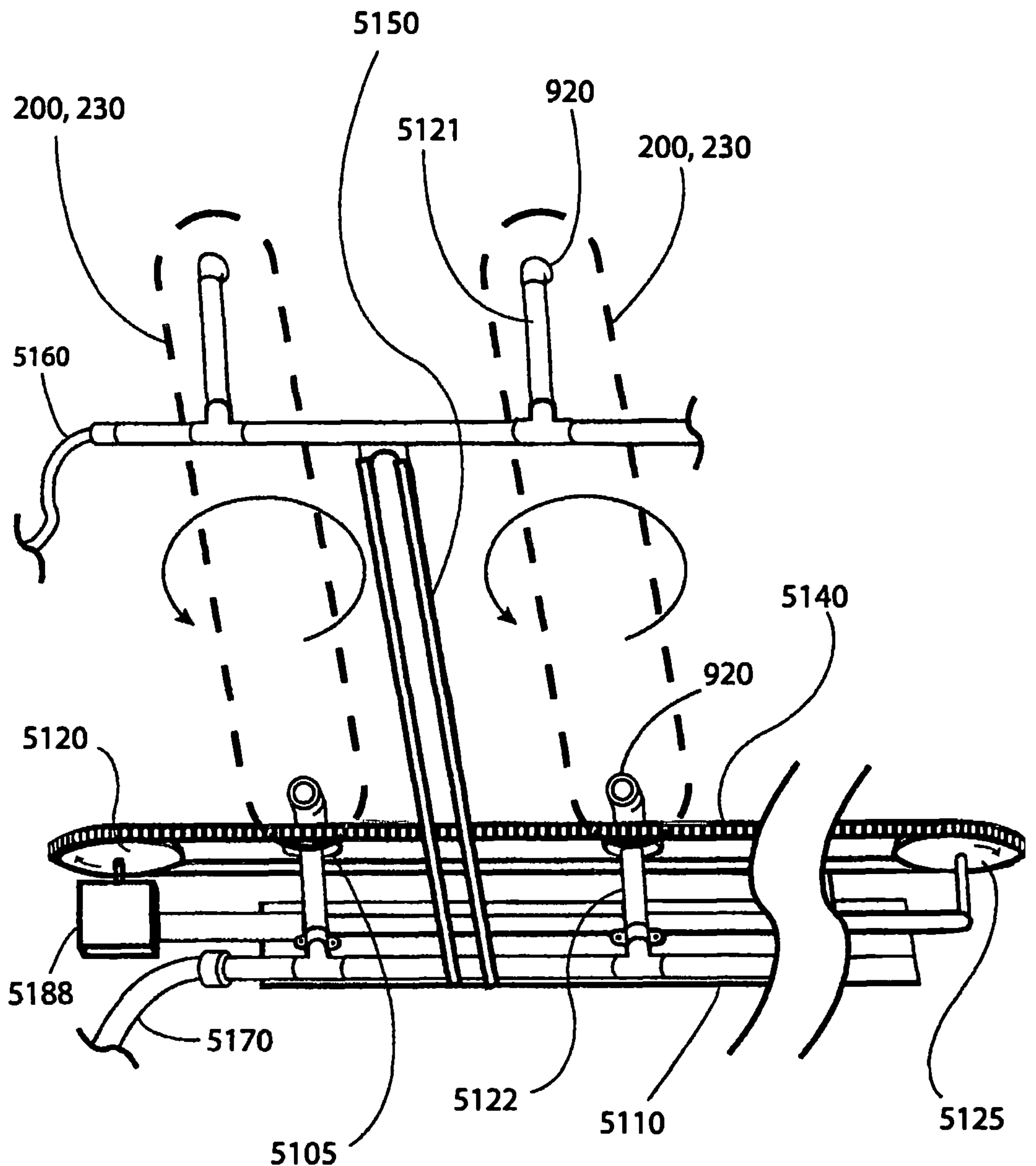
FIG. 51 illustrates a simplified perspective view of an alternative rotation path of the propagation module rotating about its axis, in accordance with an illustrative embodiment of the present invention.

FIG. 51 illustrates a simplified perspective view of an alternative rotation path of each of a pair of propagation modules 200, 230 rotating about their respective axis. In this embodiment, a motor 5188 may rotate a drive sprocket 5120 and an idle sprocket 5125 which tension a geared belt or track 5140. The track 5140 may directly engage with the lower of the geared caps 210 (FIGS. 6A and 6B) of the propagation modules 200, 230. The geared track 5140 may travel over guide rollers 5105 as it engages with the propagation modules 200, 230. A series of upper arms 5121 may be joined together and supplied with system water through a supply line 5160. The assembly of upper arms 5121 may be connected by support frames 5150 to a lower assembly that includes a pair of lower arms 5122. The lower arms 5122 may be joined together and connected to a drain line 5170.

Figure 52B:
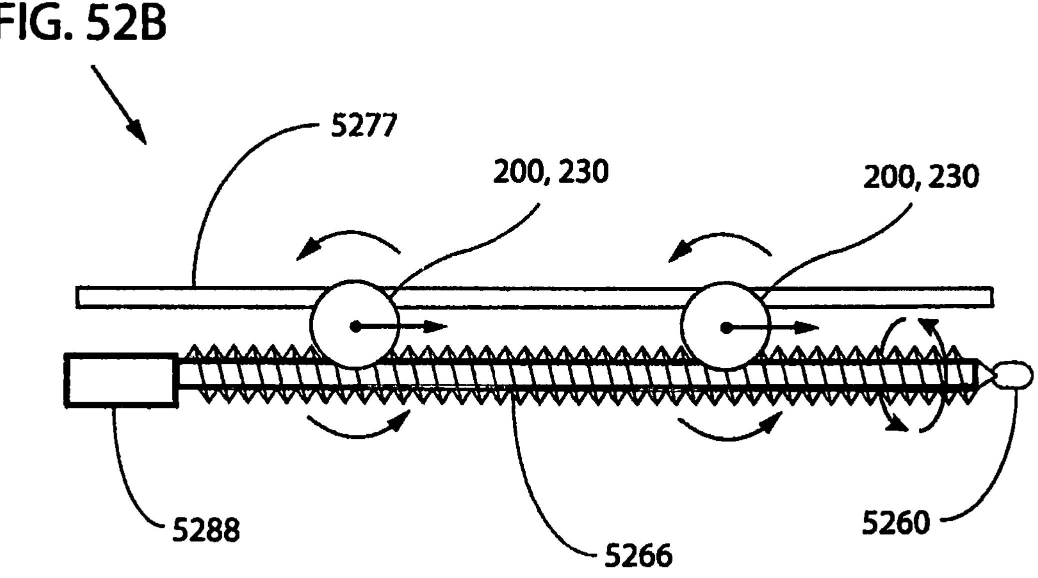
FIG. 52B illustrates a simplified overhead view of a typical system for moving propagation modules along a linear path for overall system operations, in accordance with an illustrative embodiment of the present invention.

FIG. 52A illustrates an overhead view of a system configuration in which a fixed gear ring is formed as part of a tank rim. In this embodiment, roller gears 5223 may directly engage a rim-mounted gear 5210. FIG. 52B illustrates a simplified overhead view of a system for moving propagation modules 200, 230 along a linear path for overall system operations. Here, the propagation modules 200, 230 may travel in a linear path formed by upper and lower guide rails 5277 (one of which is illustrated) paired with two motors 5288 and driven screws 5266 that may be held at one end by bushings 5260. In some applications, this configuration may be used for loading passageways.

Figure 53A:
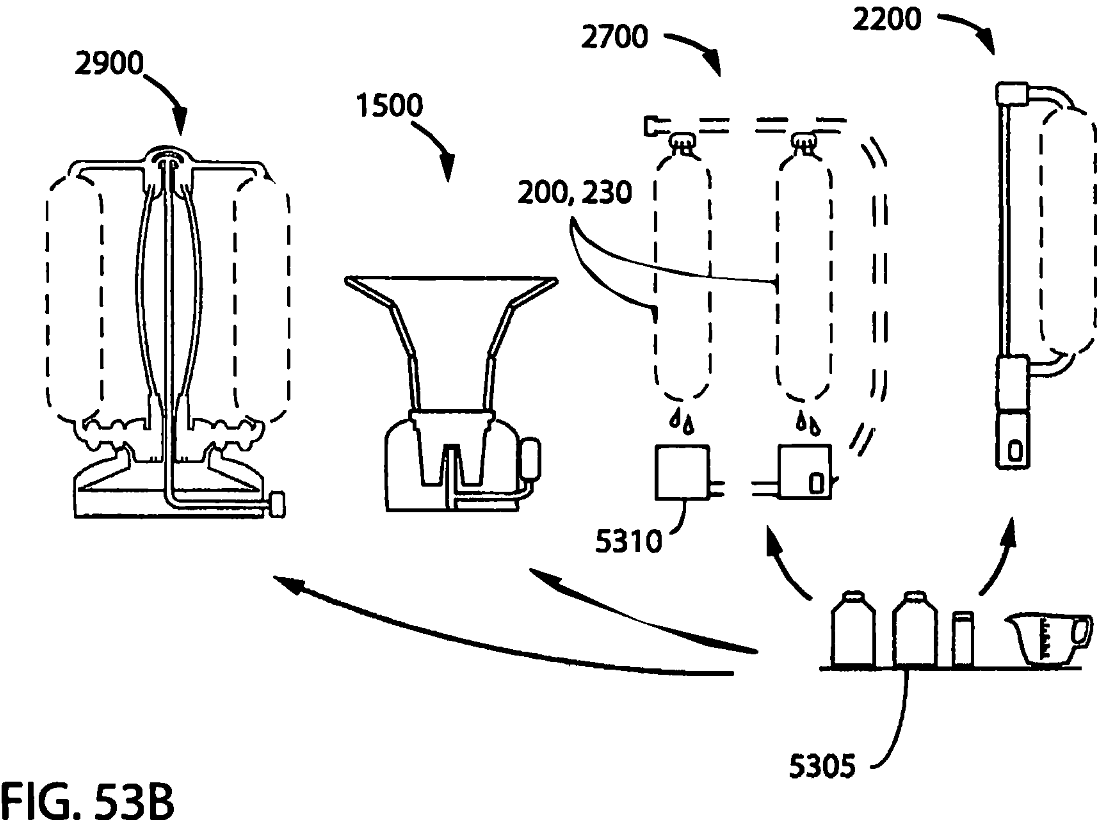
FIG. 53A illustrates a diagram depicting various systems that may use hydroponic mixtures to supply nutrients to growing plants, in accordance with an illustrative embodiment of the present invention.

FIG. 53A illustrates a diagram depicting various systems 1500, 2200, 2700, 2900 that may use hydroponic mixtures to supply nutrients to growing plants. Accordingly, in some embodiments, off-the-shelf nutrients 5305 or custom hydroponic formulas may be measured out and mixed with a quantity of water and placed into a system tank, basin, or reservoir. For the hanger assembly 2700, for example and without limitation, a system may be configured so that the propagation modules 200, 230 empty fluid into a basin 5310 or series of connected basins 5310 that may be connected by bulkhead fittings and pipes or tubing (not illustrated), for example. A pump (not illustrated) placed in the basin 5310 may circulate the nutrient solution through a supply line to the hanger assemblies 2700.

It is significant to note that nutrient solutions may need to be topped up or discarded after a period of time. Use of pH testing equipment and other monitoring may be required for this purpose. Furthermore, hand mixing nutrient solutions becomes less practical the larger the system. Hand-mixing nutrient solutions may be easily accomplished using inorganic hydroponic mixtures. In some embodiments, organic hydroponic formulas may be hand-mixed to form the nutrient solutions.

Figure 53B:
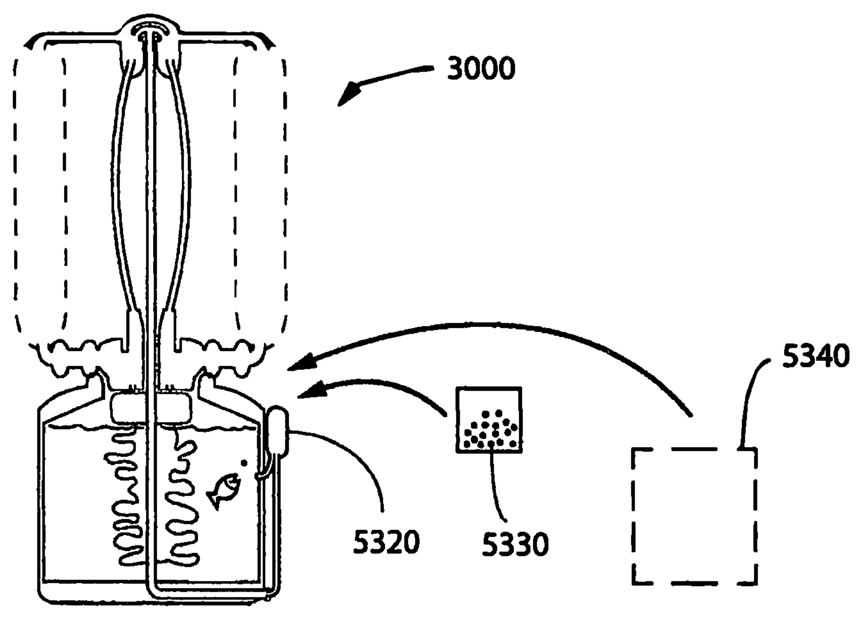
FIG. 53B illustrates a diagram of a typical system operated in an aquaponic environment, in accordance with an illustrative embodiment of the present invention.

FIG. 53B illustrates a diagram of a system 3000 operated in an environment. This illustration may apply to other systems as well. Fish contained in the system 3000 may be fed fish food. The food may include pellets 5330 that contain proper proteins, fats, carbohydrates, and vitamins. Bulk fish food pellets may be formulated for certain species of fish or range of fish species. The feed for fish may also include worms, fly larva, and/or other insects. These may be raised in a compost pile or other set up 5340. If this fish species being raised are omnivores, duckweed and/or other plants may be raised and fed to the fish. In some embodiments, plant waste from plants being grown in the propagation modules 200, 230 may be used in many instances. For example and without limitation, damage lettuce leaves or other scraps could be fed to catfish, goldfish, Koi, tilapia, bluegill, pacu, and/or other species of fish. Plant feed could also be supplemented with worms, insects, and/or pellet food. The system tanks could also hold a variety of species of fish together as long as they can be raised compatibly.

The advantages of operating the systems of the present disclosure are many, especially compared to inorganic hydroponics. One advantage is that once system biology is established, i.e., the bacterial population that converts fish waste in the plant nutrients, the systems tend to be very stable and require very little maintenance. Requirements for the operator of a system may include ensuring that the water in the system is topped off, clearing pump pre-filters every month or every few months, planting seedlings, harvesting plants, and feeding the fish and/or other aquatic animals 120. In a well-established aquaponic system, nutrient deficiencies are rare. One element that may need to be supplemented is iron. Accordingly, the addition of chelated iron may help ameliorate any iron deficiency. In the illustration shown in FIG. 53B, the system 3000 may be operated independently with the use of a side mount assembly 5320. The side mount assembly 5320 may contain at least a water pump (not illustrated) to circulate water throughout the system 3000. The side mount assembly 5320 may also be connected to a power source (not illustrated).

Figure 54A:
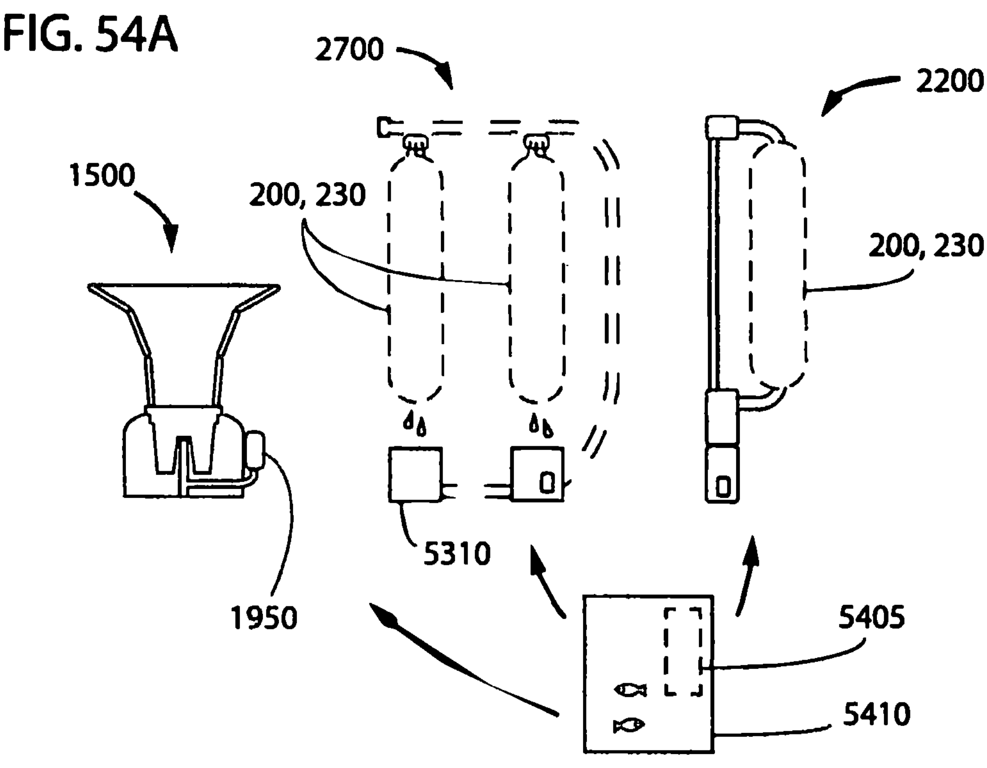
FIG. 54A illustrates a diagram depicting multiple systems connected to an aquaculture or an aquaponic environment, in accordance with an illustrative embodiment of the present invention.

FIG. 54A illustrates multiple systems 1500, 2200, 2700 connected to an aquaculture or an aquaponics system. The systems 1500, 2200, 2700 may be filled with water that comes from another system containing fish or other aquatic animals 120 that produce nitrogenous waste. This transfer of water may be accomplished by hand with buckets, or alternatively, the systems 1500, 2200, 2700 may be connected by fluid lines, connection bundles, or drain lines (not illustrated). Float valve assemblies (not illustrated) may be used so that systems 1500, 2200, 2700 contain the correct level of water. In some embodiments, the systems 1500, 2200, 2700 may use side mount assemblies 1950 (FIG. 19), or pumps situated in basins or reservoirs (not illustrated). The system containing the fish or other aquatic animals 120 should contain sufficient bio filtration 5405.

Figure 54B:
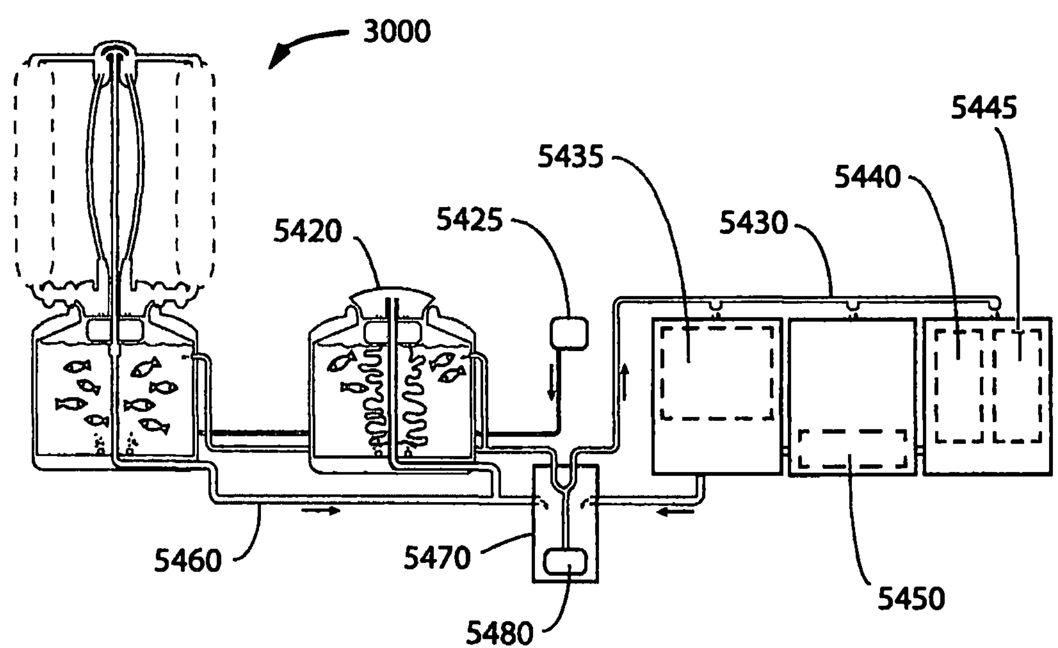
FIG. 54B illustrates a diagram depicting typical systems connected to other system elements operated in an aquaponic environment, in accordance with an illustrative embodiment of the present invention.

FIG. 54B illustrates a system 3000 connected to other system elements operated in an aquaponic system. The system 3000 may be connected with other systems such as sumps 5470 grow beds 5435, extra mechanical filters 5440, and extra bio filters 5445. Other items such as air pumps 5425 and water heaters or water chillers 5450 may also be used. The system 3000 may be configured so as not to carry a carousel 1600. Instead, a filter module 5420 could be connected to a rotatable aquatic habitat and configured to rotate. The system 3000 may be configured without an aquatic habitat but capable of holding fish and/or other aquatic animal or animals 120. System water could be configured to circulate throughout the whole overall system with the use of a pump 5480 that receives water from drain lines 5460 and distributes water with supply lines 5430.

Figure 55A:
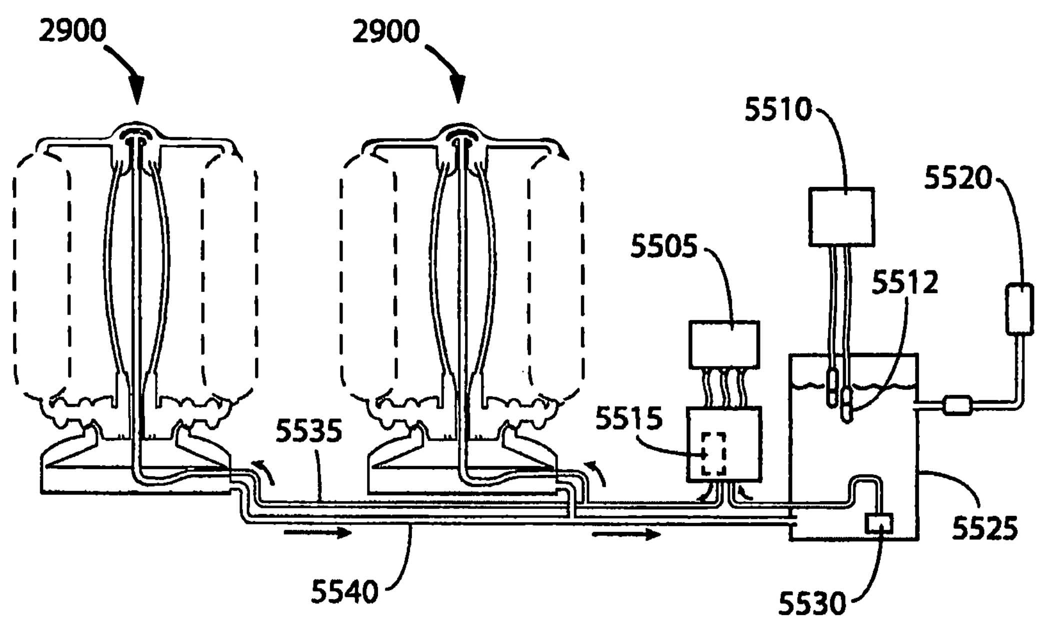
FIG. 55A illustrates a diagram of connected systems operated with a reservoir and a nutrient dosing station, in accordance with an illustrative embodiment of the present invention.

FIG. 55A illustrates pair of connected systems 2900 operated with a reservoir 5525 and a nutrient dosing station 5505. In this configuration, the systems 2900 may be operated in a hydroponic system. The systems 2900 may be connected to a common drain line 5540 and a common supply line 5535, each of which may be connected to a reservoir 5525. The reservoir 5525 may be connected to an incoming water source 5520. A pump (not illustrated) may be disposed in fluid communication with the supply line 5535 to recirculate nutrient solution, or alternatively, may pump incoming water to be dosed with plant nutrients to a dosing station 5505. In some embodiments, a booster pump 5515 may also be utilized. A monitoring station 5510 connected to sensors 5512 may also be utilized in conjunction with the reservoir 5525.

Figure 55B:
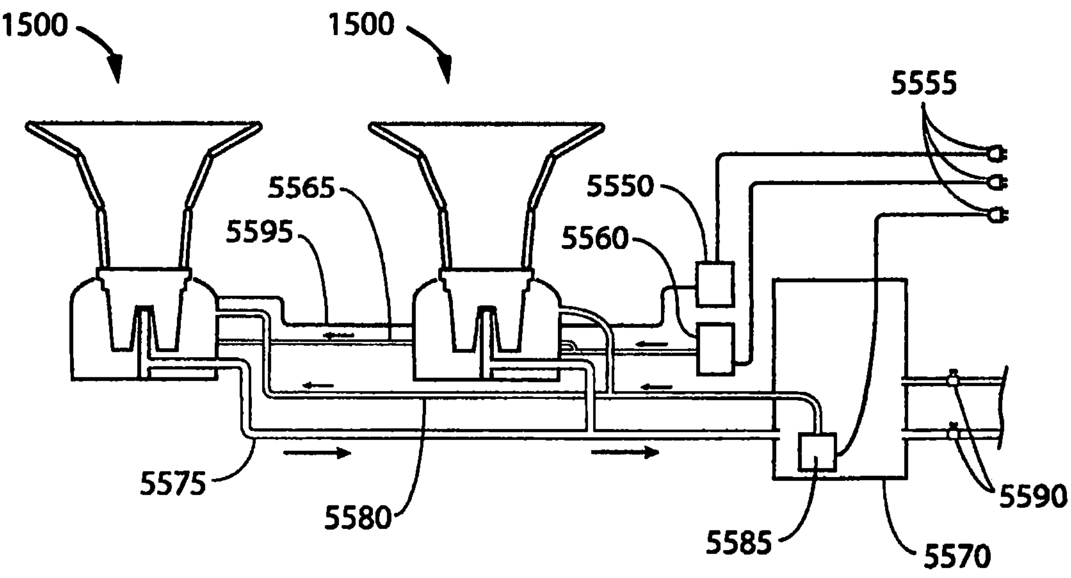
FIG. 55B illustrates a diagram depicting systems operating in a typical hydroponic environment or an aquaponics environment through connection lines, in accordance with an illustrative embodiment of the present invention.

FIG. 55B illustrates a pair of systems 1500 operating in a hydroponic and/or aquaponic environment through connection lines 5590. The systems 1500 may be connected to a reservoir or sump 5570 through a common drain line 5575 and a common supply line 5580. An electrical box 5550, typically connected to a power source (not illustrated) through a plug 5555, may be connected to each system 1500 through an electrical supply line 5595. The drain line 5575 may return to the reservoir or sump 5570. A pump 5585 may be submerged in system water in the reservoir or sump 5570 and is typically connected to a power source (not illustrated) through a plug 5555. The pump 5585 may be operated to recirculate the system water throughout the hydroponic and/or aquaponic environment. An air pump 5560 may be disposed in pneumatic communication with the systems 1500 to supply oxygen to the systems 1500 in the hydroponic and/or aquaponic environment. The air pump 5560 may be pneumatically connected to the common air supply line 5565 and to a power source (not illustrated) through a plug 5555.

In some embodiments, plant nutrients may be added to the reservoir 5570 by measuring and mixing, or by using nutrient dosing equipment. Each system 1500 may be connected to the overall system elements that contain fish and/or other aquatic animals 120. The hydroponic and/or aquaponic environment, fluid lines, drain lines, and propagation modules 200, 230 may be interchangeable to adjust the growth environment of the plants 101 from the hydroponic environment to the aquaponic environment, or vice-versa.

Figure 56:
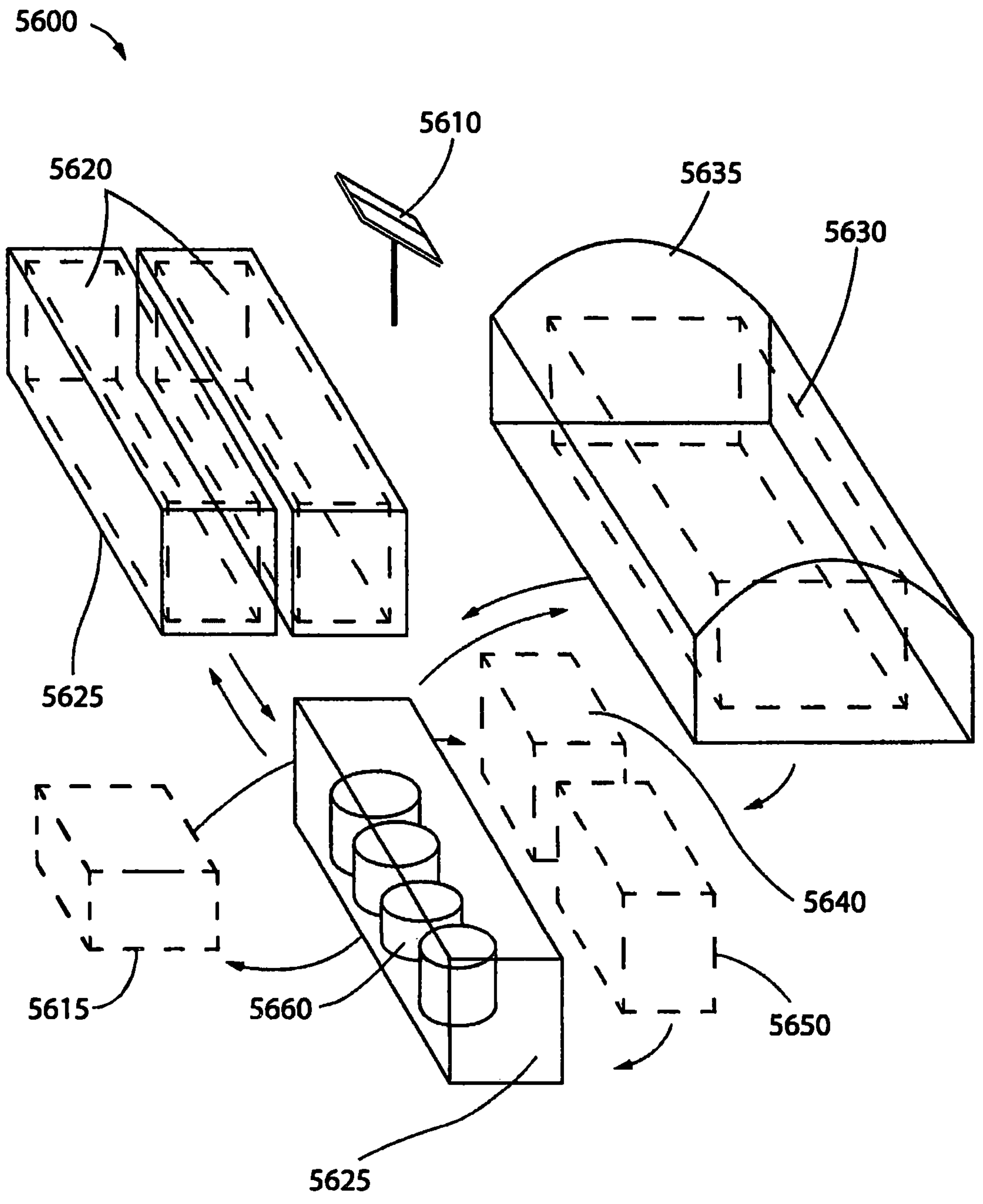
FIG. 56 illustrates a perspective view of an overall system arrangement, showing the components of a typical modular system configured for many locations and to raise different species of animals and plants in the space-saving and efficient manner, in accordance with an illustrative embodiment of the present invention.

FIG. 56 is a perspective view of a typical modular rotatable propagation system configuration 5600 which may be configured for multiple locations and to raise different species of aquatic animals 120 and plants 101 in a space-saving and efficient manner. The system configuration 5600 may utilize the system 3900 heretofore described with respect to FIG. 39, the system 4100 heretofore described with respect to FIG. 41, the system 2700 heretofore described with respect to FIG. 26, and/or other discussed systems and configurations. In the system configuration 5600, the system 2700, 3900, 4100 may be housed in a growing environment 5620 inside a shipping container 5625. In some embodiments, the shipping container 5625 may be adapted for other purposes such as to house fish inside fish rearing tanks 5660 that may be fitted with support equipment (not illustrated) such as water pumps, air pumps, and/or filters, for example and without limitation. In some embodiments, the fish rearing tanks 5660 may be similar in design to the system 3000 (FIGS. 34-36) without the carousels 1600.

In some embodiments, components of the modular rotatable propagation system configuration 5600 may be configured to operate in a growing environment 5630 of a greenhouse 5635. The shipping container 5625, greenhouse 5635 and/or other structures or equipment may operate together and may share some aspects of production in operation, such as nutrients from fish production or plant scraps turned into inputs for worm or insect production. In some embodiments, one or more shipping containers 5625, each of which may house one or more fish rearing tanks 5660, may be connected to one or more other shipping containers 5625 and/or one or more greenhouses 5635 in which plants 101 are grown. The disparate structures and components of the system configuration 5600 may be connected with larger-diameter PVC pipe to facilitate recirculation and reuse of system water throughout the system configuration 5600.

Many types of filters and filtration methods may be used in the system configuration 5600. In applications in which a large quantity of waste is generated from fish production than can be used for plant production, the filters may separate the waste from the system water. The excess effluent may be used as part of the feedstock for an anaerobic digester 5615, which may produce methane gas. The methane gas may be used to power a generator for production of electrical power. In some applications, the anaerobic digester 5615 may produce carbon dioxide which may be supplied to the growing environments 5620, 5630 to facilitate plant growth. The leftover products from the anaerobic digester 5615 may be used as a nutrient-rich liquid. Other feedstock for the anaerobic digester 5615 may include local restaurants and/or outlets or markets for organic waste scraps.

In some embodiments, plant waste scraps from plant production and leftover products from an anaerobic digester and fish effluent could be used as feedstock for the production of black soldier fly, worms, and/or other insects to be used as fish food. A shipping container 5625 or other structure could be used to produce fish food in a black soldier fly farm or worm shed 5640. A spawning shed 5650 could be used as a structure to house the systems and equipment for the controlled reproduction of aquatic species being cultured. Solar panels 5610 may also provide a source of electrical power for pumps, grow lights, and/or other equipment (not illustrated). In some applications, the solar panels 5610 may be provided on top of the shipping containers 5625 and/or other structures.

Figure 57:
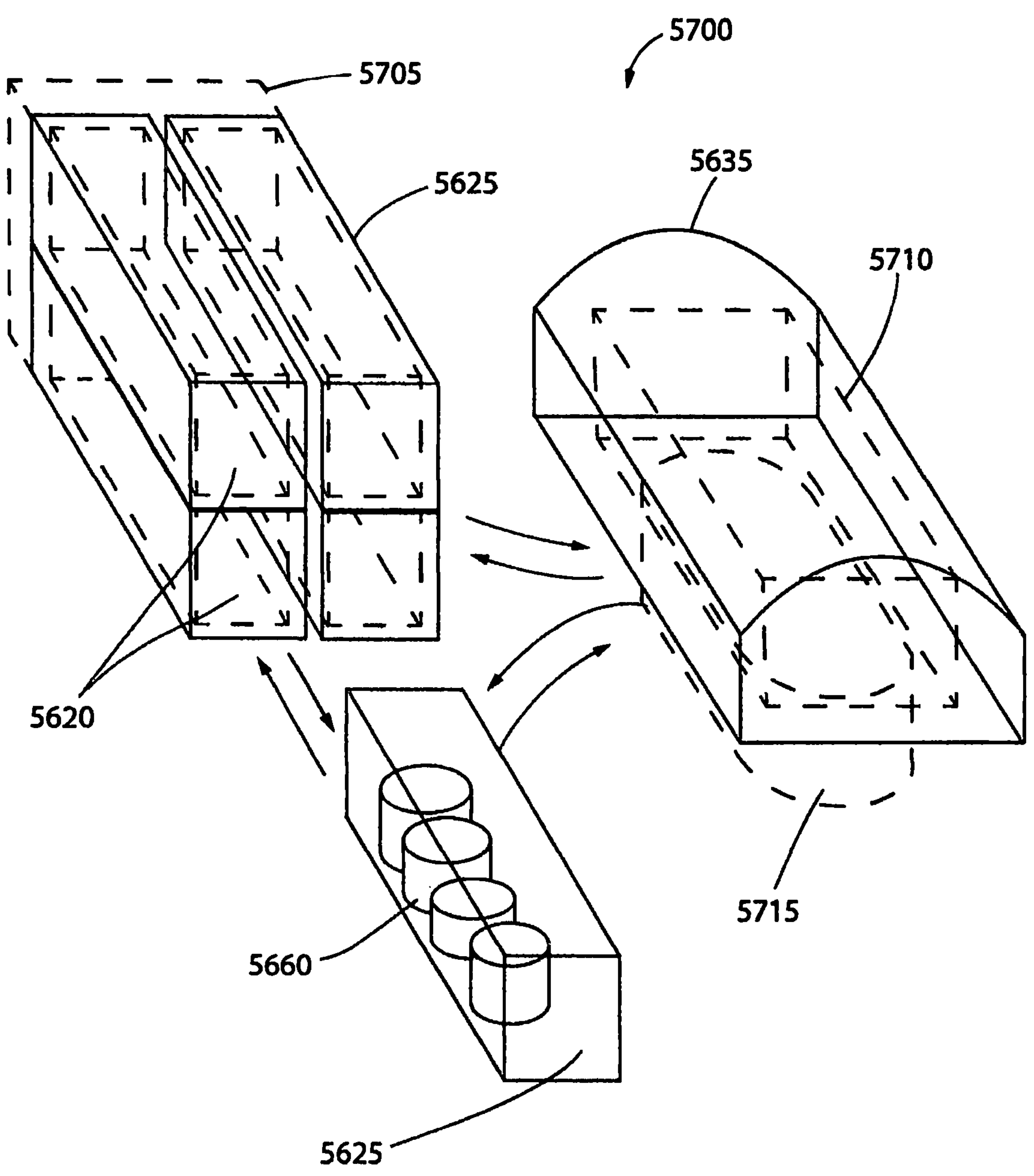
FIG. 57 illustrates a perspective view of a typical system arrangement having shipping containers stacked on top of each other, in accordance with an illustrative embodiment of the present invention.

FIG. 57 illustrates a perspective view of a typical system arrangement 5700 having shipping containers 5625 stacked on top of each other to maximize space efficiency. A connection structure 5705 may provide human operators and/or automated equipment with access to growing environments 5620 in the shipping containers 5625. The connection structure 5705 may enable such access while protecting the growing environments 5620 from outside elements, temperature differentials, pests, contaminants, and other factors. In some embodiments, the connection structure 5705 may have several levels and may be built with stairs and/or equipment elevators and conveyors (not illustrated). The entry points to the connection structure 5705 may include air locks (not illustrated) and/or other methods or techniques to exclude pests and contaminants from the growing environments 5620.

In some embodiments, the greenhouse 5635 may include at least one growing environment 5710 as well as a large tank or loop channel 5715 which may house a system such as the system 4800 heretofore described with respect to FIG. 48. The greenhouse 5635 may be part of the overall system arrangement 5700 that benefits from a temperature bank. In some embodiments, the loop channel 5715 or other large body of water that maintains a relatively stable temperature range may be connected to other growing environments 5620 through supply and drain lines (not illustrated). The other growing environments 5620 may experience hotter or colder conditions that benefit from fluid connectivity with a larger temperature stable body of water.

Figure 58:
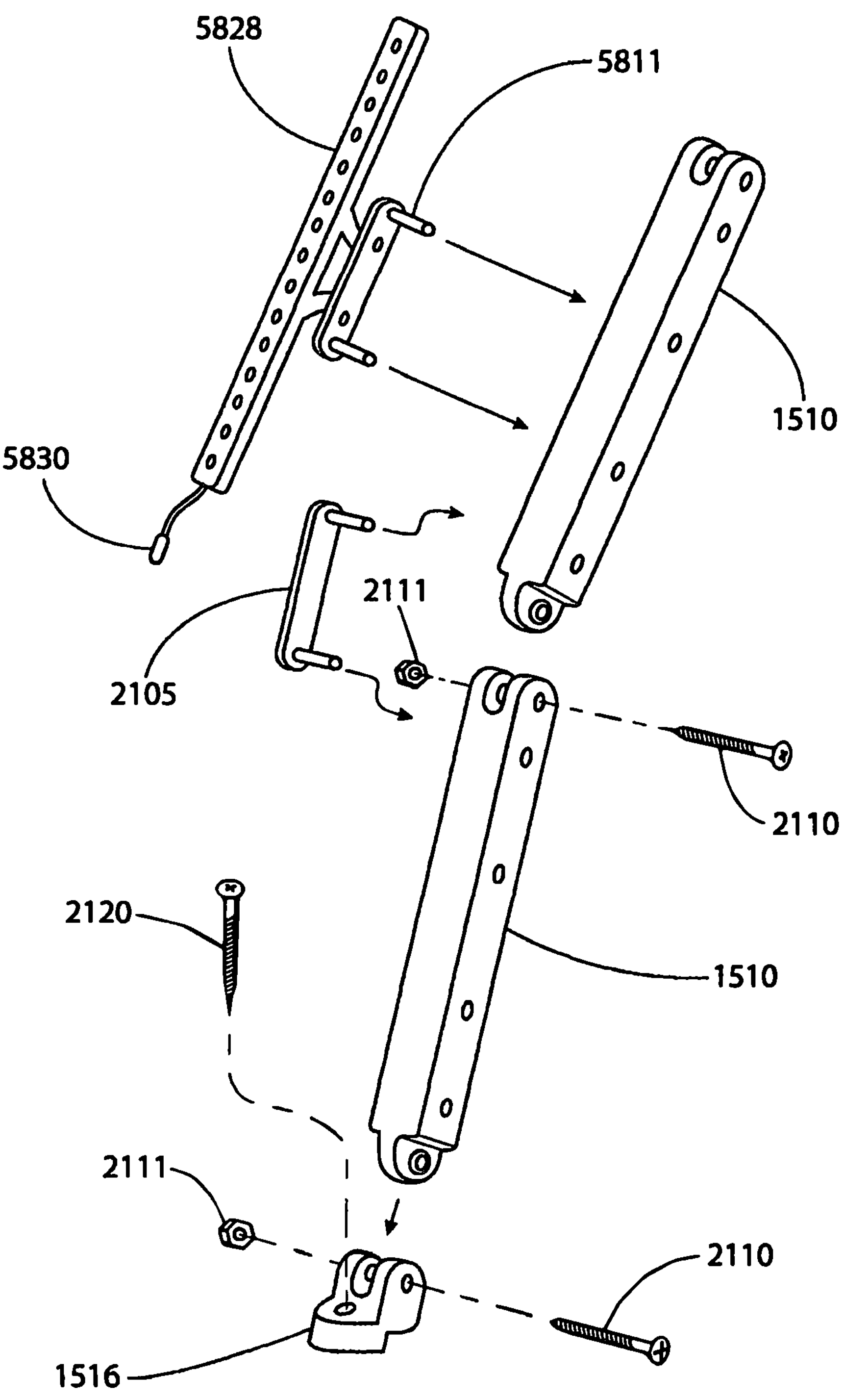
FIG. 58 illustrates a perspective exploded view of modular Trellis arms having attachable light bars, in accordance with an illustrative embodiment of the present invention.

FIG. 58 illustrates a perspective exploded view of modular Trellis arms 1510 having at least one attachable light bar 5828. The light bars 5828, which may include one or more LED strips, for example and without limitation, may be inserted in a Trellis arm 1510 using holder attachment tabs 5811. The light bars 5828 also have electrical connectors 5830 which may be connected to a suitable power source (not illustrated).

FIG. 59 illustrates a perspective view of a typical system 5900 having adjustable light arms 5910 for holding lighting fixtures 5950, 5955. The portion of the modular drive assembly 1000 (FIG. 9) that fits to the risers 1056 (FIG. 34) may also accept adjustable arm segments that hold and position light fixtures 5950, 5955 to supply light to growing plants 101. A light arm base connector 5905 may be fitted to the modular drive assembly 1000 of a system such as the 900, 1500, 2700, for example and without limitation. The light arm base connector 5905 may replace while retaining the function of the risers 1056, which may provide a passage for bolts or pins and serve as a platform for the fixed gear ring 980 (FIG. 34).

In some embodiments, the light arms 5910 may be of different shapes or types that fit together with connecting hardware 5920, such as nuts and bolts. The light arms 5910 may be formed of plastic, metal, and/or other suitable material. In some embodiments, the light arms 5910 may form openings (not illustrated) that extend through similar Trellis arms 1510 and accept attachment tabs 5811 (FIG. 58) at the light bars 5828. In yet other embodiments, an LED lighting fixture, typically formed as a flat plate 5950, may be attached to a top light arm connector segment 5940. In this manner, the plants 101 can receive uniform light exposure as the propagation modules 200, 230 articulate in a rotational, orbital, and/or linear path in proximity to the light source and through the hydroponic and/or aquaponics environments.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A modular system for propagating plants in at least one of a hydroponic environment and an aquaponics environment, comprising: a tank configured to hold liquid; a modular drive assembly carried by the tank; and a rotatable propagation module is drivingly engaged for rotation inside the tank by the modular drive assembly, wherein the propagation module is provided with a rim ring that is configured to hold a Trellis assembly comprising a plurality of Trellis base connectors with a plurality of angularly adjustable Trellis arms interlinked with one or more Trellis hoops, further at least one Trellis grid is attached to the Trellis hoops using grid clips to hold and/or train a plant that is propagated in the propagation module while allowing it to rotate about a center axis.

2. The modular system of claim 1 further comprising a pump to recirculate the liquid.

3. The modular system of claim 1 further comprising an air pump to supply oxygen to the systems in the hydroponic and/or aquaponic environment.

4. The modular system of claim 1, wherein the Trellis hoops are made of material selected from a group consisting of polyethylene tubing and metal tubing.

5. The modular system of claim 1, wherein the Trellis hoops are coupled using hoop couplers.

6. The modular system of claim 1, wherein the Trellis grid is fabricated using materials selected from a group consisting of strings and nettings.

7. The modular system of claim 1, wherein the grid clip is S-shaped plastic clip that fits onto the outside of the Trellis hoop.

8. The modular system of claim 1, wherein a motor drives a base ring on the propagation module so as to allow the plant and the propagation module to rotate.

9. The modular system of claim 1 further comprising a connection bundle, wherein the connection bundle includes a supply line connector, a drain line connection point, an airline connection point, and an electrical connection point and a power cord.

10. The modular system of claim 9 further comprising a drain cap that allows the liquid to pass through the drain connection.

11. The modular system of claim 1 further comprising one or more side covers attached to portions of the drive assembly to seal the modular system.

12. The modular system of claim 1 further comprising a plurality of geared rollers engaged with a fixed gear ring of the drive assembly that allows rotation of the propagation module.

13. A modular system for propagating plants in at least one of a hydroponic environment and an aquaponics environment, comprising: a soft sided tank with connection points comprising a drain connection line, a supply connection line, and an air connection line; a modular drive assembly that holds a propagation module; and a Trellis assembly attached to the drive assembly, wherein the Trellis assembly comprises a base assembly having a plurality of spikes with a corresponding base bracket that are configured to connect base rods at a desired level corresponding to the tank configuration, wherein the Trellis assembly holds and/or trains a plant that is propagated in the propagation module while the drive assembly allows the plant with the propagation module to rotate about a center axis.

14. The modular system of claim 13, wherein the Trellis brackets are configured with spacings to hold the adjacent joined Trellis arms at desired angles.

15. The modular system of claim 13, wherein the Trellis arms are configured to accept Trellis hoops having different diameters.

16. A combined system to link a plurality of modular systems for propagating plants in at least one of a hydroponic environment and an aquaponics environment, comprising:

a reservoir or sump connected with each of the modular systems through a pump, a common drain line, a common supply line, an electrical box connected to a power source, a drain line, an air pump; and wherein the modular systems each comprise a rotatable propagation module having a Trellis assembly that is drivingly engaged for rotation inside each of the modular systems by a modular drive assembly; wherein the Trellis assembly of each system comprises a plurality of Trellis base connectors configured to attach to the module, a plurality of Trellis arms configured to attach to the base connectors, one or more Trellis hoops configured to connect the plurality of Trellis arms, and at least one Trellis grid attached to the Trellis hoops using grid clips to hold and/or train a plant that is propagated in the propagation module while allowing it to rotate about a center axis of each of the systems.

17. The combined system to link a plurality of modular systems of claim 16 further comprising a modular Trellis arm having at least one attachable light bar.

18. A modular system for propagating plants in at least one of a hydroponic environment and an aquaponics environment, comprising: a tank configured to hold liquid; a modular drive assembly carried by the tank; a propagation module drivingly engaged for rotation by the modular drive assembly, wherein the propagation module comprises at least one tube segment with one or more plant site insert configuration to hold a plant site inserts so as to support and propagate at least one plant; and a pump disposed in fluid communication with the tank, the pump configured to pump the liquid from the tank through the propagation module; and wherein the propagation module comprises a cap assembly on either end of the tube segment, further each of the cap assemblies includes a geared cap and a cap coupler.

19. The modular system of claim 18, wherein the modular drive assembly drivingly engages the propagation module for rotation.

20. The modular system of claim 18 further comprising a connection bundle, wherein the connection bundle includes a liquid supply line, a liquid return line, an airline, a connection point and a power connection.

21. The modular system of claim 18 further comprising a float valve assembly to facilitate topping up liquid automatically through use of the liquid supply line.

22. The modular system of claim 18, wherein the geared caps are connected to respective geared rollers, wherein a geared roller drivingly engaged with the respective gear cap for rotation of the propagation module.

* * * * *